United States Patent
Ertas et al.

(10) Patent No.: US 8,977,523 B2
(45) Date of Patent: Mar. 10, 2015

(54) METHODS TO ESTIMATE DOWNHOLE DRILLING VIBRATION AMPLITUDE FROM SURFACE MEASUREMENT

(75) Inventors: Mehmet Deniz Ertas, Bethlehem, PA (US); Jeffrey R. Bailey, Houston, TX (US); Damian N. Burch, Missouri City, TX (US); Lei Wang, Sugar Land, TX (US); Paul E. Pastusek, The Woodlands, TX (US); Shankar Sundararaman, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 416 days.

(21) Appl. No.: 13/386,859

(22) PCT Filed: Aug. 6, 2010

(86) PCT No.: PCT/US2010/044732
§ 371 (c)(1),
(2), (4) Date: Jan. 24, 2012

(87) PCT Pub. No.: WO2011/017626
PCT Pub. Date: Feb. 10, 2011

(65) Prior Publication Data
US 2012/0130693 A1    May 24, 2012

Related U.S. Application Data

(60) Provisional application No. 61/232,274, filed on Aug. 7, 2009, provisional application No. 61/232,275, filed on Aug. 7, 2009, provisional application No. 61/364,244, filed on Jul. 14, 2010.

(51) Int. Cl.
G06F 7/60    (2006.01)
E21B 45/00   (2006.01)
E21B 44/00   (2006.01)
E21B 7/28    (2006.01)
G05B 15/02   (2006.01)

(52) U.S. Cl.
CPC ............. *E21B 45/00* (2013.01); *E21B 44/00* (2013.01); *E21B 7/28* (2013.01); *G05B 15/02* (2013.01)
USPC .............................................................. 703/2

(58) Field of Classification Search
None
See application file for complete search history.

(56) References Cited

U.S. PATENT DOCUMENTS

| | | | |
|---|---|---|---|
| 4,507,735 A | 3/1985 | Moorehead et al. | |
| 4,736,297 A | 4/1988 | LeJeune | |
| 5,321,981 A * | 6/1994 | Macpherson | 73/152.43 |
| 5,551,286 A | 9/1996 | Booer | |

(Continued)

*Primary Examiner* — Omar Fernandez Rivas
*Assistant Examiner* — Cuong Luu
(74) *Attorney, Agent, or Firm* — ExxonMobil Upstream Research Company—Law Department

(57) ABSTRACT

Method to estimate severity of downhole vibration for a drill tool assembly, including: identifying a dataset comprising selected drill tool assembly parameters; selecting a reference level of downhole vibration amplitude for the drill tool assembly; identifying a surface drilling parameter and calculating a reference surface vibration attribute for the selected reference level of downhole vibration amplitude; determining a surface parameter vibration attribute derived from at least one surface measurement or observation obtained in a drilling operation, the determined surface parameter vibration attribute corresponding to the identified surface drilling parameter; and estimating a downhole vibration severity indicator by evaluating the determined surface parameter vibration attribute with respect to the identified reference surface vibration attribute.

59 Claims, 14 Drawing Sheets

(56) References Cited

U.S. PATENT DOCUMENTS

| | | | |
|---|---|---|---|
| 5,654,503 A * | 8/1997 | Rasmus | 73/152.43 |
| 5,730,234 A | 3/1998 | Putot | |
| 5,842,149 A | 11/1998 | Harrell et al. | |
| 5,852,235 A | 12/1998 | Pavone et al. | |
| 6,026,912 A | 2/2000 | King et al. | |
| 6,155,357 A | 12/2000 | King et al. | |
| 6,192,998 B1 | 2/2001 | Pinckard | |
| 6,233,524 B1 * | 5/2001 | Harrell et al. | 702/9 |
| 6,293,356 B1 | 9/2001 | King et al. | |
| 6,363,780 B1 | 4/2002 | Rey-Fabret et al. | |
| 6,382,331 B1 | 5/2002 | Pinckard | |
| 6,408,953 B1 | 6/2002 | Goldman et al. | |
| 6,424,919 B1 | 7/2002 | Moran et al. | |
| 6,443,242 B1 | 9/2002 | Newman et al. | |
| 6,480,118 B1 | 11/2002 | Rao | |
| 6,662,110 B1 * | 12/2003 | Bargach et al. | 702/6 |
| 6,732,052 B2 | 5/2004 | Macdonald et al. | |
| 6,785,641 B1 * | 8/2004 | Huang | 703/7 |
| 6,820,702 B2 | 11/2004 | Niedermayr et al. | |
| 6,892,812 B2 | 5/2005 | Niedermayr et al. | |
| 6,968,909 B2 | 11/2005 | Aldred et al. | |
| 7,020,597 B2 | 3/2006 | Oliver et al. | |
| 7,044,238 B2 | 5/2006 | Hutchinson | |
| 7,044,239 B2 * | 5/2006 | Pinckard et al. | 175/57 |
| 7,142,986 B2 | 11/2006 | Moran | |
| 7,172,037 B2 | 2/2007 | Dashevskiy et al. | |
| 7,219,747 B2 * | 5/2007 | Gleitman et al. | 175/40 |
| 7,261,167 B2 | 8/2007 | Goldman et al. | |
| 7,316,278 B2 * | 1/2008 | Hutchinson | 175/39 |
| 7,357,196 B2 * | 4/2008 | Goldman et al. | 175/24 |
| 7,363,988 B2 * | 4/2008 | Jeffryes | 175/40 |
| 7,606,666 B2 | 10/2009 | Repin et al. | |
| 7,610,251 B2 | 10/2009 | Shayegi et al. | |
| 7,645,124 B2 | 1/2010 | Garlow | |
| 7,857,047 B2 * | 12/2010 | Remmert et al. | 166/250.01 |
| 7,878,268 B2 * | 2/2011 | Chapman et al. | 175/57 |
| 7,896,105 B2 * | 3/2011 | Dupriest | 175/40 |
| 8,014,987 B2 * | 9/2011 | Pabon et al. | 703/10 |
| 2002/0104685 A1 | 8/2002 | Pinckard et al. | |
| 2005/0096847 A1 * | 5/2005 | Huang | 702/9 |
| 2005/0197777 A1 | 9/2005 | Rodney et al. | |
| 2009/0076873 A1 * | 3/2009 | Johnson et al. | 705/8 |
| 2009/0089227 A1 | 4/2009 | Sturrock et al. | |
| 2009/0090555 A1 * | 4/2009 | Boone et al. | 175/45 |
| 2009/0132458 A1 | 5/2009 | Edwards et al. | 706/50 |
| 2010/0108384 A1 * | 5/2010 | Byreddy et al. | 175/27 |
| 2011/0077924 A1 | 3/2011 | Ertas et al. | |
| 2011/0186353 A1 * | 8/2011 | Turner et al. | 175/40 |
| 2011/0245980 A1 | 10/2011 | Nessjoen et al. | |

* cited by examiner

|  | Measured | | | |
|---|---|---|---|---|
| Estimated | m<0.7 | 0.7<=m<1 | 1<=m | |
| e<0.7 | 0.7291 | 0.0067 | 0.0004 | 0.7363 |
| 0.7<=e<1 | 0.0340 | 0.0429 | 0.0054 | 0.0823 |
| 1<=e | 0.0058 | 0.0206 | 0.1551 | 0.1815 |
| | 0.7689 | 0.0702 | 0.1609 | 1.0000 |

Rate of False Negatives: 0.0028

Rate of False Positives: 0.0076

Total "Badness": 0.0103

Full Stick-Slip Prediction Accuracy: 0.9639

Stick-Slip Warning Accuracy: 0.9691

*FIG. 21*

METHODS TO ESTIMATE DOWNHOLE DRILLING VIBRATION AMPLITUDE FROM SURFACE MEASUREMENT

RELATED APPLICATIONS

This application is the National Stage of International Application No. PCT/US10/44732, filed Aug. 6, 2010, which is related to and claims benefit of U.S. Provisional Application No. 61/232,275, filed Aug. 7, 2009, and related U. S. Provisional Application No. 61/232,274 filed Aug. 7, 2009, the entirety of each incorporated herein by reference. This application is also related to and claims benefit of U.S. Provisional Application No. 61/364,244, filed Jul. 14, 2010, the entirety of which is incorporated herein by reference.

FIELD

The present disclosure relates generally to the field of drilling operations, particularly to monitoring and optimizing the same using surface measurements and the estimation techniques taught herein. More particularly, the present disclosure relates to methods to estimate the effective vibration amplitudes of the bottom of the drill tool assembly, such as at or near a drill bit, based on evaluation of selected surface operating parameters.

BACKGROUND

This section introduces various aspects of art that may be associated with some embodiments of the present invention to facilitate a better framework for understanding some of the various techniques and applications of the claimed subject matter. Accordingly, it should be understood that these Background section statements are to be read in this light and not necessarily as admissions of prior art.

Drill tool assembly vibrations are known to potentially have a significant effect on Rate of Penetration (ROP) and represent a significant challenge to interpret and mitigate in pursuit of reducing the time and cost of drilling subterranean wells. Drill tool assemblies vibrate during drilling for various reasons related to one or more drilling parameters. For example, the rotary speed (RPM), weight on bit (WOB), mud viscosity, etc. each may affect the vibrational tendency of a given drill tool assembly during a drilling operation. Measured depth (MD), rock properties, hole conditions, and configuration of the drill tool assembly may also influence drilling vibrations. As used herein, drilling parameters include characteristics and/or features of both the drilling hardware (e.g., drill tool assembly) and the drilling operations.

As used herein, drill tool assembly refers to assemblies of components used in drilling operations. Exemplary components that may collectively or individually be considered a drill tool assembly include rock cutting devices, bits, mills, reamers, bottom hole assemblies, drill collars, drill strings, couplings, subs, stabilizers, MWD tools, motors, etc. Exemplary rig systems may include the top drive, rig control systems, etc., and may form certain boundary conditions. Deployment of vibrationally poor drill tool assembly designs and conducting drilling operations at conditions of high downhole vibrations can result in loss of rate of penetration, shortened drill tool assembly life, increased number of trips, increased failure rate of downhole tools, and increased non-productive time. It is desirable to provide the drilling engineer and/or rig operating personnel with a useful but not overly complex tool utilizing readily available data and quickly estimating the vibrational tendencies of the drill tool assembly.

A fixed cutter bit often requires more torque than a corresponding roller cone bit drilling similar formations at comparable conditions, although both bits can experience torque issues. Increased bit torque can lead to an increase in the phenomenon known as "stick-slip," an unsteady rotary speed at the bit, even when surface RPM remains substantially constant. Excessive stick-slip can be severely damaging to drill string assemblies. Roller cone bits may sometimes be more prone to axial vibration issues than corresponding fixed cutter bits. Although axial vibrations may be reduced by substituting fixed cutter bits for roller cone bits, some drilling operations with either type of bit may continue to experience axial vibration problems. Fixed cutter bits can be severely damaged by axial vibrations as the PDC wafer can be knocked off its substrate if the axial vibrations are severe. Axial vibrations are known to be problematic for rotary tricone bits, as the classic trilobed bottomhole pattern generates axial motion at the bit. There are known complex mathematical and operational methods for measuring and analyzing downhole vibrations. However, these typically require a substantial amount of data, strong computational power, and special skill to use and interpret.

Typically, severe axial vibration dysfunction can be manifested as "bit bounce," which can result in a momentary lessening or even a momentary complete loss of contact between the rock formation and the drill bit cutting surface through part of the vibration cycle. Such axial vibrations can cause dislocation of PDC cutters and tricone bits may be damaged by high shock impact with the formation. Dysfunctional axial vibration can occur at other locations in the drill tool assembly. Other cutting elements in the drill tool assembly could also experience a similar effect. Small oscillations in weight on bit (WOB) can result in drilling inefficiencies, leading to decreased ROP. For example, the depth of cut (DOC) of the bit typically varies with varying WOB, giving rise to fluctuations in the bit torque, thereby inducing torsional vibrations. The resulting coupled torsional-axial vibrations may be among the most damaging vibration patterns as this extreme motion may then lead to the generation of lateral vibrations.

Recently developed practices around optimizing the Bottom-Hole Assembly (BHA) design (WO 2008/097303) and drilling parameters for robust vibrational performance, and using real-time Mechanical Specific Energy (MSE) monitoring for surveillance of drilling efficiency (US 2009/0250264) have significantly improved drilling performance. MSE is particularly useful in identifying drilling inefficiencies arising from, for example, dull bits, poor weight transfer to the bit, and whirl. These dysfunctions tend to reduce ROP and increase expended mechanical power due to the parasitic torques generated, thereby increasing MSE. The availability of real-time MSE monitoring for surveillance allows the driller to take corrective action. One of the big advantages of MSE analysis is that it does not require real-time downhole tools that directly measure vibration severity, which are expensive and prone to malfunction in challenging drilling environments. Unfortunately, MSE analysis may not provide reliable information about the severity of torsional or axial oscillations. Field data shows intervals for which MSE does detect such patterns and other instances for which there is no vibration signature in the MSE data. Therefore, it is desirable to have additional indicators complementary to MSE that can provide torsional and/or axial severity from surface data, thereby avoiding the costly step of deploying downhole tools just for this purpose.

Multiple efforts have been made to study and/or model these more complex torsional and axial vibrations, some of which are discussed here to help illustrate the advances made by the technologies of the present disclosure. DEA Project 29 was a multi-partner joint industry program initiated to develop modeling tools for analyzing drill tool assembly vibrations. The program focused on the development of an impedance-based, frequency-dependent, mass-spring-dashpot model using a transfer function methodology for modeling axial and torsional vibrations. These transfer functions describe the ratio of the surface state to the input condition at the bit. The boundary conditions for axial vibrations consisted of a spring, a damper at the top of the drill tool assembly (to represent the rig) and a "simple" axial excitation at the bit (either a force or displacement). For torsional vibrations, the bit was modeled as a free end (no stiffness between the bit and the rock) with damping. This work also indicated that downhole phenomena such as bit bounce and stick-slip are observable from the surface. While the DEA Project 29 recognized that the downhole phenomena were observable from the surface, they did not specifically attempt to quantify this. Results of this effort were published as "Coupled Axial, Bending and Torsional Vibration of Rotating Drill Strings", DEA Project 29, Phase III Report, J. K. Vandiver, Massachusetts Institute of Technology and "The Effect of Surface and Downhole Boundary Conditions on the Vibration of Drill strings," F. Clayer et al, SPE 20447, 1990.

Additionally, U.S. Pat. No. 5,852,235 ('235 patent) and U.S. Pat. No. 6,363,780 ('780 patent) describe methods and systems for computing the behavior of a drill bit fastened to the end of a drill string. In '235, a method was proposed for estimating the instantaneous rotational speed of the bit at the well bottom in real-time, taking into account the measurements performed at the top of the drill string and a reduced model. In '780, a method was proposed for computing "Rf, a function of a principal oscillation frequency of a weight on hook WOH divided by an average instantaneous rotating speed at the surface of the drillstring, Rwob being a function of a standard deviation of a signal representing a weight on bit WOB estimated by the reduced physical model of the drill string from the measurement of the signal representing the weight on hook WOH, divided by an average weight on bit $WOB_0$ defined from a weight of the drill string and an average of the weight on hook WOH, and any dangerous longitudinal behavior of the drill bit determined from the values of Rf and Rwob" in real-time.

These methods require being able to run in real-time and a "reduced" model that can accept a subset of measurements as input and generate outputs that closely match the remaining measurements. For example, in '235 the reduced model may accept the surface RPM signal as an input and compute the downhole RPM and surface torque as outputs. However, the estimates for quantities of interest, such as downhole RPM, cannot be trusted except for those occurrences that obtain a close match between the computed and measured surface torque. This typically requires continuously tuning model parameters, since the torque measured at the surface may change not only due to torsional vibrations but also due to changes in rock formations, bit characteristics, borehole patterns, etc., which are not captured by the reduced model. Since the reduced model attempts to match the dynamics associated with relevant vibrational modes as well as the overall trend of the measured signal due to such additional effects, the tuned parameters of the model may drift away from values actually representing the vibrational state of the drilling assembly. This drift can result in inaccurate estimates of desired parameters.

Another disadvantage of such methods is the requirement for specialized software, trained personnel, and computational capabilities available at each drilling operation to usefully utilize and understand such systems.

A recent patent application publication entitled "Method and Apparatus for Estimating the Instantaneous Rotational Speed of a Bottom Hole Assembly," (WO 2010/064031) continues prior work in this area as an extension of IADC/SPE Publication 18049, "Torque Feedback Used to Cure Slip-Stick Motion," and previous related work. One primary motivation for these efforts is to provide a control signal to the drilling apparatus to adjust the power to the rotary drive system to reduce torsional drill string vibrations. A simple drill string compliance function is disclosed providing a stiffness element between the rotary drive system at the surface and the bottom hole assembly. Inertia, friction, damping, and several wellbore parameters are excluded from the drill string model. Also, the '031 reference fails to propose means to evaluate the quality of the torsional vibration estimate by comparison with downhole data, offers only simple means to calculate the downhole torsional vibrations using a basic torsional spring model, provides few means to evaluate the surface measurements, does not discuss monitoring surface measurements for bit axial vibration detection, and does not use the monitoring results to make a comprehensive assessment of the amount or severity of stick-slip observed for a selected drilling interval. This reference merely teaches a basic estimate of the downhole instantaneous rotational speed of the bit for the purpose of providing an input to a surface drive control system. Such methods fail to enable real-time diagnostic evaluation and indication of downhole dysfunction.

Other related material may be found in "Development of a Surface Drillstring Vibration Measurement System", A. A. Besaisow, et al., SPE 14327, 1985; "Surface Detection of Vibrations and Drilling Optimization: Field Experience", H. Henneuse, SPE 23888, 1992; and, "Application of High Sampling Rate Downhole Measurements for Analysis and Cure of Stick-Slip in Drilling," D. R. Pavone and J. P. Desplans, 1994, SPE 28324. Additionally, patent application WO 2009/155062 A1, "Methods and Systems for Mitigating Drilling Vibrations," provides further details on the methods presented herein. Numerous theoretical and analytical methods have been taught and disclosed in the art, but few have also provided methods for applying such technology. The art remains in need of a more reliable method for predicting downhole vibrational effects utilizing information that can be relatively easily obtained from surface measurements and data. The art particularly also remains in need of such methods that can be usefully employed at remote locations such as at a drill site, without the need for exceptional engineering and computational skills and equipment.

SUMMARY

The present disclosure relates to improved methods to estimate the effective vibration amplitudes of the bottom of the drill tool assembly, such as at or near a drill bit, based on evaluation of selected surface operating parameters. The estimates may then be utilized, such as in advance of, during, or after drilling activities to enhance present or future drilling operations. These methods and systems may be used to increase overall drilling performance by adopting corrective measures to mitigate excessive inefficiencies and operational dysfunctions associated with vibrational energies within the drilling assembly. Vibrations may include but are not limited to torsional, axial, and coupled torsional/axial vibrations. Estimation of downhole vibrations from surface data can provide critical information to assess changes in operating parameters and bit selection. Since stick-slip can vary during a drilling operation due to both formation changes and operating parameter variations, maintaining an estimation of the amount of stick-slip severity for the entire drilling interval can provide important information for a drilling operation. It is desirable to implement a usefully accurate, reliable, and dependable remote surveillance program based on surface data that is broadly applicable, easy to teach, and easy to implement, using various selected aspects of a wide variety of rig data logging equipment that is readily available to the individual drill teams.

In one aspect, the claimed subject matter includes a method to estimate severity of downhole vibration for a wellbore drill tool assembly, comprising the steps: a. Identifying a dataset comprising selected drill tool assembly parameters; b. Selecting a reference level of downhole vibration amplitude for the drill tool assembly; c. Identifying a surface drilling parameter and calculating a reference surface vibration attribute for the selected reference level of downhole vibration amplitude; d. Determining a surface parameter vibration attribute derived from at least one surface measurement or observation obtained in a drilling operation, the determined surface parameter vibration attribute corresponding to the identified surface drilling parameter (step c); and e. Estimating a downhole vibration severity indicator by evaluating the determined surface parameter vibration attribute (step d) with respect to the identified reference surface vibration attribute (step c). As used herein, the term drilling operation is defined broadly to include boring, milling, reaming or otherwise excavating material to enlarge, open, and/or create a wellbore, whether original drilling operation, planning a drilling operation, work-over operation, remedial operation, mining operation, or post-drilling analysis.

In another aspect, the claimed technology includes a. identifying a dataset comprising (i) parameters for a selected drill tool assembly comprising a drill bit, (ii) selected wellbore dimensions, and (iii) selected measured depth (MD); b. Selecting a reference value of downhole vibration amplitude for at least one of downhole torque, downhole weight on bit, downhole bit RPM, and downhole axial acceleration; c. Identifying a corresponding selected surface drilling parameter including at least one of surface torque, a surface hook-load, surface drill string rotation rate, and surface axial acceleration, and calculating a corresponding reference surface attribute value for the selected reference value of downhole vibration amplitude; d. Determining a surface parameter vibration attribute value obtained in a drilling operation, the determined surface parameter vibration attribute value corresponding to the identified selected surface drilling parameter (step c); and e. Estimating a downhole vibration severity by evaluating the determined surface parameter vibration attribute value (step d) with respect to the identified reference surface vibration attribute value (step c).

In other embodiments, the claimed improvements include a method to estimate severity of downhole vibration for a drill tool assembly, comprising the steps: a. Identifying a dataset comprising selected drill tool assembly parameters; b. Selecting a reference level of downhole vibration amplitude for the drill tool assembly; and c. Identifying one or more ratios of: the selected reference level of downhole vibration amplitude for the drill tool assembly (step b) to a calculated reference surface vibration amplitude; d. Determining a surface parameter vibration attribute derived from at least one surface measurement or observation obtained in a drilling operation, the determined surface parameter vibration attribute corresponding to the identified surface drilling parameter (step c); and e. Estimating the downhole vibration severity indicator by evaluating the determined surface parameter vibration attribute (step d) with respect to one or more of the identified ratios (step c).

Additionally or alternatively, the methods above may include a step to estimate the quality of the vibration severity estimate determined from surface data by comparison with downhole measured data, either during or after the drilling process.

In other embodiments, the methods above may include a step to evaluate the vibration severity estimates from at least two drilling intervals for the purpose of a drilling performance assessment to recommend selection of a drilling parameter for a subsequent interval, which may include selection of one or more bit features or characteristics, or a change in the specified WOB or rotary speed, or both.

In other alternative embodiments, the methods above may include the use of vibration severity estimates from surface data to evaluate drilling performance for an interval to adjust at least one drilling parameter to maintain a vibration severity estimate value at a desired value or below a maximum value not to be exceeded during the operation.

BRIEF DESCRIPTION OF THE FIGURES

FIG. 21 illustrates an exemplary discrete classification scheme for downhole vibration amplitude.

DETAILED DESCRIPTION

In the following Detailed Description, specific aspects and features of the claimed subject matter are described in connection with several exemplary methods and embodiments. However, to the extent that the following description is specific to a particular embodiment or a particular use of the present techniques, it is intended to be illustrative only and merely provides a concise description of exemplary embodiments. Moreover, in the event that a particular aspect or feature is described in connection with a particular embodiment, such aspect or feature may be found and/or implemented with other embodiments of the present invention where appropriate. Accordingly, the claimed invention is not limited to the specific embodiments described below, but rather, the invention includes all alternatives, modifications, and equivalents falling within the scope of the appended numbered paragraphs and claimed subject matter.

Figure 1:
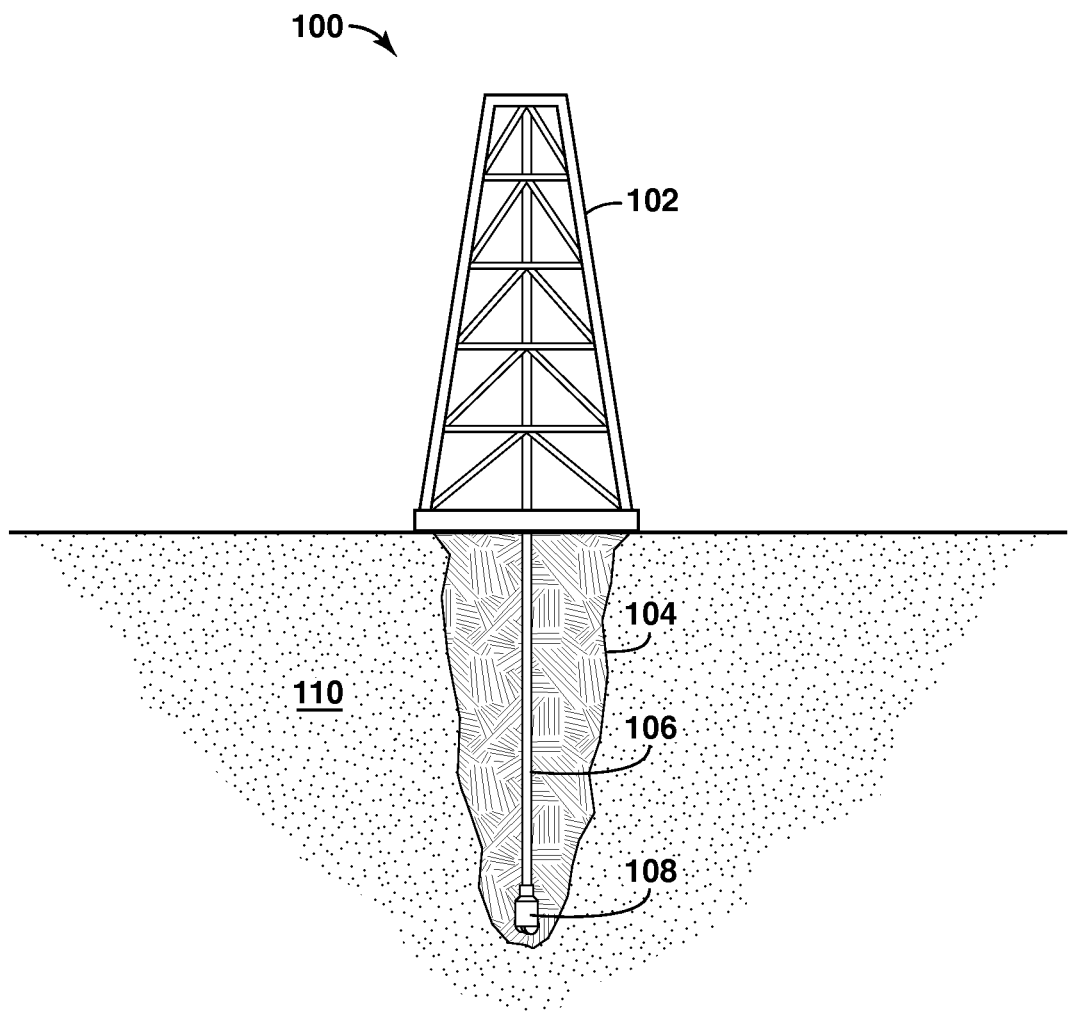
FIG. 1 demonstrates a schematic view of a well showing a generalized environment in which the present systems and methods may be implemented.

FIG. 1 illustrates a side view of a relatively generic drilling operation at a drill site 100. FIG. 1 is provided primarily to illustrate a drill site having a drilling rig 102 disposed above a well 104 drilled into a formation 110. The drilling rig 102 includes a drill tool assembly 106 including a drill bit 108 disposed at the end thereof. The apparatus illustrated in FIG. 1 is illustrated in almost schematic form merely to present the representative nature thereof. The present systems and methods may be used in connection with any currently available drilling equipment and is expected to be usable with any future developed drilling equipment. Similarly, the present systems and methods are not limited to land based drilling sites but may be used in connection with offshore, deepwater, arctic, and the other various environments in which drilling operations are conducted.

While the present systems and methods may be used in connection with any rotary drilling, milling, under-reaming, or boring operation, they are expected to be used primarily in wellbore drilling operations related to the recovery of hydrocarbons, such as for oil and gas wells. References herein to drilling operations are to be understood expansively. Operators are able to remove rock, other formation, casing components, cement, and/or related materials using a variety of apparatus and methods, some of which are different from conventional forward drilling into virgin formation. Accordingly, the discussion herein referring to drilling parameters, drilling performance measurements, drilling vibrations, drilling vibration severity, drilling vibration amplitude, etc., refers to parameters, measurements, performance, vibrations, and severity during any of the variety of operations that are associated with a wellbore rotary drilling process. As is well known in the hydrocarbon wellbore drilling industry, a number of factors affect the efficiency of the drilling operations, including factors within the operators' control and factors such as rock properties that are beyond operators' control. For purposes of this application, the term drilling conditions will be used to refer generally to the conditions in the wellbore during the drilling operation. The drilling conditions are comprised of a variety of drilling parameters, some of which relate to the environment of the wellbore and/or formation and others that relate to the drilling activity itself. For example, drilling parameters may include but are not limited to, any of rate of rotation (RPM), weight on bit (WOB), measured depth (MD), hole angle, hole diameter, characteristics of the drill bit and drill string, mud weight, mud flow rate, mud viscosity, rock properties, lithology of the formation, pore pressure of the formation, torque, pressure, temperature, rate of penetration, mechanical specific energy, etc., and/or combinations thereof. Various parameters may be directly measured or must be indirectly measured, calculated, estimated, or otherwise inferred from available data. Typically, critical downhole determinations are more difficult or complicated to obtain than readily accessible surface parameters. It may be appreciated that these parameters typically may be measured and described quantitatively, and these measurements have certain attributes that characterize the data. Common attributes include mean value, standard deviation, root-mean-square, and other statistical values. Additional attributes of the parameters may include dominant period, dominant frequency, time rate of change, peak time rate of change ("slew rate"), peak-to-peak amplitude, moving average, spectral periodogram from Fourier analysis, and the like.

The present inventions and claimed subject matter provide methods for reliably and conveniently estimating various downhole vibration parameters from relatively available surface data, such estimations being useful to timely reduce unacceptable vibrations and improve drilling operations. The measurements and data acquisitions performed at the top of the drill tool assembly can be obtained by means of sensors or an instrumented sub situated close to the top of the drill tool assembly, or may be obtained at or near the drilling rig.

As drilling operations progress, the drill bit 108 advances through the formation 110 at a rate known as the rate of penetration (ROP, 108), which is commonly calculated as the measured depth (MD) drilled over time. As formation conditions are location dependent, drilling conditions necessarily change over time as the wellbore penetrates varying formations. Moreover, the drilling conditions may change in manners that dramatically reduce the efficiencies of the drilling operation and/or that create less desired operating conditions. The presently claimed subject matter demonstrates improved methods of predicting, estimating, and detecting changes in drilling conditions and the response of different bits and cutting tools to these formations. Bit selection is a key parameter that affects drilling efficiency and the art of bit design continues to advance with new bit features that may be difficult to evaluate for a specific drilling application without using the bit to drill at least a portion of a formation of commercial interest. Means to evaluate the performance of such a drill test may include the propensity of the bit to generate drilling vibrations, including torsional stick-slip vibrations. Beneficially, the claimed subject matter provides means to efficiently quantify with a reasonable degree of accuracy the downhole vibration severity, relying only on calculable parameters and surface data measurements, thus avoiding the delays, costs, and complexity of providing actual downhole measurements.

This invention discloses a method to estimate the severity of one or more of RPM and WOB fluctuations at the bottom of the drill tool assembly in real time during drilling operations, or optionally before or after drilling to aid in drilling assembly planning or analysis. This severity estimate is computed based on a mechanical description of the drilling assembly and real-time operating parameters (including torque, RPM, WOH, WOB) and measured depth (MD) readings taken from one or more of a surface drilling rig recording system and an instrumented surface sub. Additional information such as the wellbore trajectory, drilling fluid density and plastic viscosity, and friction factors can refine this estimate but is not required. In some applications, the estimated severity level may be displayed to the driller or an engineer, in a manner similar to rig-determined and displayed MSE data, to assist in drilling surveillance and operational decisions. In one method, to analyze vibrational performance the driller may be provided (directly or indirectly) portions of the information in the form of predetermined tables or plots (e.g., for direct read and/or interpolation) that in conjunction with the rig-measured data can allow estimation of stick-slip severity, torque fluctuations, and axial vibration severity by monitoring the surface torque, RPM, and hookload on the driller's screen or rig parameters.

According to the present invention, the severity of a given type of vibrational dysfunction can be described by a dimensionless ratio that compares the amplitude of dynamic fluctuations in a drilling parameter to its average value. For example, stick-slip severity may be related to the ratio of dynamic RPM variations at the drill bit to the average RPM at the bit. Since there is rarely permanent torsional deformation of the drill string, the average RPM of the bit (downhole) is substantially equal to the average RPM of the drill string at the surface. When a vibrational dysfunction is present, a single dominant ("active") vibrational mode at a specific frequency may account for a dominant portion of the dynamic variation in the observed drilling parameter. Thus, if the particular active mode can be reliably identified, it is possible to infer the amplitude of such vibrational modes from observations anywhere along the drill string, particularly at the surface where such measurements are already made.

In one aspect, the claimed subject matter includes a method to estimate severity of downhole vibration for a wellbore drill tool assembly, comprising the steps: a. Identifying a dataset comprising selected drill tool assembly parameters; b. Selecting a reference level of downhole vibration amplitude for the drill tool assembly; c. Identifying a surface drilling parameter and calculating a reference surface vibration attribute for the selected reference level of downhole vibration amplitude; d. Determining a surface parameter vibration attribute derived from at least one surface measurement or observation obtained in a drilling operation, the determined surface parameter vibration attribute corresponding to the identified surface drilling parameter (step c); and e. Estimating a downhole vibration severity indicator by evaluating the determined surface parameter vibration attribute (step d) with respect to the identified reference surface vibration attribute (step c). As used herein, the term drilling operation is defined broadly to include boring, milling, reaming or otherwise excavating material to enlarge, open, and/or create a wellbore, whether original drilling operation, planning a drilling operation, work-over operation, remedial operation, mining operation, or post-drilling analysis.

As used herein, vibration relates to vibration of one or more components of the drill tool assembly and comprises one or more of torsional vibration, axial vibration, lateral vibration, coupled torsional and axial vibrations, and combinations thereof.

The step of "identifying a dataset" may comprise selecting, for example, one or more drill tool assembly design parameters, wellbore dimensions, measured depth (MD), projected drilling operation parameters, wellbore survey data, and wellbore fluid properties.

The "reference level of downhole vibration amplitude" may be selected as, for example, a function of one or more of downhole drill tool assembly rotational velocity, downhole axial velocity, downhole axial acceleration, downhole axial load, downhole torsional moment, and combinations thereof. In some embodiments, selecting a reference level of downhole vibration amplitude may comprise, for example, selecting a downhole condition for the drill tool assembly for which the rotary velocity is momentarily zero. Momentarily zero means that for at least some discernable increment of time the downhole rotary velocity (RPM) comes to a halt or is not greater than five percent of the average RPM. In some other embodiments, selecting a reference level of downhole vibration amplitude may include, for example, selecting a downhole condition where a weight on bit (WOB) parameter is momentarily zero. In yet another embodiment, selecting a reference level of downhole vibration amplitude may comprise selecting an undesirable downhole condition, such as for example full stick-slip of the bit, bit axial disengagement from the formation, or momentarily exceeding some design or operating limit anywhere along the drill tool assembly, such as the make-up or twist-off torque of a connection, a bucking limit, tensile or torsional strength of a component.

A corresponding surface parameter may be identified that is physically connected to the selected downhole vibration parameter of interest. Using a mathematical model of this physical coupling, as described herein, a reference surface parameter vibration attribute may be calculated for the corresponding reference level of the downhole vibration.

Determining a surface parameter vibration attribute may refer to calculating, estimating, or otherwise obtaining a quantity related to one or more measured values of a surface parameter. The term "surface parameter" as used herein is defined broadly to refer to physical properties, manifestations of vibrational energy, and operating conditions observed or measured at the surface. Typical vibration attributes of interest include but are not limited to the period of vibration of surface torque, peak-to-peak amplitude of surface torque, root-mean-square value of surface hookload, etc. Additional examples of surface parameter vibration attributes are provided herein.

A downhole vibration severity indicator may be calculated from the determined surface vibration parameter attribute obtained from the measured data, in consideration of the calculated reference level of the surface parameter corresponding to the selected reference level of the downhole vibration.

A related but previously developed attempt to model downhole vibrational effects, WO 2009/155062, filed on Jun. 17, 2008, describes certain methodologies based upon a frequency domain model to design a drill tool assembly for use in a drilling operation, based on drilling operations parameters and drill tool assembly data, utilizing torsional and axial vibration indices that characterize an excitation response. The models described therein and presented as one embodiment below may optionally be used in conjunction with the present invention to compute the frequency response of the drill tool assembly and specifically to compute the dominant periods of vibration, as well as ratios of vibration amplitudes of one or more surface and downhole parameters for such periods.

In methods according to the present invention, the vibration amplitudes may provide information on the characteristic dynamic oscillations in one or more operating parameters such as torque, hookload, RPM, WOB and acceleration over a specified period or periods of vibration. Specifically, the vibration amplitude may be obtained from the Fourier component of the drilling operating parameters obtained at a specific frequency, or, if a single vibrational mode is dominant (active), from the maximum and minimum values that are observed during an interval longer than but comparable to the period of oscillation. A period of oscillation refers to the time required for completion of one cycle of dynamic variation. This period corresponds to the normal modes of vibration associated with the drill tool assembly.

Vibration amplitude may be determined by various methods that may be considered essentially equivalent for signals of interest with respect to accurately determining amplitude. In the time domain, the vibration amplitude is simply the coefficient $A(t)$ in the expression $x(t)=A(t)\sin(\omega t)$. The field of random vibrations teaches several ways to estimate $A(t)$, which may in general vary in time, from a set of measurements. After means to remove a slowly-varying, steady, or "DC," component, the residual signal typically has zero mean. The crossings of the signal with the time axis, in either the up or down direction, has significance because these time values help to determine the period. For one such cycle, the extreme values can be determined, and these values can be used to determine one estimate of the amplitude $A(t)$. Alternatively, a sine wave could be fit to the data for one such period with the coefficient $A(t)$ determined by a minimum error approach. Also, the standard deviation of the signal can be determined for some moving time window or interval, and using mathematical relationships one may estimate the amplitude $A(t)$ from these values. As mentioned above, Fourier analysis is yet another way to calculate the amplitude of a sinusoidal signal. Therefore, the phrase "vibration amplitude" is used to refer to the strength $A(t)$ of a time-varying signal that may be determined by these and other means that are known to those skilled in the art, including processes that use FIR and IIR filters, state observers, Kalman filters, derivatives, integrals, and the like.

The significance of vibration amplitude fluctuation about a nominal value of a signal is related to the strength of the signal overall. That is, severity of downhole vibrations ("vibration severity") can be considered to be related to the ratio of the vibration amplitude to the mean signal strength. One convenient means to measure vibration severity of a signal $x(t)$ is to define $$S(x) = \frac{\text{Max}(x) - \text{Min}(x)}{2 * \text{Mean}(x)}$$

In some references, the factor of 2 is absent. However, it is convenient to consider 100% stick-slip, or "full stick-slip," to correspond to the condition wherein the sinusoidal oscillation of the bit about its mean rate of rotation is such that it momentarily has zero RPM, for which the amplitude of the vibration is equal to the mean rotary speed. Then $\text{Max}(x)=2A$, $\text{Min}(x)=0$, $\text{Mean}(x)=A$, and $S(x)=100\%$. It is recognized that other more severe stick-slip conditions may occur, and the pattern may not be purely sinusoidal. This example is provided as a reference condition and is not limiting. Additional definitions of vibration severity are within the scope of the claimed subject matter.

Although the observed values of vibration amplitudes are affected by factors that can change continuously during drilling, the ratios of such amplitudes at different positions along the drill tool assembly for a given vibrational mode can be robustly estimated simply from the eigenfunction of the mode (also referred to as the "mode shape"), even under varying drilling conditions. Thus, with the knowledge of the active mode and its mode shape, it is possible to reliably estimate the vibrational amplitude of a parameter associated with downhole behavior from an observation or determination of a related parameter at another location, such as at the surface. Furthermore, it is not necessary to model either the instantaneous values or the long-term trends of the drilling parameters, both of which depend on many other uncontrolled factors.

The main benefit of the method outlined and claimed subject matter in this disclosure is that it allows real-time computation of the torsional and axial severity along with suitable alarm levels that diagnose downhole conditions without access to downhole vibration data. By diagnosing the axial and torsional behavior of the drill string, this invention complements the operator's ROP management process that uses the Mechanical Specific Energy (MSE) as a diagnostic surface measurement of downhole behavior. The vibration severity estimates presented herein are complementary to the MSE data. Estimates of downhole vibrations from surface data may be compared with downhole data measurements for use in an evaluation of the quality of the vibration severity estimate. The accuracy of the physical model and proper selection of drilling parameter data will both contribute to increasing quality of the vibration severity estimates. Furthermore, vibration severity estimates for complete drilling intervals may be used in drilling performance assessment to aid in bit selection and drilling parameter selection for use in drilling a subsequent interval. It is therefore important to assess the quality of the vibration severity estimate, using downhole data measurements, so as to understand the accuracy of the dynamic model and to conduct any necessary calibrations of the model. After a model has been calibrated and the quality of the estimate is known, it can be used with greater confidence for making operational and design decisions.

For example, vibration severity estimates may be obtained for a specific bit drilling a specific interval under certain drilling conditions. If the vibration severity estimate indicates that the bit is not operating close to stick-slip, then one could reasonably choose a more aggressive bit or one or more other more aggressive operational parameters for a subsequent run, or a combination thereof. However, if the data shows that the bit is routinely in full stick-slip, a reduction in bit tooth or cutter depth-of-cut may be warranted, or alternatively less aggressive operating parameters would be advised. Such results are likely to be formation specific and thus one could contemplate the need to conduct such surveillance on a nearly continuous basis. Since it is most desirable to drill as long an interval as possible with a single bit, one important value of the diagnostics is to provide information for choosing a bit and operating parameters that have optimized performance over the interval taken as a whole.

Instead of investigating the total dynamic motion of the drill string, the inventive subject matter claimed herein separately investigates each of the zero and first order terms in a perturbation expansion. The fluctuation amplitudes of drilling operating parameters such as torque, WOH, WOB, and RPM are derived as the first order components of a perturbation expansion of the equations of motion of the drilling assembly. The zero-order terms determine the baseline solution. Second and higher order terms are not necessary for the claimed methods but could be calculated if desired. Using the fluctuation amplitudes provides a practical approach to calculation of the torsional and axial behavior at the bottom of the drill string. This is because the dynamic perturbation models do not require a complete understanding of the factors that affect the average steady-state amplitudes of these parameters, and there is a reduced requirement to tune the model to account for differences between estimated and actual average amplitudes of these parameters. This approach exploits the fact that stick-slip and bit bounce are dependent on the dynamic variations and not on the average values of these signatures. Also, with this approach, it is possible to provide additional information on fluctuations in RPM, torque, WOB, and WOH that is useful during drilling operations and in post-drill re-design. Furthermore, the methods and systems described herein differ from the approaches specified in other applications in the following ways: our calculations do not compute a real-time value of the rotational speed of the bit; our model calculations are not required to be carried out in real-time; our methods can make use of spectral analysis, and details from specific frequency(ies) may then be used for further computation; and we have no need to oversample the data if the period of the active mode is known.

There are several techniques and devices that can acquire measurement data at the surface. These include measurement devices placed at the top of the drill string, which determine certain drilling mechanics properties including accelerations and drilling operating conditions such as torque, WOH, WOB, motor current or voltage fluctuations, and rotary speeds. Other devices exist that measure drilling mechanics data downhole and along the entire string. The advent of wired drillpipe offers additional possibilities for along-the-string measurements that can be used during a drilling operation, and, similarly, data from along-the-string memory devices may be used in a post-drill analysis. Typically, the driller who controls the surface rig operations can modify and control the WOB, torque, rotary speed, and the ROP. These operating parameters can be managed by one or more of: (a) real-time feeds of surface drilling mechanics data, (b) delayed feeds of downhole data using a mud-logging system or other suitable surface monitoring service, and (c) built-in automatic control devices.

One method provided herein includes a step of selecting a reference downhole amplitude or vibration severity for a torsional or axial state to be diagnosed. Examples of reference downhole conditions include: (1) the state of "full stick-slip" in which the torsional rotation of the bit momentarily comes to a full stop and then accelerates to a peak rate of rotation of approximately twice the average rotary speed; (2) the state of "bit bounce" for which the applied axial force of the bit on the bottom of the borehole is momentarily zero, after which it may increase to a value considerably in excess of its average value; (3) an axial vibration state in which the bit is lifted off the bottom of the borehole a sufficient distance such that the cutting element clears the present bottomhole cutting pattern; (4) extreme values of stick-slip such that the instantaneous torque value is negative and rises to a sufficient level to backoff drill string connections, which will depend on the specific hole size and drill string connections in use. The reference downhole condition may be expressed as a vibration amplitude or as a vibration amplitude ratio. For example, one may specify the RPM range or, alternatively, full stick-slip for which the ratio of the vibration amplitude (A(t) above) to the average rotary speed is 1, or 100% stick-slip. It follows that other natural reference downhole vibration conditions may be selected, but these are ones of present interest.

For such a reference downhole vibration, the amplitudes and severity of the corresponding reference levels of surface parameters are calculated using the drilling parameters and the physical model, which includes as much descriptive physics as may be necessary for an accurate modeling estimate. The reference surface condition may be simply a reference vibration amplitude of a single surface parameter (such as torque), or it may be a complex relation between multiple surface parameters (such as torque and rotary speed) for more complicated surface boundary conditions.

In the simplest case, it is possible to evaluate the downhole vibration severity by first selecting the downhole vibration parameter and its reference level, identifying a surface drilling parameter and calculating its vibration amplitude for the corresponding downhole vibration reference amplitude (this is the "reference surface amplitude"). Then the vibration amplitude of the surface parameter is determined from measured data at the surface from a drilling operation, using one or more of the several methods indicated above. The "vibration amplitude ratio" is calculated as the measured surface parameter vibration amplitude, divided by the reference level of the surface parameter calculated from the model and the drilling parameters for the reference downhole vibration amplitude. This vibration amplitude ratio is an estimate of the downhole vibration severity. This method can be generalized to include more than one reference level and additional surface parameter attributes such as primary period and other measures of the effective vibration amplitude.

Consider a simple embodiment of the torsional stick-slip problem. The reference downhole condition is full stick-slip, for which the vibration amplitude of the rotary speed is equal to the mean RPM. The surface torque vibration amplitude may be calculated from the physical model for this downhole vibration reference condition. The vibration amplitude of the surface torque is determined from the measured surface data. In this simple embodiment, the ratio of the measured surface torque vibration amplitude to the calculated reference level is the torsional severity estimate (TSE).

In another embodiment, a post-drill analysis may be performed on a well for which downhole measurements were made while drilling. These measurements can be compared to the reference level of downhole vibration amplitude to obtain a measured downhole vibration severity. Then any of a number of algorithms from the field of pattern recognition (also known as machine learning, statistical learning, data mining, and artificial intelligence) may be employed to train a computer program to automatically classify the severity of the downhole vibrations given only the corresponding topside measured data. Such algorithms include, but are not limited to, linear and logistic regression, discriminant analysis, and classification and regression trees. Once this post-drill analysis is complete for one or more wells, the trained algorithms may be employed to autonomously estimate downhole vibration severity in real-time while drilling new wells. Though such learning algorithms need only employ the drilling measurements, their classification performance is greatly improved by also using the results of the physical models described herein as a baseline during training.

Depending on the environment in which the present systems and methods are utilized, the adjustment of the at least one drilling parameter may be based on this one or more vibration amplitude ratio(s) and/or on the determined or identified drilling parameter change. For example, in a field operation, the identified change may be displayed for an operator with or without the underlying vibration amplitude ratio or severity level used to determine the change. Regardless of whether the vibration amplitude ratio or severity level is displayed to the operator in the field, the determined change may also be presented and the operator may act to adjust drilling conditions based solely on the displayed change. Additionally or alternatively, an operator or other person in the field may consider both the vibration amplitude ratios and the identified drilling parameter change. Additionally or alternatively, such as when the identified drilling parameter change is merely a change in operating conditions, the computer system may be adapted to change the drilling parameter without user intervention, such as by adjusting WOB, WOH, rotary speed, pump rate, etc. Again, depending on the manner or environment in which the present systems and methods are used, the manner of adjusting the drilling parameter may change. The present methods and systems may be implemented in a manner to adjust one or more drilling parameters during a drilling operation, but not necessarily in substantially real-time. Furthermore, the data may be evaluated in a post-drill performance evaluation review, with subsequent recommendations on drilling parameter change, including selection of a drill bit or bit characteristics and features, for use in the drilling of a subsequent interval. A recent important innovation is the use of depth-of-cut (DOC) control features on PDC bits, which limit the amount of cutter penetration at higher bit weights. The DOC feature thus limits the bit torque at high bit weight. Evaluation of bit performance and optimizing the selection of DOC features has thus become more complex, and additional tools such as the present invention are necessary to maximize drilling performance.

The inventive technology may also include a software program that graphically characterizes the vibrational performance of the drill tool assembly. In some implementations, the software program will graphically characterize the vibrational performance or tendency of a single configuration design for one or more vibrational modes. The methodologies implemented to graphically characterize the torsional and axial vibration performance incorporate a common framework with some differences.

As will be described in greater detail below, the software program input consists of entering ranges for various drilling operations parameters, such as WOB, RPM, drilling fluid density and viscosity, and bit depth, as well as various drill tool assembly design parameters, such as pipe and component dimensions, mechanical properties, and the locations of drill tool assembly components, such as drill collars, stabilizers and drill pipe. It has been observed that the proper modeling of drill pipe tool joints affects certain modes of vibration, and model accuracy depends on including these periodic elements of greater wall thickness, weight, and stiffness in the drill string model. In some implementations, the program may allow for developing and maintaining multiple drill tool assembly design configurations as a storage record of the vibration amplitude ratios obtained for alternative drill tool assembly design configurations.

An exemplary method is provided below, along with the details of a model of the drill tool assembly response to torsional and axial excitations as described in WO 2009/155062. Useful information about the vibration characteristics of a drill tool assembly design under particular operating conditions can be obtained through frequency-domain modeling of the drill tool assembly response to excitations. The modeling is considered more robust because it is adapted to more thoroughly or explicitly incorporate factors previously ignored or represented by mere constants while maintaining tractability and computational efficiency. Exemplary factors that may be incorporated into the present frequency-domain models include drill string component inertial effects, the effect of tool joints on inertial and stiffness properties of the drill string, velocity-dependent damping relationships, drill tool assembly friction, drill bit friction, and complex borehole trajectory effects. Additionally, a number of complex factors influence the aggressiveness (rate of torque generation) and efficiency (energy consumed for penetrating rock in relation to rock strength) of the drill bit. These bit parameters depend heavily on details of the bit geometry, bit condition (new vs. dull), depth-of-cut (DOC) features, bottom-hole hydraulics, rock properties, etc. The model does not attempt to predict these parameters, which are measurable or known to a large degree during drilling operations, but uses them as inputs to analyze the response of the drill tool assembly to excitations caused by the bit action. The model is sufficiently complete that advanced modeling features may be examined, such as coupling between axial and torsional vibrations at the bit, as well as complex surface impedance characteristics, for which both torque and rotary speed may have dynamic variations at the surface, for example. It may also be noted that the effects of some of these parameters increase with increasing string length, and therefore greater model accuracy is required to maintain the vibration severity estimate quality for increasing drill string length.

The data regarding drilling operations may include specific data regarding drilling operating conditions and/or may include drilling operations parameters, which are ranges of available conditions for one or more drilling operational variables, such as WOB, WOH, RPM, fluid density and viscosity, etc. An operational variable is an operational element over which an operator has some control. The methods and systems of the present disclosure may obtain input data, such as for use in the frequency-domain models, from a drilling plan. As used herein, drilling plan refers to the collection of data regarding the equipment and methods to be used in a drilling operation or in a particular stage of a drilling operation.

Figure 2:
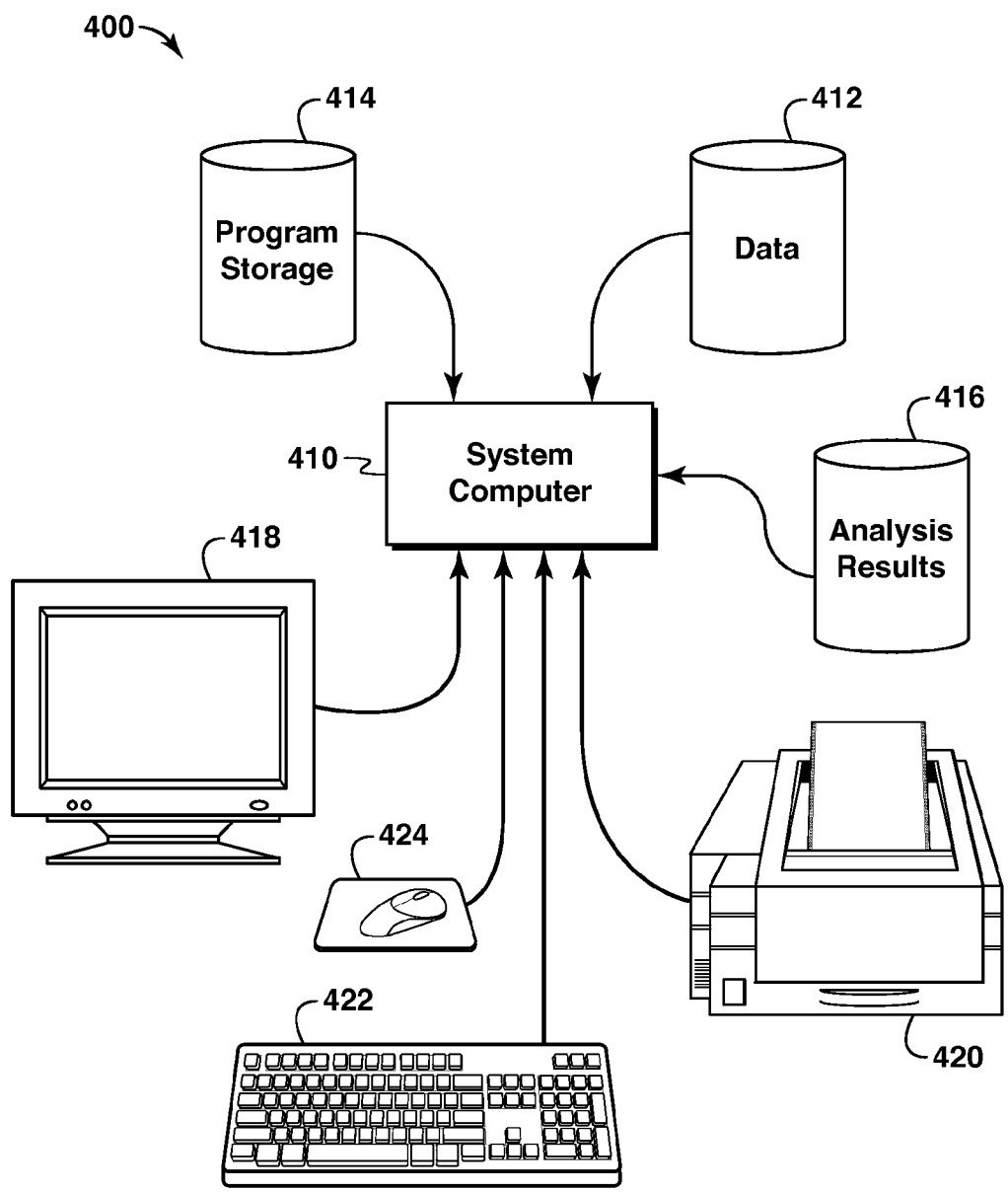
FIG. 2 illustrates a simplified, exemplary computer system in which methods of the present disclosure may be implemented.

FIG. 2 illustrates an exemplary, simplified computer system 400, in which methods of the present disclosure may be implemented. The computer system 400 includes a system computer 410, which may be implemented as any conventional personal computer or other computer-system configuration described above. The system computer 410 is in communication with representative data storage devices 412, 414, and 416, which may be external hard disk storage devices or any other suitable form of data storage, storing for example, programs, drilling data, and post-drill analysis results. In some implementations, data storage devices 412, 414, and 416 are conventional hard disk drives and are implemented by way of a local area network or by remote access. Of course, while data storage devices 412, 414, and 416 are illustrated as separate devices, a single data storage device may be used to store any and all of the program instructions, measurement data, and results as desired.

In the representative illustration, the data to be input into the systems and methods are stored in data storage device 412. The system computer 410 may retrieve the appropriate data from the data storage device 412 to perform the operations and analyses described herein according to program instructions that correspond to the methods described herein. The program instructions may be written in any suitable computer programming language or combination of languages, such as C++, Java, MATLAB™, and the like, and may be adapted to be run in combination with other software applications, such as commercial formation modeling or drilling modeling software. The program instructions may be stored in a computer-readable memory, such as program data storage device 414. The memory medium storing the program instructions may be of any conventional type used for the storage of computer programs, including hard disk drives, floppy disks, CD-ROMs and other optical media, magnetic tape, and the like.

While the program instructions and the input data can be stored on and processed by the system computer 410, the results of the analyses and methods described herein are exported for use in mitigating vibrations. For example, the obtained drill tool assembly data and drilling operations parameters may exist in data form on the system computer. The system computer, utilizing the program instructions may utilize frequency-domain models to generate one or more vibration amplitude ratios. The vibration amplitude ratios may be stored on any one or more data storage devices and/or may be exported or otherwise used to mitigate vibrations. As described above, the vibration amplitude ratios may be used by an operator in determining design options, drill plan options, and/or drilling operations changes. The vibration amplitude ratios may be utilized by the computer system, such as to identify combinations of drilling parameters that best mitigate vibrations under given circumstances.

According to the representative implementation of FIG. 2, the system computer 410 presents output onto graphics display 418, or alternatively via printer 420. Additionally or alternatively, the system computer 410 may store the results of the methods described above on data storage device 416 for later use and further analysis. The keyboard 422 and the pointing device (e.g., a mouse, trackball, or the like) 424 may be provided with the system computer 410 to enable interactive operation. As described below in the context of exemplary vibration amplitude ratios, a graphical or tabular format display of vibration amplitude ratios may require two, three, or more dimensions depending on the number of parameters that are varied for a given graphical or tabular representation. Accordingly, the graphics or table printed 420 or displayed 418 is merely representative of the variety of displays and display systems capable of presenting three and four dimensional results for visualization. Similarly, the pointing device 424 and keyboard 422 is representative of the variety of user input devices that may be associated with the system computer. The multitude of configurations available for computer systems capable of implementing the present methods precludes complete description of all practical configurations. For example, the multitude of data storage and data communication technologies available changes on a frequent basis precluding complete description thereof. It is sufficient to note here that numerous suitable arrangements of data storage, data processing, and data communication technologies may be selected for implementation of the present methods, all of which are within the scope of the present disclosure. The present technology may include a software program that visually characterizes the vibrational performance of one or more drill tool assemblies using one or more of graphical and tabular formats.

In one aspect, the inventive methodology involves use of a "base model" to develop and/or calculate the baseline solution, the frequency eigenmodes, and the dynamic linear response functions for a given set of input parameters. An exemplary model of this nature is provided below, and more details may be found in WO2009/155062. The base model is a dynamic perturbation model of the equations of motion for the drill tool assembly under given input drilling operations parameters and conditions. Although both the zeroth and first order terms in the perturbation expansion are calculated, the dynamic model comprises simply the first order terms in the dynamic variables. Higher order terms in the perturbation theory could be calculated but are not provided here. The tractability and computational simplicity of the present methods are preserved through the use of a robust base model used to determine a baseline solution, or a baseline condition of the drill tool assembly in which no vibration is present. Linear response functions are also developed based on the base model. The linearization of the motion around the baseline solution allows independent linear harmonic analysis of the eigenstates at each vibration frequency and the use of super-position to analyze the overall dynamic motion. In some implementations, the vibration-related factors may be incorporated into the frequency-domain models by way of one or more linear response functions, which in some implementations may be incorporated as a piece-wise wave propagator for which individual pieces of the solution correspond to sections of the drill string that have constant properties, such as inner or outer diameter.

Drill tool assemblies can be considered as slender, one-dimensional objects, and their properties can be effectively described as a function of arc length, l, and time, t. Incorporating in its entirety the methods described in greater detail in WO2009/155062, the configuration of the drill tool assembly can be uniquely defined in terms of a total axial elongation, or stretch, $h(l,t)$, and total torsion angle, or twist, $\alpha(l,t)$. It may be assumed that the borehole exerts the necessary forces to keep the drill tool assembly in lateral equilibrium along its entire length. When the drill tool assembly is in the borehole, it is constrained by the forces imparted to it by the borehole walls, such that its shape closely follows the trajectory of the borehole, which can be tortuous in complex borehole trajectories. The dynamics of the drill tool assembly are represented by partial differential equations along with suitable constitutive relations, external forces and torques, and appropriate boundary conditions at the ends of the drill tool assembly. In some cases, the reference levels of downhole and surface vibration parameters identified above may be applied to the boundary conditions.

Figure 3:
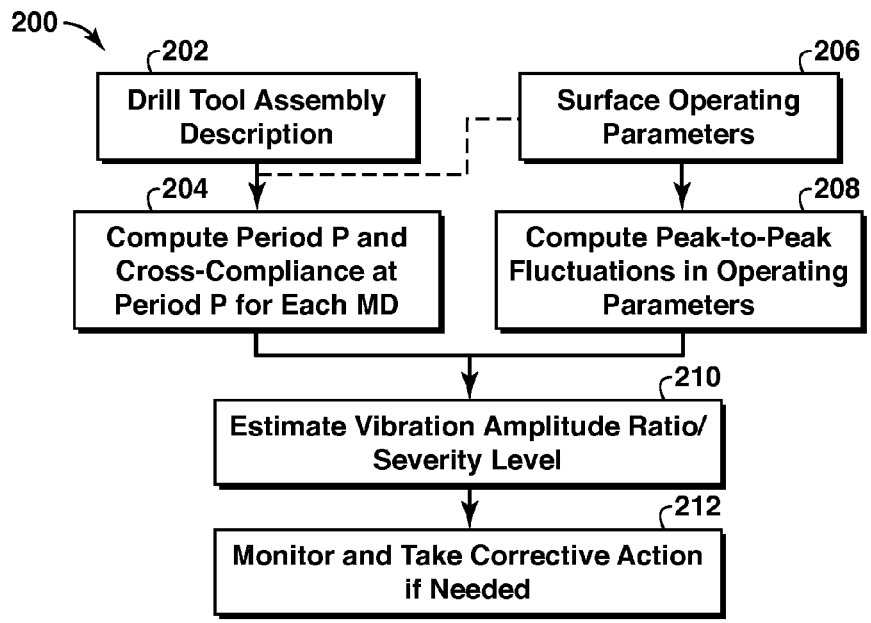
FIG. 3 illustrates an exemplary flow chart demonstrating an exemplary method for performing some aspects of the inventive subject matter.

An exemplary flow chart 200 is presented in FIG. 3 to describe one means of reducing various embodiments of the inventive subject matter to practice. The drill tool assembly description 202, the range of measured depths, and operational RPM ranges are used to compute 204 a) the "primary period" P1 of vibrations, and b) the "cross-compliance" $X_{P1}$ of the drilling assembly at the primary period, from the rotary drive mechanism at the surface through all drilling components to the bit, as a function of measured depth MD. The peak-to-peak operating parameters and periodicity 208 of quantities such as torque, WOH, WOB, and RPM may be determined using surface measurements that are incorporated into the models disclosed herein to estimate downhole operational parameters 210. If necessary, corrective actions or adjustments 212 may be taken at the rig to improve drilling efficiency. The measured amplitude, peak-to-peak fluctuations, periodicity, and other statistical properties of these operating parameters and the model-estimated primary period and cross-compliance are then combined to obtain a vibration amplitude ratio and, based on some reference level for the vibration amplitude ratio, a corresponding vibration severity level. Additionally, other quantities such as normalization factors and other drilling parameters may be used to provide a more comprehensive computation of the vibration amplitude ratio.

Vibration Amplitude Ratio (VAR)

In many embodiments, the inventive methods may determine a vibration amplitude ratio in estimating vibration severity. The vibration amplitude ratio is defined as the ratio of one or more vibration amplitudes at one or more locations. In one aspect, this could for example be a ratio of downhole fluctuations in rotary speed to the average value of the surface rotary speed. Alternatively, this could be represented as a ratio of fluctuations in surface torque to a reference value of torque vibrations estimated from a model. This estimate determines the severity level associated with torsional oscillations, or, simply, the torsional severity estimate (TSE). Other vibration amplitude ratios can be developed including those for axial vibrations, such as an axial severity estimate (ASE).

Estimation and Characterization of Downhole Torsional Vibration Severity

The developments leading to the mathematical relation (63) in WO2009/155062 may be summarized in a generic form, whereby it may be realized that other implementations are feasible within the spirit of this invention. As WO2009/155062 contains a complete description of the governing drill string physics, this reference may be considered to be available for use with some embodiments of the methods disclosed herein. The model disclosed therein makes the so-called "soft-string" approximation, i.e. it assumes that the drill string has negligible bending stiffness. The use of a "stiff-string" model that includes drill string bending stiffness may also be used within the scope of the invention described herein.

The state vector $[\alpha_P(l), \tau_P(l)]^T$ represents a harmonic torsional wave along the drill tool assembly. Here, $\alpha_P(l)$ and $\tau_P(l)$ are the (complex) twist and torque amplitudes of the wave mode of period P at a distance l from the bit end, respectively. For this mode, the actual harmonic twist angle (in radians) and torque are given as a function of position l and time t by:

$$\alpha(l,t) = Re[\alpha_P(l)e^{2\pi jt/P}].$$

$$\tau(l,t) = Re[\tau_P(l)e^{2\pi jt/P}]. \quad (1)$$

Here, Re represents the real part and j is the imaginary number. A 2×2 transfer matrix $S_P(l,l')$ relates the state vectors at two different positions along the drilling assembly:

$$\begin{bmatrix} \alpha_P(l') \\ \tau_P(l') \end{bmatrix} = S_P(l, l') \begin{bmatrix} \alpha_P(l) \\ \tau_P(l) \end{bmatrix}. \quad (2)$$

In one embodiment disclosed herein, Eq. (87) and (96) below are representative Sp matrices. Of particular interest is the transfer matrix that relates the state at the bit end to the state at the surface (rig) end: $S(MD, 0) = S^{-1}(0, MD)$. For harmonic motion with period P, the corresponding states at the bit and surface end are given by:

$$\begin{bmatrix} \alpha_P^{bit} \\ \tau_P^{bit} \end{bmatrix} = S_P(MD, 0) \begin{bmatrix} \alpha_P^{rig} \\ \tau_P^{rig} \end{bmatrix}. \quad (3)$$

The baseline solution, frequency eigenstates, and linear response functions provided by the base model may be used with the techniques taught and claimed herein to evaluate bit bounce and stick-slip tendencies of drill tool assembly designs, which may be by means of "vibration indices" derived from these results. Specifically, the effective torsional compliance of the drill tool assembly at the bit position is defined as:

$$CT_P^{bit} = \frac{\alpha_P^{bit}}{\tau_P^{bit}}. \quad (4)$$

The torsional compliance relates the angular displacement amplitude to the torque amplitude. The compliance is a complex function of frequency, $\omega$, and has information on both the relative magnitude and phase of the oscillations. Detrimental behavior associated with torsional vibrations can potentially occur at resonant frequencies of the drill tool assembly, where "inertial" and "elastic" forces exactly cancel each other out. When this occurs, the real part of the compliance vanishes:

$$Re[CT_{P_n}^{bit}] = 0; n=1,2, \quad (5)$$

The resonant frequencies of the drill tool assembly have an associated period of oscillation, Pn (seconds). For instance, the first fundamental mode has a period of oscillation, P1 (seconds).

The cross-compliance is defined for a particular harmonic mode with period P (seconds) as the ratio of the vibration amplitude at the bit (for instance, RPM) to the vibration amplitude (for instance, torque) at the surface (here 60/P represents the number of periods per minute):

$$X_P = \frac{60 \cdot \alpha_P^{bit}}{P \cdot \tau_P^{rig}} = \left( \begin{bmatrix} 0 & \frac{P}{60} \end{bmatrix} \cdot S_P(0, MD) \cdot \begin{bmatrix} 1 \\ 1/CT_P^{bit} \end{bmatrix} \right)^{-1}. \quad (6)$$

In order to make an accurate estimate of the downhole RPM fluctuations, it is useful to identify the dominant harmonic mode P. This will depend on the type of torsional oscillations that are present. In particular, there are two specific types of torsional behavior of interest: (i) unstable torsional vibrations associated with the resonant modes, often the primary or fundamental period P1 (stick-slip), and (ii) forced torsional vibrations associated with the periodic excitation of the drill tool assembly at a particular frequency.

As a simple illustrative example of this general method, as well as in order to introduce an alternate embodiment, consider a very simple drilling tool assembly configuration that consists of a uniform drill string of length L and torsional stiffness GJ (where G is the shear modulus of the drill string material and J is its torsional moment of inertia) attached to a Bottom Hole Assembly (BHA) that is much stiffer, much shorter and with a much larger torsional moment of inertia. For the first resonant mode, the twist and torque have the following form:

$$\alpha(l, t) = \alpha_{P1}^{bit}(1 - l/L)\sin(2\pi t/P1)$$

$$\tau(l, t) = GJ \frac{\partial \alpha}{\partial l} = -\frac{GJ}{L} \alpha_{P1}^{bit} \sin(2\pi t/P1).$$

The rig-to-bit transfer matrix has the simple form $$S_{P1}(L, 0) = \begin{bmatrix} 1 & -L/GJ \\ 0 & 1 \end{bmatrix}.$$

For this simple case the RPM fluctuations at the bit can actually be deduced from the time derivative of the surface torque signal, along with the known information about the drill string (G, J and L):

$$\frac{\partial \tau(L, t)}{\partial t} = -\frac{2\pi}{P1} \frac{GJ}{L} \alpha_{P1}^{bit} \cos(2\pi t/P1) = -\frac{GJ}{L} \frac{\partial \alpha(0, t)}{\partial t}.$$

On the other hand, if the BHA has negligible torsional moment of inertia, the twist and torque have the following form:

$$\alpha(l, t) = \alpha_{P1}^{bit} \cos(\pi l/2L) \sin(2\pi t/P1)$$

$$\tau(l, t) = GJ \frac{\partial \alpha}{\partial l} = -\frac{\pi GJ}{2L} \alpha_{P1}^{bit} \sin(\pi l/2L) \sin(2\pi t/P1).$$

Thus, a similar relationship can be established:

$$\frac{\partial \tau(L, t)}{\partial t} = -\frac{2\pi}{P1} \frac{\pi GJ}{2L} \alpha_{P1}^{bit} \cos(2\pi t/P1) = -\frac{\pi GJ}{2L} \frac{\partial \alpha(0, t)}{\partial t} \ldots$$

Note that the two results are very similar, the key difference being a multiplicative factor of $\pi/2$.

In other more general situations with a more complex drill tool assembly model, more complex boundary conditions, or other vibration modes of interest, the general method outlined here and described in more detail in WO 2009/155062, an exemplary embodiment, can be used to compute a more accurate proportionality factor $C_p$ that relates the time derivative of the surface torque to the RPM fluctuations at the bit:

$$\frac{\partial \tau(L, t)}{\partial t} = -C_P \cdot \frac{GJ}{L} \frac{\partial \alpha(0, t)}{\partial t},$$

wherein L and GJ are now the total length and the torsional stiffness of the uppermost drill string section of the drill tool assembly, respectively. Depending on the application and utility of the vibration severity estimates, the accuracy of the results may be more or less critical.

One practical benefit of this method is that it automatically detrends the average or slowly varying portions of both signals, i.e., it is not sensitive to the slowly varying baseline torque and RPM. It is also not necessary to separately keep track of the period P1. However, in some instances reliability may be somewhat compromised from noisy measurements, so the sampling rate has to be sufficiently frequent to allow a good determination of the time derivative; alternatively, the use of more sophisticated methods may be applied to obtain a smoother estimate of the derivative. Also, it may be necessary to increase the surface data acquisition recording rate to facilitate the torque derivative method described above.

Using a combination of several downhole vibration severity estimation methods can potentially improve the robustness of the overall method. For example, alternate means of processing surface parameter data may lead to different values for the torsional severity estimate. Average values and other means of combining the results of multiple measurements may be used to seek the best estimate. These different TSE estimates, from both individual and combined parameters, may be evaluated using quality factor calculations in wells for which downhole measurements are available. This calibration process will help to determine the optimal means for processing surface measurement data to assure that the torsional severity estimates have the highest quality factors possible.

Figure 4:
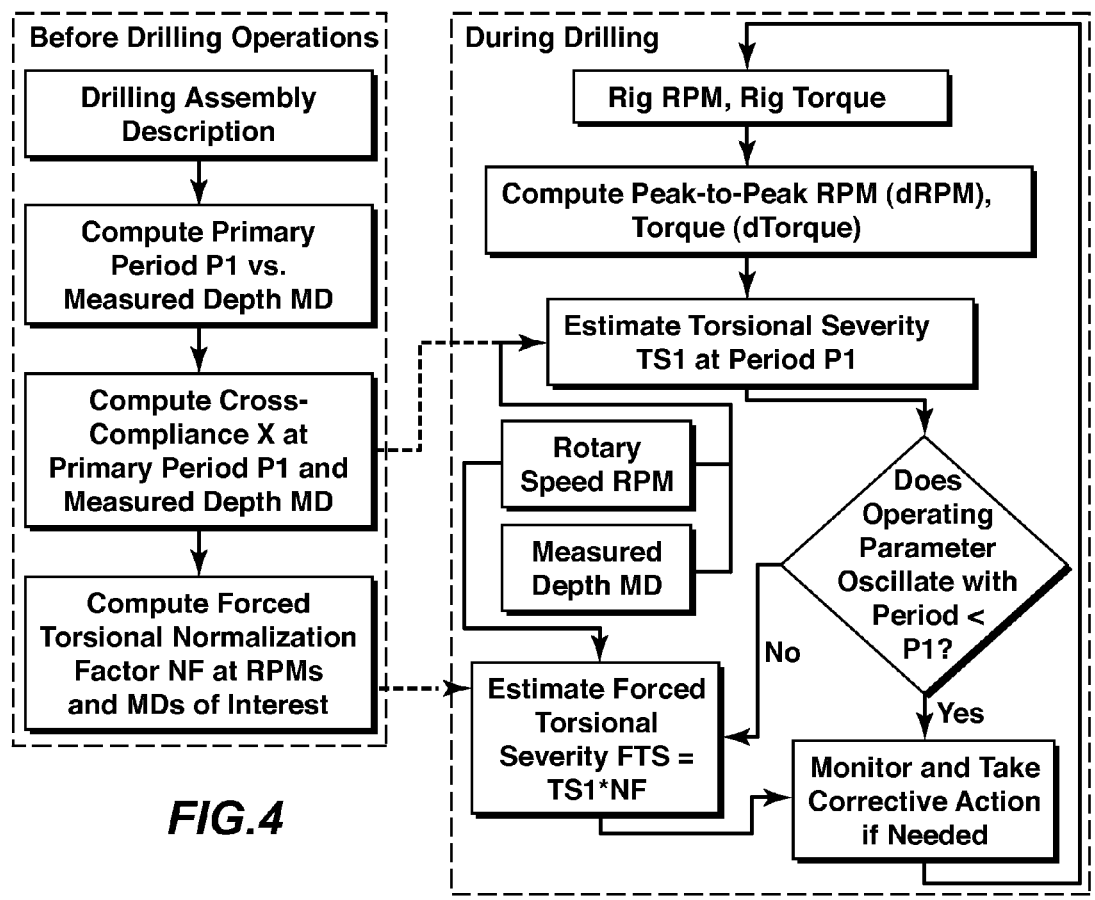
FIG. 4 provides an exemplary scheme for computing a Torsional Severity Estimate (TSE) based on a cross-compliance at a period P1.
Figure 5:
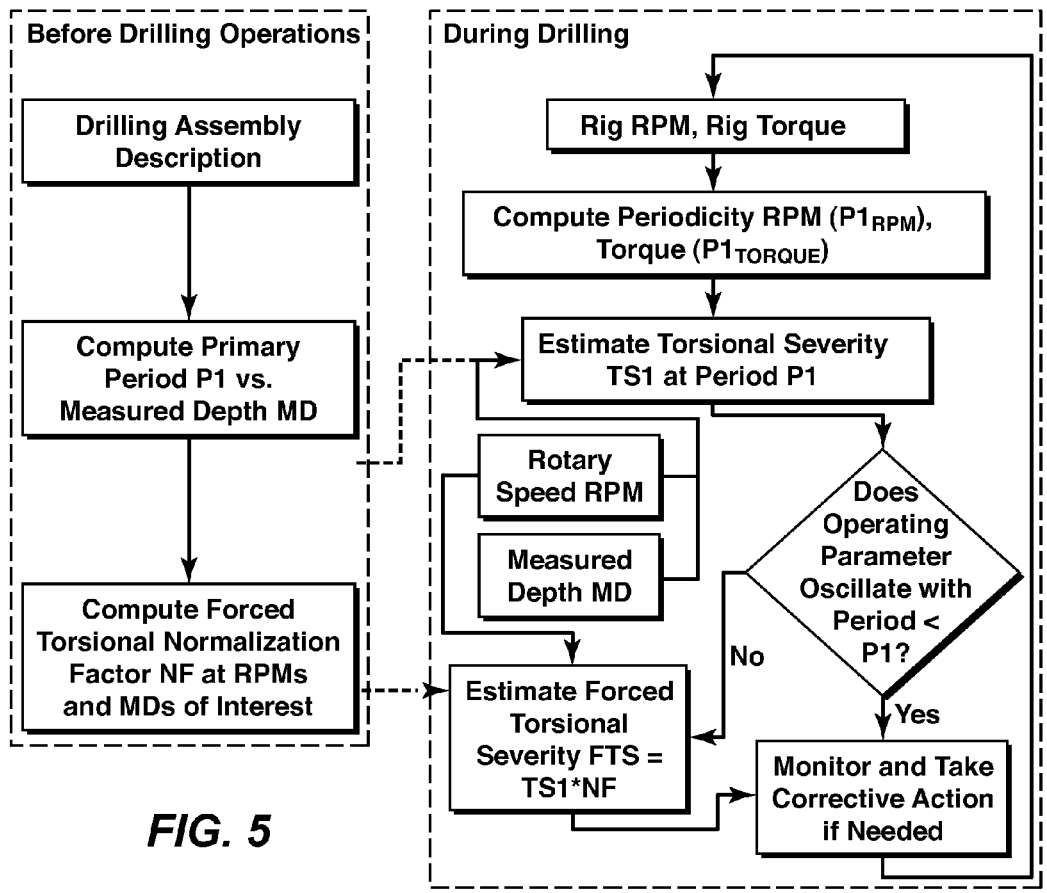
FIG. 5 provides an exemplary scheme for computing a Torsional Severity Estimate (TSE) based on a primary period P1.

Exemplary flow charts are presented in FIG. 4 and FIG. 5 as some examples of various embodiments for how the inventive methods may be reduced to practice. Prior to the start of drilling a section of a well, the drill tool assembly description, the range of measured depths and operational RPM ranges are used to compute a) the "primary period" P1 of torsional/axial vibrations, and b) the "cross-compliance" $X_{P1}$ of the drilling assembly at the primary period, as a function of measured depth MD. These quantities are then provided to the surface monitoring system in the form of look-up tables, plots, or interpolating functions, to be used for real-time computations to monitor modal vibration severity during drilling. The severity of the nth resonant torsional vibration is referred to as "TSEn." If there is also a need to monitor forced torsional vibration severity, "normalization factors" NF can also be pre-computed as a function of RPM and MD and provided to the surface monitoring system.

Although all computations could in principle be carried out in the surface monitoring system, pre-computation of P1, X and NF allows specialized software to be utilized, possibly at a central location by qualified users, for these computations. This not only significantly reduces the real-time processing power needed in the surface monitoring system, but also circumvents the problem associated with compatibility and inter-usability amongst various systems that might be deployed at various drilling locations. The advent of modern web-based applications based on streaming data from the drilling rig may also enable alternate implementations of these methods.

Unstable Torsional Behavior: Unstable torsional vibration is reflective of downhole torque fluctuations from various origins and is typically associated with a dynamic instability or near-instability of the downhole drilling assembly. "Unstable torsional oscillations," commonly referred to as "stick-slip," have a characteristic period P that is determined primarily by the drilling assembly design parameters such as material properties (steel), dimensions (length, OD, ID, relative position along the assembly), and the measured bit depth (overall length of the drilling assembly). An exemplary calculation of this period can be obtained with a torsional harmonic wave mode in a drill tool assembly system with a "fixed" dynamic boundary condition at the rig end (corresponding to a constant rotary speed imposed by the rig control system) and a "free" dynamic boundary condition at the bit end (corresponding to a constant torque at the bit).

Primary Period: For the aforementioned boundary conditions, we are interested in states in which $\alpha_{rig} = \tau_{bit} = 0$. Note that $\alpha_{rig}$ and $\tau_{bit}$ refers to the dynamic twist and torque amplitudes, i.e. they are differences between the current values of those variables and their average, steady-state values. A solution to the transfer matrix equation with these constraints exists only for specific values of the harmonic period P. There exists a sequence of such modes of decreasing periods, whereby each successive mode shape in the sequence has one more "node" (position along the drilling assembly with no harmonic motion, i.e., $\alpha=0$). These are referred to herein as "resonance modes" of the drilling assembly. Of particular interest is the mode with the longest period (P1), which has its only node at the surface (rig) end. During unstable stick-slip, the primary contributions to the torque oscillations observed at the rig end arise from this mode. A number of search algorithms are known that can be employed to identify this period P1. This period increases as a function of measured depth (MD) and is commonly in the range from approximately two to eight seconds for typical drilling assemblies and MD's.

The relevant dynamic boundary conditions at the surface (rig) end may be different under special circumstances; notably if different types of rotary speed controllers such as Soft-Torque™ and Soft-Speed™ are used. In that case, the appropriate boundary condition at the surface, along with $\tau_{bit}=0$, must be applied to solve for P1. In general, if the boundary condition at the surface is not known, it is possible to determine the effective boundary condition by measuring both torque and rotary speed and constructing the effective rig compliance from the measurements, using one of several state variable observer methods.

Unstable Torsional Severity (TSEu): When the period P is known as a function of MD, the cross-compliance at the primary period can be pre-computed for the section to be drilled. During drilling, the surface monitoring system may use the real-time MD and model results to compute TSEu as described above. Typically, the unstable torsional severity is associated with the primary resonant mode with period P1 and is equal to the torsional severity TSE1 evaluated at period P1. TSEu is also referred to herein in by the often commonly used vernacular of "unstable stick-slip" (USS), but the term TSEu is preferable as it reminds that the value is only an estimate. However, the terms are interchangeable.

Forced Torsional Behavior: A second potential source of severe torsional oscillations is associated with the periodic excitation of the drilling assembly at a particular frequency. In most cases, the excitation occurs at or near the bit, at a multiple of the rotary speed (RPM). If this excitation period is close to one of the resonant mode periods of the drilling assembly (see above) large fluctuations may result, leading to stick-slip. Often, the primary excitation at period P=60/RPM is the dominant excitation so if the primary period is not observed in the torque signal and the actual periodicity is not observable, this value can be assumed in order to provide a conservative estimate of forced stick-slip. In this case, the cross-compliance is computed for a range of periods corresponding to the expected RPM ranges and depths. These are then converted to normalization factors using the relationship:

$$NF = \frac{X_{60/RPM}}{X_{P1}}. \quad (7)$$

An exemplary calculation for torsional severity estimation during drilling may be made using the streaming surface torque signal in the following way. The torsional vibration amplitude is computed as the "peak-to-peak torque," delta-Torque, or dTorque, and consequently may be used to estimate the torsional severity TSE1:

$$TSE1 = \frac{\text{Downhole Peak-to-Peak } RPM}{2 \times \text{Surface } RPM} \approx \frac{\|X_{P1}\| * dTorque}{2 \times RPM}. \quad (8)$$

Alternatively, TSE1 can be obtained using the concept of a reference dTorque. The reference dTorque as calculated from the model cross-compliance and the surface RPM is a reference surface condition associated with full stick-slip at the bit. This quantity represents the torque fluctuation level corresponding to a condition where the bit oscillates between 0 and two times the average RPM. The reference dTorque, $dT_o$, can be obtained for a range of rotary speeds and is obtained as:

$$dT_o = \frac{2RPM}{\|X_{P1}\|}. \quad (9)$$

Consequently, the estimated torsional severity is then obtained as:

$$TSE1 = \frac{d\text{Torque}}{dT_o}. \quad (10)$$

Additionally and alternatively, TSE1 can be obtained by identifying the reference time-derivative of the surface torque signal for the particular mode of interest:

$$\left(\frac{d\tau}{dt}\right)_{ref} = C_P \frac{GJ}{L} \frac{2\pi RPM}{60}.$$

Consequently, the estimated torsional severity is obtained as:

$$TSE1 = \frac{\left\|\frac{d\tau^{rig}}{dt}\right\|}{\left(\frac{d\tau}{dt}\right)_{ref}}$$

There may be alternate ways to represent torsional severity that are known to those skilled in the art, and TSE1 can be converted to any one of these alternate representations if desired. Here, a value of TSE1 less than 1 represents RPM fluctuations at the bit that do not involve actual stopping or reversal of bit rotation, whereas a value larger than 1 corresponds to actual "sticking" or stopping of the bit during the cycle and should be a cause for concern.

This computation will provide a value for TSE1 continuously, regardless of whether the dominant torsional behavior associated with the fundamental mode is present or not. If the value reported to the driller is a cause for concern, the driller can verify that unstable stick-slip is present by inspecting the torque indicator and noting that the torque fluctuations have a characteristic period close to or slightly longer than P1. This period is dependent on the MD and increases with increasing MD. For typical drilling operations, this period is in the range of 2-8 seconds and is easily observable. If confirmed, the driller can take corrective action as desired.

If the torque oscillations have a significantly smaller period or no period is easily discernible due to sampling rate limitations, it is likely that "forced vibrations" are dominant. In this case, the surface monitoring system can be configured to display the forced torsional severity FTS instead. This is estimated by multiplying TSE1 with the appropriate "normalization factors" NF:

$$TSEf = \frac{\text{Downhole Peak-to-Peak } RPM}{2 \times \text{Surface } RPM} \approx TSE1 * NF \quad (11)$$

Alternatively, the surface monitoring system can display both forced and resonant vibration amplitude ratios and the driller can consider the appropriate severity level depending on the period of the dynamic torque signal. Both the nth resonant torsional severity estimate, TSEn, and the forced torsional estimate, TSEf (also sometimes called Forced Stick Slip (FSS)), can be combined into one or more torsional vibration amplitude ratios or torsional severity estimates (TSE). Other methods can be adopted to identify when these estimates can be used. For instance, if the surface monitoring system is capable of real-time spectral analysis, the torque signal can be analyzed for the prevalent period to automatically decide the type of stick-slip that is present, and the appropriate severity level can then be displayed. It is beneficial to the driller to know the type of torsional oscillations as well as the severity, since mitigation measures may be different for each type.

Figure 6:
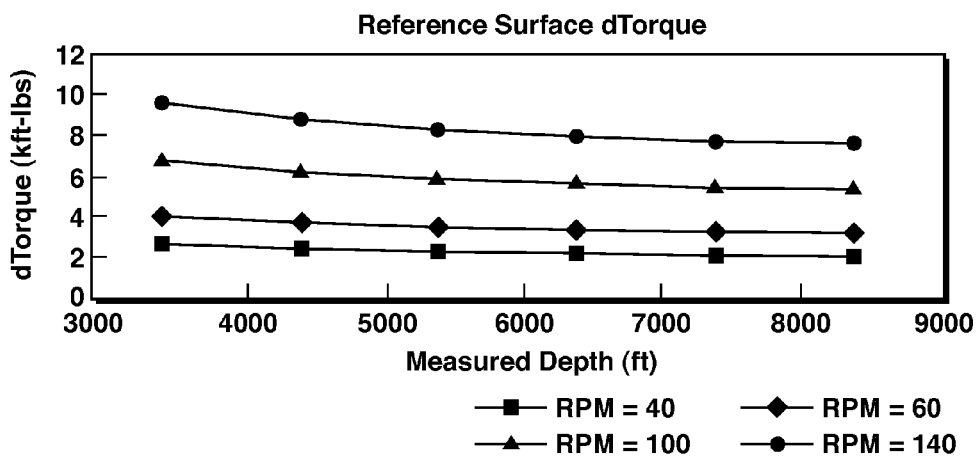
FIG. 6 demonstrates an exemplary reference surface dTorque as a function of measured depth.

In one exemplary embodiment, a reference surface dTorque ($dT_0$) can be obtained by calculating the cross-compliance at the stick-slip period using the drill tool assembly description and the rotary speed. This calculation is obtained based on a spectral analysis method wherein at any given time a specific frequency associated with the stick-slip period is used to extract the cross-compliance. A plot of the reference surface dTorque as a function of measured depth and RPM is outlined in FIG. 6. This plot represents an exemplary form of the dTorque as a function of these quantities. When the measured surface dTorque is less than the reference surface dTorque (TSE1<1), then the bit is in torsional oscillations. When the measured surface dTorque is equal to the reference surface dTorque, then the bit is in full stick-slip (TSE1=1). When the measured surface dTorque is greater than the reference surface dTorque (TSE1>1), then the bit is more than full stick-slip and stops for a portion of the cycle.

Another aspect to note here is that as the RPM increases, the reference surface dTorque also increases. In other words, there is a greater capacity to allow dTorque without encountering actual stopping of the bit, i.e., there is an increased "dTorque margin." Other alternate representations of the reference surface dTorque include descriptions in tabular form and a fitted equation that describes the reference surface dTorque per unit RPM as a function of measured depth. Yet another alternate representation is to directly incorporate the cross-compliance instead of the concept of reference surface dTorque.

As noted above, the reference surface dTorque is obtained based on the fundamental period P1 at each Measured Depth. Thereby, the reference surface dTorque associated with forced torsional severity is incorporated to obtain more conservative reference surface dTorque values.

Figure 7:
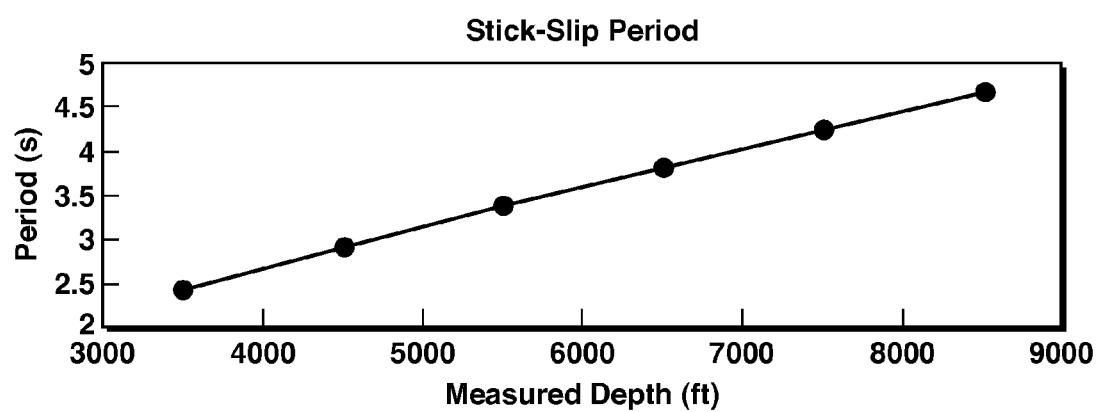
FIG. 7 demonstrates an exemplary fundamental Stick-Slip Period P1 as a function of measured depth.

In one embodiment, the period associated with reference torsional oscillations can be described in terms of the measured depth. An exemplary chart is provided in FIG. 7 that illustrates the fundamental stick-slip period P1 varying between 2-5 seconds at depths of 3000-9000 ft. A measured torsional period at the rig that is greater than the value indicated for the specific depth, drill string, and other drilling parameters suggests that the bit is stopping for a portion of time during operation, corresponding to TSE1>1. In this case, the ratio of the measured period to the computed period can be used to identify torsional severity level, as this ratio increases with increasing severity. The measured period is expected to be substantially similar to the computed value when the torsional oscillations are less severe (TSE1<1), and the time period itself does not provide a direct measure of the torsional severity beyond this information.

A chart of this form can be obtained either during real-time operations or pre-calculated beforehand. The benefit of such a chart in real-time operations is that the precise period of interest can be obtained along with information on stoppage time and the severity of the torsional oscillations. Alternatively, the chart can be described in a tabular form.

Characterization and Estimation of Axial Vibration Severity

The calculation of axial vibration amplitude ratio and axial severity may be accomplished using similar methods to that described above for the torsional mode. There may be a variety of embodiments of axial drill string vibration models that may be used to calculate the compliance factor considered below. The exemplary embodiment is the physics model described in WO 2009/155062. In this reference, the discussion leading up to equation (45) describes the modeling of axial vibrations that includes consideration of all the forces and moments acting on a drill string, assuming what is known as a "soft-string" model, i.e. with no bending stiffness of the string. The use of a "stiff-string" model that includes drill string bending stiffness may also be used within the scope of the invention described herein.

In a similar manner to the torsional vibration mode, the state vector $[hp(l), Tp(l)]^T$ represents a harmonic axial wave along the drill tool assembly. Here, hp(l) and Tp(l) are the (complex) stretch and tension amplitudes of the wave mode of period P at a distance l from the bit end, respectively. For this mode, the actual harmonic twist angle (in radians) and torque are given as a function of position l and time t by:

$$h(l,t) = Re[h_P(l)e^{2\pi jt/P}].$$

$$T(l,t) = Re[T_P(l)e^{2\pi jt/P}]. \quad (12)$$

Here, Re represents the real part and j is the imaginary number. A 2×2 transfer matrix $S_P(l,l')$ relates the state vectors at two different positions along the drilling assembly:

$$\begin{bmatrix} h_P(l') \\ T_P(l') \end{bmatrix} = S_P(l, l') \begin{bmatrix} h_P(l) \\ T_P(l) \end{bmatrix}. \quad (13)$$

Of particular interest is the transfer matrix that relates the state at the bit end to the state at the surface (rig) end: $S(MD, 0) = S^{-1}(0, MD)$. For harmonic motion with period P, the corresponding states at the bit and surface end are given by:

$$\begin{bmatrix} h_P^{bit} \\ T_P^{bit} \end{bmatrix} = S_P(MD, 0) \begin{bmatrix} h_P^{rig} \\ T_P^{rig} \end{bmatrix}. \quad (14)$$

In one embodiment disclosed herein, Eq. (69) and (93) below are representative Sp matrices. It is generally understood (see, for example, Clayer et al. SPE 20447) that unlike torsional excitations, axial excitations typically manifest themselves as "displacement sources" and the typical dysfunction of "bit bounce" manifests itself as a dynamic fluctuation of WOB whose amplitude exceeds the average WOB. Thus, an analysis analogous to the torsional case can be done for axial vibrations. Of particular concern are harmonic axial modes in which small displacements at the bit may cause large WOB fluctuations, which can be identified through the effective axial impedance of the drill tool assembly at the bit position:

$$ZA_P^{bit} = \frac{T_P^{bit}}{h_P^{bit}}. \quad (15)$$

Naturally, this impedance will depend on the axial boundary conditions at the rig end, which can be identified for a particular rig and specific rig configuration. Factors that affect the axial compliance include the block height, mass of the traveling equipment, and number of drilling lines in use. At axial resonant frequencies of the drill tool assembly, the real part of the impedance vanishes:

$$Re[ZA_{P_n}^{bit}] = 0; n=1,2, \quad (16)$$

In this case, the measurement that is readily available at most rig systems is the weight-on-hook (WOH), so the response function of interest is the amplification factor that relates WOH fluctuations at the surface to WOB fluctuations at the bit:

$$A_P = \frac{T_P^{bit}}{T_P^{rig}} = \left( [0 \ 1] \cdot S_P(0, MD) \cdot \begin{bmatrix} \frac{1}{ZA_P^{bit}} \\ 1 \end{bmatrix} \right)^{-1}. \quad (17)$$

If an accelerometer measurement is available at the rig end, a person skilled in the art can alternatively utilize a cross-compliance that relates accelerations at the surface to WOB fluctuations at the bit instead, based on the teachings of this disclosure.

An exemplary calculation for axial severity during drilling can be made using the streaming surface signal to compute the hookload vibration amplitude as the "peak-to-peak hookload," delta-Hookload, dHookload, or dWOH, and consequently estimate the axial severity estimate ASE1:

$$ASE1 = \frac{\text{Downhole Peak-to-Peak } WOB}{2 \times \text{Average } WOB} \approx \frac{\|A_{P1}\| * dWOH}{2 \times WOB}, \quad (18)$$

where ASE1 is estimated using the amplification factor $A_{P1}$ evaluated at the fundamental period P1. Alternatively, ASE1 can be obtained using the concept of a reference dWOH that is associated with bit bounce. The reference dWOH represents the hookload fluctuation level corresponding to a condition where the bit oscillates between 0 and two times the intended surface WOB. The reference dWOH can be obtained for a range of WOB conditions and is obtained as:

$$dWOH|_{ref} = \frac{2WOB}{\|A_{P1}\|}. \quad (19)$$

Consequently, the estimated axial severity is then obtained as:

$$ASE1 = \frac{dWOH}{dWOH|_{ref}}. \quad (20)$$

If the hookload oscillations have a significantly smaller period, or if no period is easily discernible due to sampling rate limitations, it is likely that "forced vibrations" may be the dominant characteristic. In this case, the surface monitoring system can be configured to display the forced axial severity ASEf instead. This is estimated by multiplying ASE1 with the appropriate "normalization factors" NF:

$$ASEf = \frac{\text{Downhole Peak-to-Peak } WOB}{2 \times \text{Surface } WOH} \approx ASE1 * NF. \quad (21)$$

Vibration Amplitude and Time Period Estimation from Surface Signals

Figure 8:
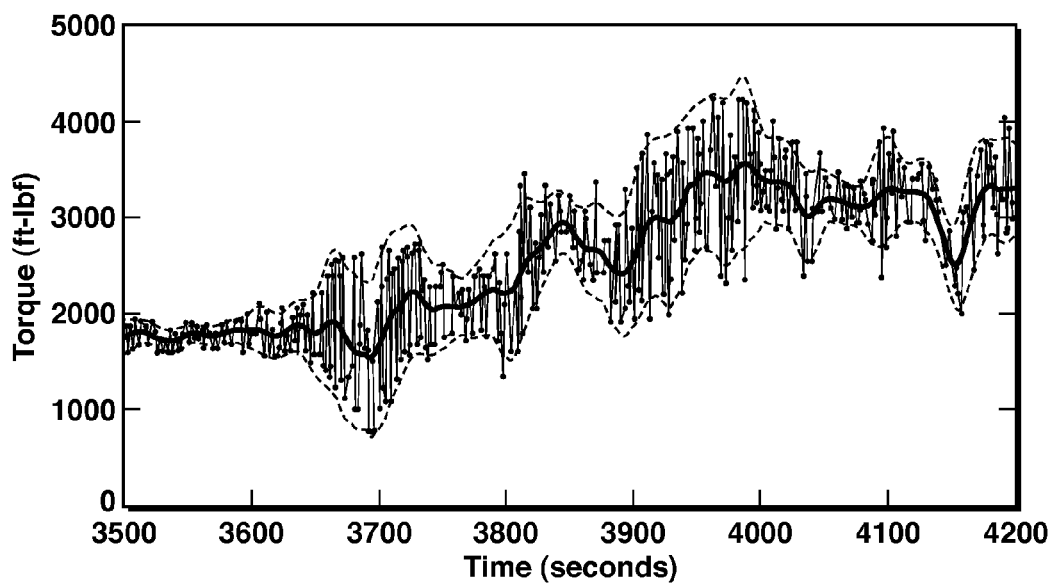
FIG. 8 provides an illustration of exemplary data whereby the surface operation parameter is Torque and the peak-to-peak surface parameter is dTorque.

Various methods to measure vibration amplitudes and periods associated with a real-time signal stream are known in the art. In an ideal situation where all of the peak-to-peak surface signal fluctuations can be attributed to a single harmonic mode, the peak-to-peak vibration amplitude corresponds to the difference between the maximum and minimum amplitudes of the surface operating parameter. In reality, a surface signal such as illustrated in FIG. 8 (surface torque in this example) is affected by a slowly varying trend, additional noise, as well as sub-dominant harmonic modes. In one embodiment, a near-real-time estimate of the amplitude of the dominant harmonic mode can be made by observing the most recent surface signature readings over a time window that is larger than the longest anticipated period but short enough to reflect near-real-time conditions.

According to some embodiments, an exemplary window size may be between 2 to 10 times the expected primary period P1 at that time, to facilitate obtaining an accurate estimate of an average value as well as a peak-to-peak envelope for the surface signal. In the exemplary case of FIG. 8, a window size of 30 seconds is used. Within each window, the running average of the surface torque provides the average value, and an envelope marking the maximum and minimum values of the signal function is used to identify the vibration amplitude dTorque. Alternatively, the amplitude can be obtained by doubling the difference between the maximum and average values of the surface operating parameter within the time window. Though this method may not always be desired, in some data acquisition systems this data is currently available without modification and is approximately correct, assuming a uniform sinusoidal vibration pattern. In this instance, the available surface data of $X_{average}$ and $X_{maximum}$ over a suitable time window can be used to compute the "delta-X" value dX, where X refers to a quantity such as Torque, Hookload and/or RPM. Here, $$dX = 2*(X_{maximum} - X_{average}) \quad \text{or} \quad dX = (X_{maximum} - X_{minimum}).$$

Another approach is to calculate the standard deviation of a time series in a rolling data buffer, wherein the new values displace the oldest values and the data window is continually refreshed. The constant or steady-state component is eliminated from the standard deviation calculation, and if the oscillating part is represented as a sinusoidal wave $X(t) = A \sin(2\pi t/P)$ then the standard deviation may be found as $\sigma_X = A/\sqrt{2}$. Using the notation above, the "delta-X" for this parameter is then found to be $$dX = \sigma_X 2\sqrt{2}. \quad (22)$$

Still other methods are known for computing vibration amplitude, both offline and online. One offline method, which may involve only a slight time delay in the availability of the calculation results, is a phase-compensated moving average filter that can be used to compute the envelope of the surface operating parameter signal. Other methods may include computing a peak-to-peak value from a real-time data stream, including methods to reduce the effect of noise, including filtering. All such methods to obtain the peak-to-peak surface operating parameter fluctuations are within the scope of this invention. In certain instances, if downhole operating parameter fluctuations are available, these can then be used to obtain improved accuracy.

Figure 9:
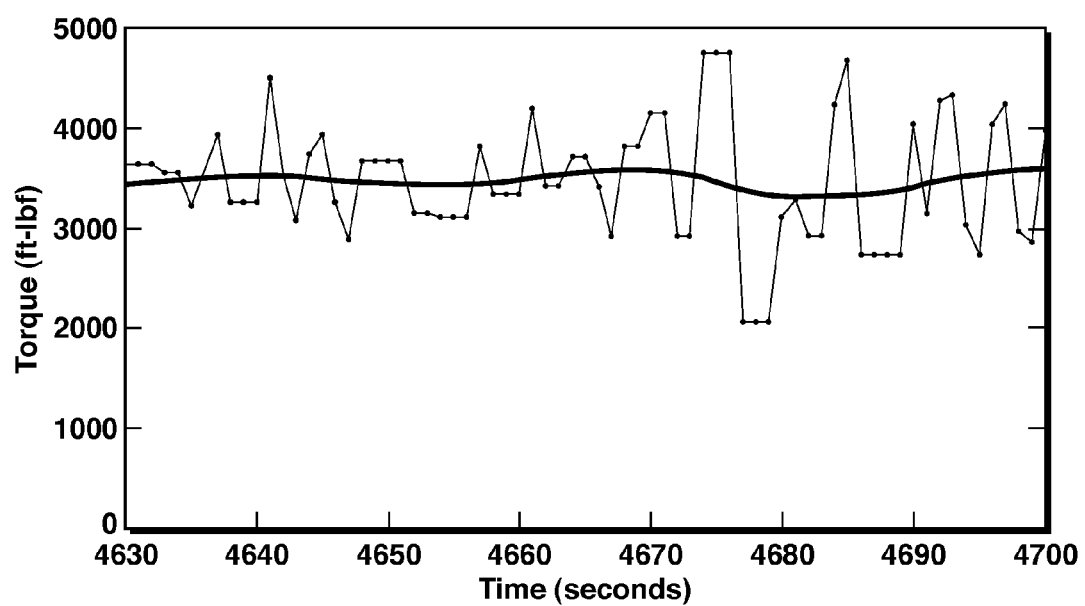
FIG. 9 illustrates a method for estimating dTorque using downward crossing of the surface torque with its moving average.

The period of oscillation may also be estimated from the surface signals such as surface torque, hookload, and RPM. An exemplary illustration of how this can be accomplished is provided in FIG. 9, where a surface signal (Torque) is acquired once every second (dt=1 second). The moving average is calculated over a suitably determined time window (30 seconds in this example), and whenever the signal crosses this moving average in the downward direction, a "crossing time"

is estimated by linear interpolation. The time interval P between successive downward crossing events defines a cycle. For each such cycle, the duration provides an estimate of the oscillation period, and the difference between the maximum and minimum values of the signal within that cycle provides an estimate of dTorque. Additionally and alternatively, some smoothing can be performed to these estimates to make them more robust, at the cost of incremental time delay needed to identify a dysfunction. For example, such smoothing can take the form of using the average or median of several successive estimates. An alternate methodology is to use time-frequency analysis techniques including Fourier transforms, Wagner-Ville transforms, Hilbert Huang transforms, and wavelet transforms to identify the significant period(s) over individual time windows. Through these methods, a measure of the actual period may be obtained.

The estimates of significant period(s) can be used to obtain more information about the downhole scenario. In one embodiment, knowledge of the reference peak-to-peak fluctuations in surface parameters and the reference period(s) associated with the dominant harmonic modes can be combined with information about the identified periods over the specified time intervals to obtain precise information on the extent of the "stopped" time. In an alternate embodiment, if this period is observed to be greater than the estimated fundamental period or other significant periods, a measure of the stopped time (the time that the bit stops rotating during any given cycle) can be obtained by direct comparison of the estimated and measured periods.

Figure 10A:
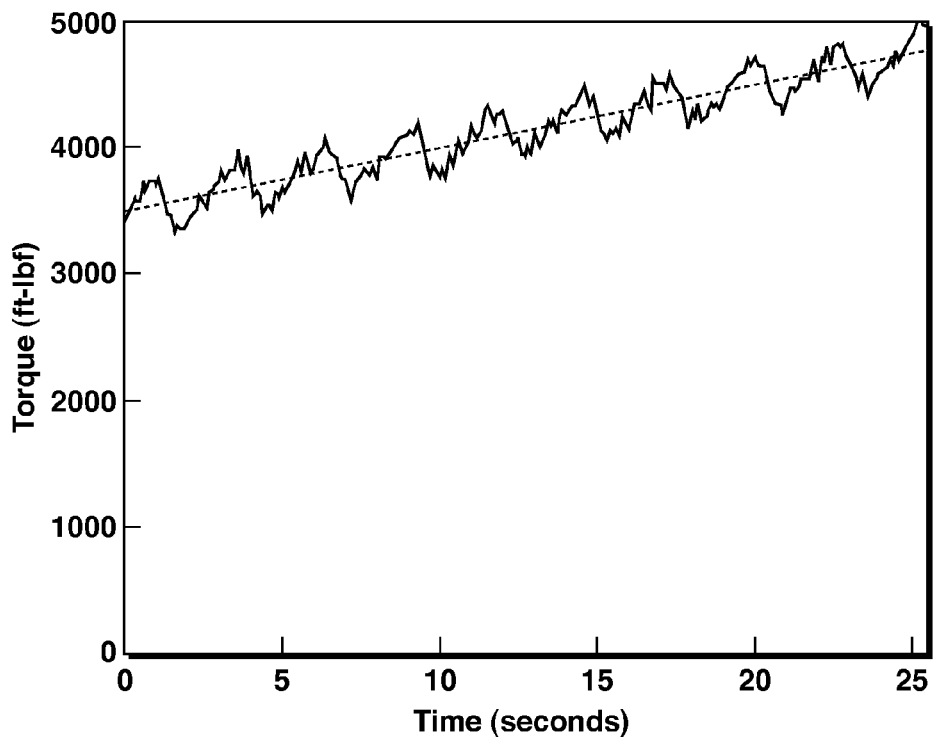
FIG. 10A provides an illustration of an exemplary surface torque signal.
Figure 10B:
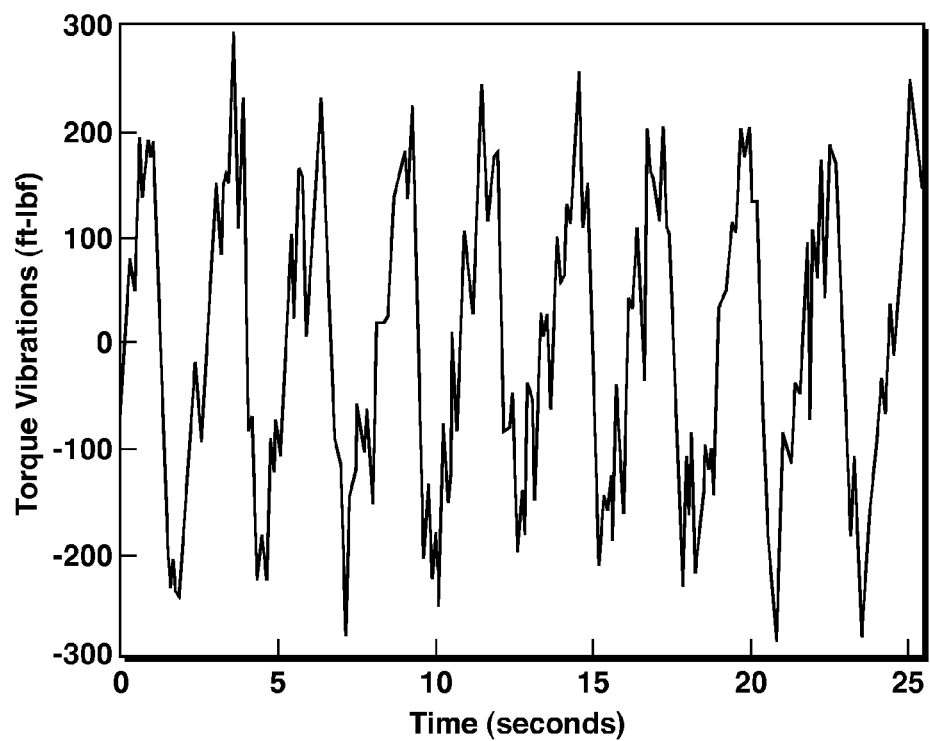
FIG. 10B shows the oscillatory part of the signal from FIG. 10A.
Figure 10C:
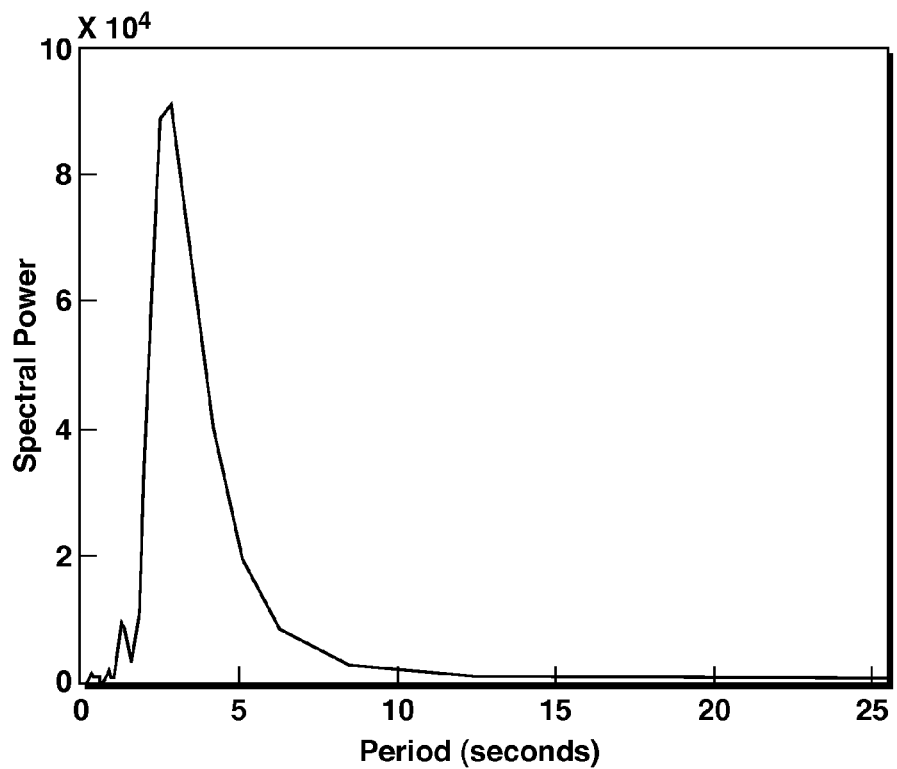
FIG. 10C provides a graphical estimate of the dominant vibrational period from the signal of 10B computed using Fourier analysis.

Fourier analysis can provide an estimate of the period of a signal, as well as provide the amplitude of the oscillation for use in the calculation of the vibration amplitude dX as discussed above. This added benefit provides further motivation to use Fourier methods, provided suitable data input streams with appropriate sampling rates may be obtained, and also provided that a surface data acquisition system can be properly configured to take advantage of the methods herein described. An exemplary illustration of how this can be accomplished is provided in FIGS. 10A and 10B, wherein a surface signal (Torque) is acquired ten times per second (dt=0.1 seconds). This is demonstrated as the solid curve in FIG. 10A. The moving average is calculated over a suitably determined time window (26 seconds in this example). As above, this moving average can be calculated in a number of ways, including least squares, filtering, and spectral analysis. The moving average for this example was calculated using a least squares linear fit, and is illustrated as the dashed line in FIG. 10A. This moving average is then subtracted from the surface signal, leaving just the oscillatory part of the signal as depicted in FIG. 10B. The Fourier transform of this signal should then be strongly peaked around the dominant oscillatory frequency and thus provides us with an estimate of the period of the dominant mode. Finally, if the power spectrum is filtered to remove the non-dominant noise (as illustrated in FIG. 10C using Welch's averaged modified periodogram method), then one can estimate the energy in the dominant vibration using Parseval's Theorem. This is linearly related to the vibration amplitude dX discussed above, so therefore an estimate of dX or "delta-X" may be determined from the spectrum with suitable coefficients and methods.

Determining Quality of the Estimated Vibration Amplitude Ratio

To determine the quality of the dynamic severity estimate and to calibrate the methods, comparison with actual downhole vibration severity information and/or vibration data is one exemplary means for evaluation. Downhole data could be obtained from one or more of a downhole instrumented sub with accelerometers, force and torque sensors, and downhole measurement-while-drilling (MWD) equipment that record RPM, acceleration, WOB, and other drilling parameters. The quantities that determine axial and/or torsional severity are then designated as $VAR_{measured}$ to signify a measured vibration amplitude ratio.

The surface estimated vibration amplitude ratios can be one or more of the torsional/axial modal vibration severity and torsional/axial forced vibration severity indices. These vibration amplitude ratios are designated as $VAR_{estimated}$. The reference value for the exemplary case is considered to be 1. If VAR=1, it is assumed that in the torsional case, we are at full stick-slip.

The quality factor may be defined in terms of conditional relations that depend on the values of the vibration amplitude ratios as follows:

$$VAR_{measured} < VAR_{estimated} < 1, \quad (23a)$$
$$QF = 1 - \frac{VAR_{estimated} - VAR_{measured}}{VAR_{estimated} + VAR_{measured}}$$

$$VAR_{estimated} < VAR_{measured} < 1, \quad (23b)$$
$$QF = 1 - \frac{VAR_{measured} - VAR_{estimated}}{VAR_{measured} + VAR_{estimated}}$$

False Positive: (23c)
$$VAR_{measured} < 1, VAR_{estimated} > 1, QF = \frac{VAR_{measured}}{VAR_{estimated}}$$

False Negative: (23d)
$$VAR_{measured} > 1, VAR_{estimated} < 1, QF = \frac{VAR_{estimated}}{VAR_{measured}}$$

and $$VAR_{measured} > 1, VAR_{estimated} > 1, QF = 1 \quad (23e)$$

Though complicated, this method gives full credit for estimates of full-stick slip that are detected, with no penalty for the amount of difference if there is actually full stick-slip at the bit.

For all values of VAR, another quality factor may be written as $$QF = 1 - \frac{|VAR_{estimated} - VAR_{measured}|}{VAR_{estimated} + VAR_{measured}} \quad (23f)$$

or still alternatively, $$QF = 1 - \left(\frac{VAR_{estimated} - VAR_{measured}}{VAR_{estimated} + VAR_{measured}}\right)^2 \quad (23g)$$

While the quality factor QF describes the quality of estimation, both false negatives and false positives are lumped together. An alternative is to count the quality factor associated with false positives and false negatives separately and focus on false occurrences. Another alternative quality factor measurement is the goodness, which excludes false negatives/positives and counts the cases where both the measured and the estimated values are in agreement of the absence/existence of a vibration dysfunction. Cumulative statistics may be obtained and plotted in terms of histograms or other common statistical display measures. It is desirable to have a quality factor greater than 0.8 (80%) between surface estimates and downhole measurements to validate the methods described herein.

Combined Analysis of Torsional Severity and Drilling Operating Parameters

Figure 11:
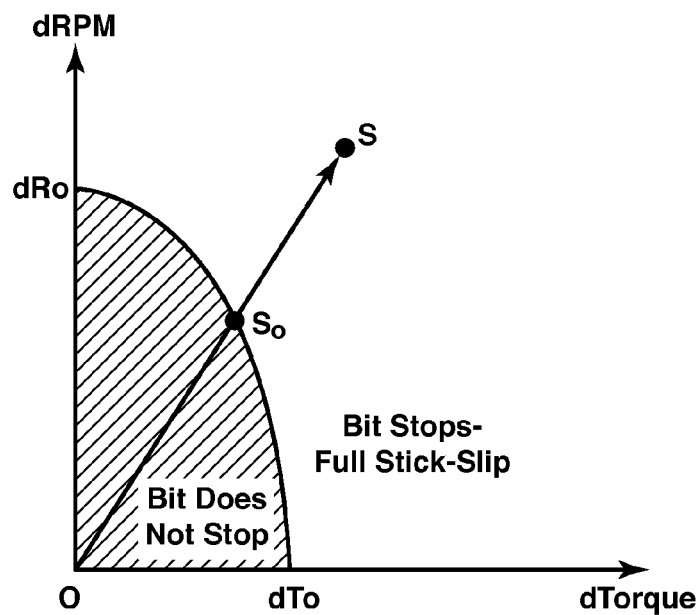
FIG. 11 illustrates a surface dTorque—surface dRPM cross plot.

In one embodiment, the driller or engineer may consider the torsional vibration type and severity under different types of boundary conditions. In typical torsional vibration scenarios, observed under stringent RPM control where the rig end rotates substantially at the set rotary speed, the drill tool assembly can be considered as having a torsionally clamped boundary condition at the surface and a free condition at the bit. An alternate scenario is to have a free boundary condition at both the bit and the surface, corresponding to torque limit control. When more sophisticated top-drive controllers such as Soft-Torque™ and Soft-Speed™ are used, the boundary condition at the surface is effectively somewhere in between these extreme criteria, and both Torque and RPM fluctuations may be present at the rig end. In such situations, it is possible to solve the torsional model with various ratios of surface dTorque to dRPM and construct a hybrid reference condition that considers all such possibilities. An exemplary graphical form of a reference condition is illustrated in FIG. 11. For stiff RPM control, the observed dRPM is near zero, corresponding to the vicinity of the x-axis, and torsional severity estimate TSE1 is given by Equation (10). In the opposite extreme of free boundary condition at the surface, dTorque will be near zero and severity is determined instead from the ratio of the observed surface dRPM to the "reference dRPM" $dR_0$. In intermediate situations, for example, if the surface observation indicates position S on the chart, the severity can be estimated as the ratio of distance between the origin and the current value of the surface observation, |OS|, to the distance between the origin and the reference value of the surface observation, $|OS_0|$. In circumstances where the relative phase of the torque and RPM fluctuations affects the drill string response, it is possible to compute the severity level with the added phase information that is obtained from observed time resolved surface measurements. These charts may be plotted and evaluated for one or more wells or drilling intervals as part of a drilling performance evaluation to help assess the value of certain operating parameter changes, such as use of a modified bit design or some other variation in a drilling parameter (WOB, RPM, etc.).

Combined Analysis of Metrics

Figure 12:
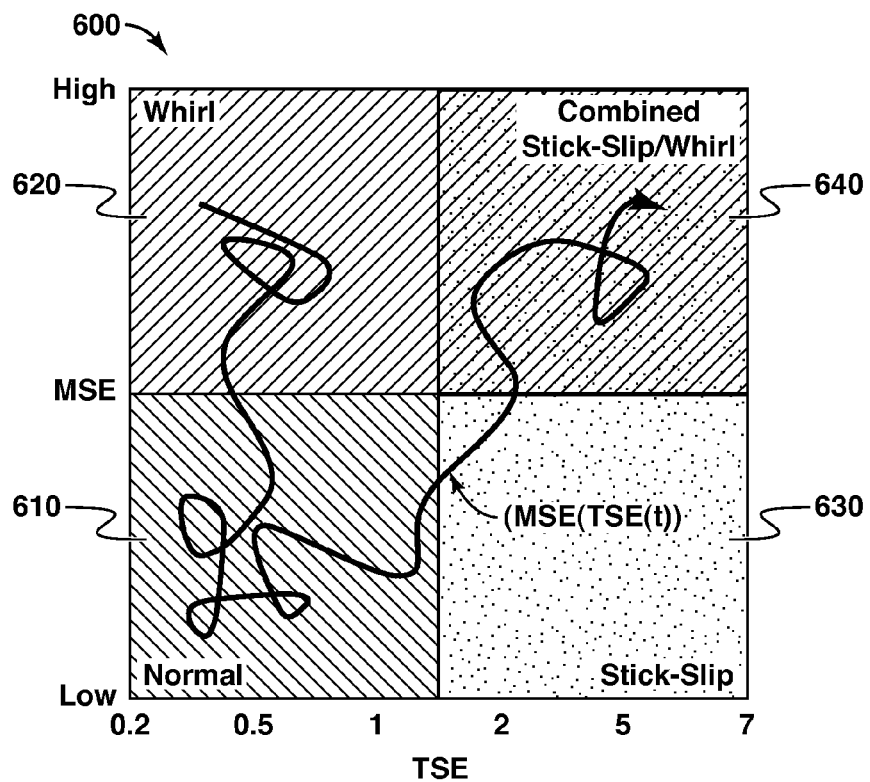
FIG. 12 demonstrates an exemplary combined torsional (TSE) stick-slip whirl interaction, illustrated using an MSE-TSE severity cross-plot.

In another embodiment of the methods according to the present invention, the driller or engineer can consider the torsional vibration type and severity along with real-time MSE information to obtain a more comprehensive picture of downhole conditions. This may be facilitated by a display that combines all of the pertinent information advantageously. An example is illustrated in FIG. 12, whereby a two-dimensional plot 600 illustrates an evolving time-trace of the point (TSE, MSE), perhaps for a recent period of time. For simplicity, four regions are generally specified: Normal 610, Stick-slip 630, Whirl 620, and Combined Stick-slip/Whirl 640. While the distinction between regions may not be as strongly demarcated as indicated here, it is useful for illustrative purposes. One often desired operating zone 610 is near the bottom-left corner (low MSE and low torsional severity) and a zone 640 often desired to avoid is near the top-right corner (high MSE and high torsional severity). Depending upon the application, operating in the other zones may also be detrimental to tool life, ROP, footage drilled, and the costs of continued operation. While in this exemplary scenario, the zones are illustrated as having definite cut-off values, the zones in fact are often likely to blend together, transition, or extend further, such as to arbitrary cut-offs dependent on numerous other factors including formation effects, drill tool assembly dimensions, hole size, well profile and operating parameters.

Figure 13:
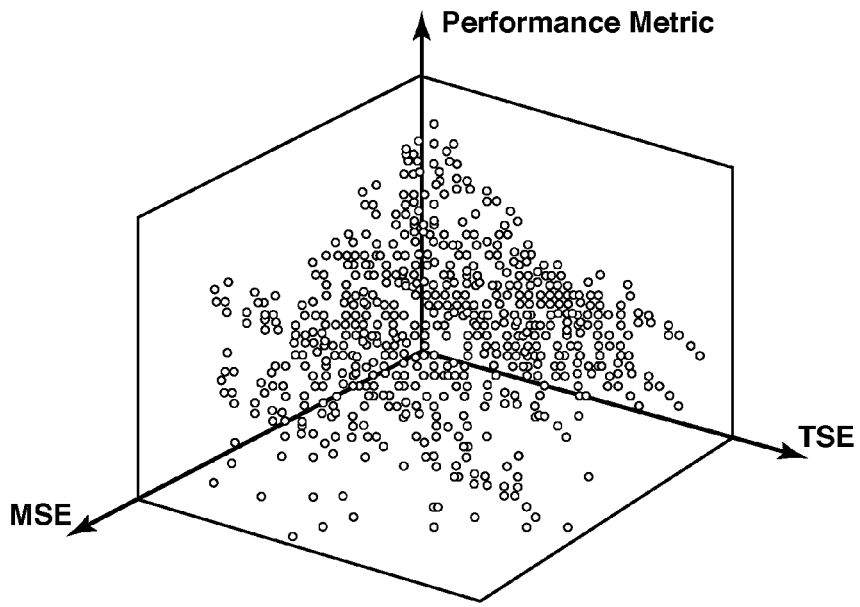
FIG. 13 exemplifies a combined analysis of MSE-TSE with respect to a Performance Metric.

Another embodiment of the inventive subject matter is to describe the variation in TSE and MSE in terms of a performance metric. This performance metric can be one or more of ROP, footage drilled, tool life, non-productive time associated with drilling, and formation, or some combination thereof. An example of how these performance metrics can be displayed is illustrated in FIG. 13. This display can be further distilled using statistical and functional relationships of the above performance metrics, including correlations, cluster analysis, statistical time-frequency analysis, decision support systems such as neural networks, and other such methods with the objective of establishing optimized drilling parameter values such as a target range for dTorque Margin, optimal tradeoff between MSE and TSE, and even bit selection parameters such as height of depth of cut limiters to be established through field trials.

An exemplary method is to use the changes in performance metric, combined with changes in the severity estimate. For instance, objective functions of the following forms may be used to evaluate controllable parameters in conjunction with the concept of the "dTorque Margin":

$$OBJ(TSE, ROP) = ROP \tag{24a}$$

$$OBJ(TSE, ROP) = \frac{\partial ROP/ROP}{\partial TSE/TSE} \tag{24b}$$

$$OBJ(TSE, ROP) = \frac{\delta + \partial ROP/ROP}{\delta + \partial TSE/TSE} \tag{24c}$$

These functional forms may be augmented with comparable terms in MSE for completeness, without departing from the spirit of the invention.

The objective function here is to maximize ROP while minimizing TSE. For instance, maximizing ROP can be accomplished by increasing WOB. When the WOB is increased, the dTorque typically goes up and the TSE goes up. An objective is to ensure that there is sufficient WOB to drill efficiently without going into an undesirable operating zone. In other words, the operating conditions are maintained such that the measured dTorque is less than a specific percentage of the reference dTorque. The "dTorque Margin" represents the available excess dTorque with which drilling can be carried out without concern for severe torsional dysfunctions or stick-slip. The maximum value of the dTorque Margin is obtained by subtracting the surface dTorque from the reference surface dTorque, assuming that dTorque is less than the reference dTorque. The use of objective functions provides a formal approach for estimation of the "available" dTorque Margin in relation to the maximum dTorque Margin. It is also important to point out that the methodology and algorithms presented in this invention are not limited to these three types of objective functions. They are applicable to and cover any form of objective function adapted to describe a relationship between drilling parameters and drilling performance measurements.

Embodiment of a Base Model for Torsional and Axial Vibrations

One embodiment of a base model of torsional and axial vibrations of a drill string follows directly from the patent application WO 2009/155062. The zero-order and first-order terms of the perturbation expansion of the drill string equations of motion for axial and torsional vibrations are disclosed. This reference includes modeling elements that include the physical effects of wellbore profile, drill string description including the effects of tool joints, inertia, friction and viscous damping, and other details necessary to provide high quality model results necessary for the present invention. This is a "soft-string" model with no bending stiffness of the string. The use of a "stiff-string" model that includes drill string bending stiffness may also be used within the scope of the invention described herein. The present model will be disclosed in summary form, and patent application WO 2009/155062 should be referred to for additional details.

The present systems and methods utilize an exemplary "base model." The present methods and systems can be adapted to apply to different equations of motion and/or different base models than those presented herein. Accordingly, for the purposes of facilitating explanation of the present systems and methods, one suitable formulation of a base model is described herein and others are within the scope of the present disclosure.

A borehole with a particular trajectory is created by the action of a drill bit at the bottom of a drill tool assembly, consisting of drill pipe, drill collars and other elements. Drilling is achieved by applying a WOB, which results in a torque, $\tau_{bit}$, at the bit when the drill tool assembly is rotated at an angular velocity, $$\Omega_{RPM} \equiv \frac{2\pi}{60}(RPM).$$

The mechanical rotary power, $\Omega_{RPM}\tau_{bit}$, is supplied to the bit and is consumed during the rock cutting action. The torque is provided by a drilling rig, and the WOB is typically provided by gravitational loading of the drill tool assembly elements. The application of WOB forces a portion of the drill tool assembly near the drill bit into compression.

The borehole centerline traverses a curve in 3-D, starting from the surface and extending out to the bottom of the hole being drilled. The borehole trajectory at arc length l from the drill bit in terms of the inclination $\theta$ and azimuth $\phi$ as a function of measured depth (MD), global (x, y, z) and local (t, n, b) coordinates and the local borehole curvature $K_b$ can be written as:

$$t(l) = -\sin(\theta)\sin(\phi)x - \sin(\theta)\cos(\phi)y + \cos(\theta)z. \tag{25}$$

$$\kappa_b \equiv \frac{dt}{dl} \equiv \kappa_b n \tag{26}$$

$$b \equiv t \times n \tag{27}$$

Here, the unit normal vector n is in the plane of local bending and perpendicular to the tangent vector t, whereas the unit binormal vector b is perpendicular to both t and n. The vectors x, y and z point to the East, North, and Up, respectively.

Drill tool assemblies can be described as a function of arc length, s, along their centerline in the unstressed state. In the stressed condition the drill tool assembly is stretched and twisted relative to the unstressed condition. The differences between the stressed and unstressed conditions are discussed further below. For the purposes of the present systems and methods, the drill tool assembly is assumed to consist of elements attached rigidly end-to-end along a common axis of rotational symmetry, each element having a uniform cross-section along its length, free of bend and twist in its unstressed state. The description of each drill tool assembly element includes information about the material (elastic modulus, E, shear modulus, G, density, $\rho$) and geometrical properties (area, A, moment of inertia, I, polar moment of inertia, J). This information can typically be obtained from drill tool assembly descriptions and technical specifications of the drill tool assembly components.

When the drill tool assembly is in the borehole, it is constrained by the forces imparted to it by the borehole walls, such that its shape closely follows the trajectory of the borehole, which can be tortuous in complex borehole trajectories. It is presently understood that it may be possible to improve the accuracy of the model by using a stiff-string model and resolving bending moments at the BHA, or possibly along the entire drill tool assembly if necessary. Examples of such models have been disclosed at least in "Drillstring Solutions Improve the Torque-Drag Model," Robert F. Mitchell, SPE 112623. Use of such improvements in the base model are within the scope of the present disclosure. For example, while some of the discussion herein will reference assumptions regarding equations that can be simplified or solved by using this soft-string approximation, any one or more of these assumptions could be replaced utilizing appropriate stiff-string models.

In some implementations, the exemplary base model considers the motion of the drill tool assembly while it is rotating at a particular bit depth (BD), WOB, and nominal rotation speed. The lateral displacement constraint leaves only two kinematic degrees of freedom for the drill tool assembly; stretch h and twist $\alpha$. The overall motion of the drill tool assembly can be described by:

$$h(l, t) = h_0(l) + h_{dyn}(l, t), \, h_{dyn}(l, t) = \int_{-\infty}^{\infty} h_\omega(l)e^{-j\omega t}d\omega, \tag{28}$$

$$\alpha(l, t) = \Omega_{RPM}t + \alpha_0(l) + \alpha_{dyn}(l, t), \tag{29}$$

$$\alpha_{dyn}(l, t) = \int_{-\infty}^{\infty} \alpha_\omega(l)e^{-j\omega t}d\omega,$$

where, $h_0$ and $\alpha_0$ represent the "baseline solution"—the amount of stretch and twist present in the drill tool assembly when it is rotating smoothly, and $h_{dyn}$ and $\alpha_{dyn}$ represent the solutions to the dynamic motion of the drill tool assembly relative to the baseline solution. The model considers only small deviations around the baseline solution, allowing dynamic motions at different frequencies to be decoupled from each other.

The motions of the drill tool assembly are accompanied by internal tension, $\tau$, and torque, $\tau$, transmitted along the drill tool assembly, which can be likewise described as:

$$T(l, t) = T_0(l) + T_{dyn}(l, t), \, T_{dyn}(l, t) = \int_{-\infty}^{\infty} T_\omega(l)e^{-j\omega t}d\omega, \tag{30}$$

$$\tau(l, t) \equiv -\tau t = -(\tau_0(l) + \tau_{dyn}(l, t))t, \tag{31}$$

$$\tau_{dyn}(l, t) = \int_{-\infty}^{\infty} \tau_\omega(l)e^{-j\omega t}d\omega,$$

where $T_{dyn}$ and $\tau_{dyn}$ represent the solutions to the dynamic motion of the drill tool assembly relative to the baseline solution. In the linear elastic regime and within the soft-string approximation, these are given in terms of the drill tool assembly configuration as:

$$T = EA \frac{dh}{dl}, \quad (32)$$

$$\tau = GJ \frac{d\alpha}{dl}. \quad (33)$$

The drill tool assembly elements are also subject to a variety of external forces, $f_{body}$, and torques, $\theta_{body}$, per unit length that affect their motion. The axial equation of motion is obtained by equating the net axial force to the force associated with the axial acceleration of the element mass:

$$\rho A \ddot{h} = T' + f_{body} \cdot t, \quad (34)$$

where t is the unit vector along the tangent direction. The torsional equation of motion is obtained by equating the net torque along the tangent vector to the torsional moment times angular acceleration of the element:

$$-\rho J \ddot{\alpha} = -\tau' + \theta_{body} \cdot t. \quad (35)$$

External Forces and Torques

At the junction of two drill tool assembly elements, the stretch, h, and twist, $\alpha$, are continuous. Since no concentrated forces or torques are present, the tension, T, and torque, $\tau$, are also continuous across these boundaries. The partial differential equations (PDE's), constitutive relations, and external forces and torques fully describe the dynamics along the drill tool assembly once appropriate boundary conditions are specified at the ends of the drill tool assembly.

Three types of external forces, f, and torques, $\theta$, are considered: gravitational ($f_g$, $\theta_g$), mud ($f_{mud}$, $\theta_{mud}$), and borehole ($f_{bh}$, $\theta_{bh}$). The body force and torque is a composite sum of these three forces and torques, $$f_{body} = f_{mud} + f_{bh} + f_g, \quad (36)$$

$$\theta_{body} = \theta_{mud} + \theta_{bh} + \theta_g. \quad (37)$$

Gravitational forces set up the characteristic tension profile along the drill tool assembly, which further affects torque, drag and drill tool assembly dynamics. The gravitational force per unit length acting on an element is $$f_g = -(\rho - \rho_{mud}) A g z, \quad (38)$$

where z is a unit vector that points upward and which takes into account the buoyancy associated with the mud density $\rho_{mud}$. Since the elements have an axis of symmetry, no torque is generated by gravity: $\theta_g = 0$.

During drilling operations, the drilling mud shears against both the inside and the outside of the drill tool assembly, and creates forces, $f_{mud}$, and torques, $\theta_{mud}$, per unit length that resist motion. In the absence of lateral motion according to the constraints described above, no lateral forces are generated by the mud. Also, any torque that is not along the local tangent will be cancelled out by borehole torques, so we need only consider the component of torque along the tangent vector. The mud forces and torques are then obtained as $$f_{mud} = f_{mud} t, \quad (39)$$

$$\theta_{mud} \cdot t = \theta_{mud} \quad (40)$$

These forces and torques can be separated into a steady-state portion associated with the steady—state rotation of the drill tool assembly and circulation of the mud at average pump pressure, and a dynamic portion associated with dynamic variations in the mud pressure and the relative motion of the drill tool assembly with respect to steady-state.

For the purposes of the presently described implementation, it is assumed that the borehole forces dominate the steady-state force balance. The hook load differences between pumps-off and pumps-on and the effects of mud pump strokes and active components such as MWD systems that generate axial forces are assumed to be negligible in this exemplary embodiment. These assumptions simplify the solution but are not required for implementation of the present systems and methods. The only mud effects that the model takes into account are those associated with the dynamic motion of the drill tool assembly with respect to its steady-state rotation. Since axial and torsional movements of the elements do not displace any mud, their main effect is to create a shearing motion of the mud adjacent to the drill tool assembly surface and to dampen dynamic vibrations around the steady-state.

There may be several possible dynamic models of the mud system that may be considered to be within the scope of this model. For example, one or more of the assumptions described above may be made differently, thereby altering the formulation of the model. One example of a suitable dynamic model of the mud system comprises the superposition of the dynamic effects of the mud system on the baseline solution using a model for shear stress on an infinite plane. The amplitude of the shear stress acting on an infinite plane immersed in a viscous fluid and undergoing an oscillatory motion parallel to its own surface at an angular frequency w is given by:

$$\sigma_{mud,\omega} = (1+j) \frac{\delta_\omega}{2} \rho_{mud} \omega^2 a_\omega, \quad (41)$$

where $\alpha_\omega$, is the displacement amplitude of the plane motion, $\rho_{mud}$ is the mud density, j is an imaginary number, and $\delta_\omega$, the frequency-dependent depth of penetration, is given by $$\delta_\omega = \sqrt{2\eta_{pl}/\omega \rho_{mud}}, \quad (42)$$

where $\eta_{pl}$ is the plastic viscosity of the drilling mud under pumps-on conditions.

For the typical mud plastic viscosities $\eta_{pl}$, densities $\rho_{mud}$, and frequencies $\omega$ of interest, the penetration depth is small compared to the inner and outer radii of the element; $\delta_\omega \ll$ ID, OD. The mud plastic viscosity term is not restricted to the Bingham model and can be easily generalized to include other rheological models, in which the viscosity term varies with RPM. In the high-frequency limit, Eq. 41 can be used to approximate the shear stress on an annular object. For axial motion at frequency w, this term results in a mud-related axial force per unit length:

$$f_{mud,\omega} \approx \sigma_{mud,\omega} (\pi ID + \pi OD), \quad (43)$$

where the axial displacement amplitude is given by $a_\omega = h_\omega$. Similarly, the torque per unit length associated with torsional oscillations is given by:

$$\theta_{mud,\omega} \approx -\sigma_{mud,\omega} \left( \pi \left( \frac{ID^2}{2} \right) + \pi \left( \frac{OD^2}{2} \right) \right) \quad (44)$$

where the torsional displacement amplitudes at the ID and OD are given by $a_\omega(ID) = \alpha_\omega \cdot ID/2$ and $a_\omega(OD) = \alpha_\omega \cdot OD/2$, respectively. The total mud force for a general motion can be obtained by summing over all frequencies.

The borehole walls exert forces and torques that keep the drill tool assembly along the borehole trajectory. The currently described model assumes that each element has continuous contact with the borehole, consistent with the soft-string approximation, and that no concentrated forces are present. Other models that may be implemented within the scope of the present systems and methods may make different assumptions. For example, as discussed above, other models may use stiff-string approximations for some or all of the drill tool assembly. The contact with the borehole is localized somewhere along the circumference of the element, and $r_c$ denotes the vector that connects the centerline to the contact point within the local normal plane, whose magnitude, $r_c$, is equal to half the "torque OD" of the element. The borehole force per unit length, $f_{bh}$, can then be decomposed into axial, radial and tangential components as follows:

$$f_{bh} = f_a t + f_n = f_a t - f_r r_c / r_c + f_\tau (t \times r_c)/r_c. \tag{45}$$

Here, a sign convention is used such that $f_r$ and $f_\tau$ are always positive, provided that the drill tool assembly rotates in a clockwise manner when viewed from above. $f_n$ is the total borehole force in the local normal plane, with magnitude $f_n$.

Four equations are needed to determine the three force components and direction of $r_c$ in the local normal plane. Since no lateral motion is allowed in the presently described implementation, imposing a force balance in the local normal plane yields two equations. Collecting borehole forces on one side of the equation and noting that there are no lateral mud forces present, gives, $$f_n = \kappa_b T + f_g - (f_g \cdot t) t. \tag{46}$$

Next, enforcing Coulomb friction against the borehole wall with a friction angle $\psi_C$ provides two additional equations, $$\frac{f_a}{f_\tau} = -\frac{\dot{h}}{v_{rel}} = -\frac{\dot{h}}{\sqrt{\dot{h}^2 + \dot{\alpha}^2 r_c^2}}, \tag{47}$$

$$f_\tau^2 + f_a^2 = \tan^2 \psi_C f_r^2. \tag{48}$$

In general, $\psi_C$ can be a function of the relative velocity, $v_{rel} = \sqrt{\dot{h}^2 + \dot{\alpha}^2 r_c^2}$, of the element with respect to the borehole. The dependence of the friction angle, $\psi_C$, on the relative velocity of the element, $v_{rel}$, with respect to the borehole can be expressed in terms of a logarithmic derivative, $$C_\mu \equiv \frac{\partial \ln \sin \psi_C}{\partial \ln v_{rel}} = \frac{v_{rel}}{\sin \psi_C} \frac{\partial \sin \psi_C}{\partial v_{rel}}. \tag{49}$$

A negative value for $C_\mu$ represents a reduction of friction with increasing velocity, which may be referred to as velocity-weakening friction. Such a situation can have a significant impact on the stability of torsional vibrations and stick-slip behavior of the drill tool assembly. This equation represents one manner in which a velocity-dependent damping relationship may be incorporated into the models utilized in the present systems and methods. Other equations and/or relationships may be incorporated as appropriate.

The constraint on lateral motion also implies that there is no net torque in the local normal plane, so any applied torque that is not along the tangent vector will be cancelled out by the borehole. Thus, the equations of motion are obtained by considering the component of torque that is along the local tangent direction, which is responsible for rotating the drill tool assembly. This component of torque per unit length exerted by the borehole is given by:

$$\theta_{bh} \cdot t = r_c f_\tau. \tag{50}$$

The baseline solution is a particular solution of the equations of motion that corresponds to smooth drilling with no vibration, at a particular bit depth, weight on bit, and specified drill tool assembly rotary speed that results in a rate of penetration. The equations of motion are then linearized around this baseline solution to study harmonic deviations from this baseline solution. An exemplary baseline solution is described below. As described above, a variety of equations could be used to describe the motion of the drill tool assembly considering the multitude of relationships and interactions in the borehole.

Baseline Solution

In the baseline solution, every point along the drill tool assembly has a steady downward velocity equal to the ROP. Deviations in this motion are very small over the typical vibration profiles of interest (smooth drilling with no vibration); hence these will be ignored during this steady downward motion. The drill tool assembly also rotates at a steady angular velocity dictated by the imposed RPM. It is also assumed that positive RPM corresponds to clockwise rotation of the drill tool assembly when viewed from the top. The baseline solution can be written as, $$h(l,t) = h_0(l), \tag{51}$$

$$\alpha(l,t) = \Omega_{RPM} t + \alpha_0(l), \tag{52}$$

such that the baseline displacement $h_0$ and twist $\alpha_0$ do not change with time. From the constitutive relations, it follows that baseline tension $T_0$ and torque $\tau_0$ also do not change with time and are function of position $l$ only. The subscript "0" is used to denote the baseline values of all variables and parameters.

First, the axial forces and displacements are obtained. It is seen that $f_{a0} = 0$, that is, the borehole does not exert any axial forces on the drill tool assembly. Then, the axial baseline solution for the composite drill tool assembly and the boundary conditions at the bit ($T_0(0) = -\text{WOB}$, $h_0(0) = 0$) can be computed from:

$$\frac{dT_0}{dl} = (\rho - \rho_{mud})gA\cos\theta, \tag{53}$$

$$\frac{dh_0}{dl} = \frac{1}{EA}T_0, \tag{54}$$

Next, the tangential borehole force is obtained assuming no axial borehole forces:

$$f_{\tau 0} = f_{n0} \sin \psi_{C0}. \tag{55}$$

This enables computation of the baseline twist and torque along the drill tool assembly, ignoring the contribution of the mud torque, $\theta_{mud}$, to the baseline torque. The result is another set of first-order ODEs:

$$\frac{d\tau_0}{dl} = r_c f_{n0} \sin \psi_{C0}, \tag{56}$$

$$\frac{d\alpha_0}{dl} = \frac{1}{GJ}\tau_0, \tag{57}$$

Based on the boundary conditions at the bit ($\tau_0(0)=\tau_{bit}$, $\alpha_0(0)=0$), the baseline solution for the twist and torque can be obtained by integration, just as in the axial case. In general, the torque generated at the bit cannot be controlled independently of the WOB; the two quantities are related through bit aggressiveness. The present model relates the bit torque to WOB through an empirical bit friction coefficient, $\mu_b$, $$\tau_{bit} = \mu_b \frac{OD_{bit}}{3} WOB. \tag{58}$$

The model uses the input parameter $\mu_b$ to compute the baseline solution. The torque at the bit enters the baseline torque solution only additively, and does not influence the dynamic linear response of the drill tool assembly; it is there mainly to enable calibration of the model with surface measurements.

For the numerical implementation of this solution scheme, the model interpolates the inclination, $\cos\theta$, and curvature, $\kappa_b$, from survey points to the midpoint of each element. The expressions, A, E and $\rho$ are piece-wise constant over each drill tool assembly element. Also, the stretch of the drill tool assembly elements is ignored during the integration where dl=ds is assumed. Since all other drill tool assembly properties are constants within each element, the solution at each element boundary is obtained by applying the following recursive sums:

$$T_{0,i} \equiv T_0(s_i) = T_{0,i-1} + L_i(\rho_i - \rho_{mud})gA_i\cos\theta_i, T_{0,0} = -WOB, \tag{59}$$

$$h_{0,i} \equiv h_0(s_i) = h_{0,i-1} + \frac{L_i}{E_iA_i}T_{0,i-1/2}, h_{0,0} = 0, \tag{60}$$

$$\tau_{0,i} \equiv \tau_0(s_i) = \tau_{0,i-1} + L_i r_{c,i} f_{n0,i} \sin\psi_{C0,i}, \tau_{0,0} = \tau_{bit}, \tag{61}$$

$$\alpha_{0,i} \equiv \alpha_0(s_i) = \alpha_{0,i-1} + \frac{L_i}{G_iJ_i}\tau_{0,i-1/2}, \alpha_{0,0} = 0, \tag{62}$$

where $f_{n0,i}$ is the borehole force of the $i^{th}$ element of the drill tool assembly, $T_{0,i-1/2}$ is the arithmetic average tension of the $(i-1)^{th}$ and $i^{th}$ elements of the drill tool assembly, and $\tau_{0,i-1/2}$ is the arithmetic average torque of the $(i-1)^{th}$ and $i^{th}$ elements of the drill tool assembly. Note that the tension along the drill tool assembly is needed for all of the computations in the above implementation and is the first quantity to be computed.

Harmonic Wave Equation

Having computed the baseline solution for a particular bit depth, WOB, and RPM, small motions $h_{dyn}$ and $\alpha_{dyn}$ of an individual element may be calculated around this solution along with the associated forces ($T_{dyn}$) and torques ($\tau_{dyn}$) to model the vibrations of the drill tool assembly.

Beginning with the axial equations, the change in axial borehole force is obtained to linear order in dynamic variables as, $$f_a = -\frac{h_{dyn}f_\tau}{\Omega_{RPM}r_c} \Rightarrow f_{a,dyn} \tag{63}$$

$$= -\frac{h_{dyn}}{\Omega_{RPM}r_c}f_{\tau 0}$$

-continued $$= -\frac{f_{n0}\sin\psi_{C0}}{\Omega_{RPM}r_c}\int_{-\infty}^{\infty}(-j\Omega)h_\Omega e^{-j\Omega t}d\Omega.$$

Substitutions and rearrangement yields:

$$-\rho A\omega^2[1+(1+j)\Delta_{mud,a}+j\Delta_{bh,a}]h_\omega = \frac{dT_\omega}{dl} = EA\frac{d^2h_\omega}{dl^2}, \tag{64}$$

for each frequency component $\Omega$ where $$\Delta_{mud,a} \equiv \frac{\rho_{mud}}{\rho}\frac{\pi(ID+OD)\delta_\omega}{2A}, \text{ and } \Delta_{bh,a} \equiv \frac{f_{n0}\sin\psi_{C0}}{\rho A\omega\Omega_{RPM}r_c}.$$

This second-order linear ODE has the following solution:

$$h_\omega(l) = h_{\omega u}e^{jk_a l} + h_{\omega d}e^{-jk_a l}, \tag{65}$$

where $h_{\omega u}$ and $h_{\omega d}$ are arbitrary constants that represent the complex amplitude of upwards and downwards traveling axial waves along the elements of the drill tool assembly, respectively. The associated wave vector, $k_a$, at frequency $\omega$ is given by:

$$k_a \equiv \frac{\omega}{\sqrt{\frac{E}{\rho}}}\sqrt{1+(1+j)\Delta_{mud,a}+j\Delta_{bh,a}}. \tag{66}$$

In the absence of mud and borehole effects, this dispersion relation reduces to the well-known non-dispersive longitudinal wave along a uniform rod. Due to the large wavelengths associated with the frequency range of interest, these waves typically travel along the entire drill tool assembly. The corresponding tension amplitude is given by:

$$T_\omega(l) = EA\frac{dh_\omega}{dl} = jk_a EA(h_{\omega u}e^{jk_a l} - h_{wd}e^{-jk_a l}). \tag{67}$$

The state of the axial wave at each frequency is uniquely described by $h_{\omega u}$ and $h_{\omega d}$. However, it is more convenient to represent the state of the axial wave by the axial displacement $h_\omega$ and tension $T_\omega$ instead, since these have to be continuous across element boundaries. The modified expression is obtained by combining equations in matrix form at two ends (locations l and l-L) of an element of length L, $$\begin{bmatrix} h_\omega(l) \\ T_\omega(l) \end{bmatrix} = \tag{68}$$

$$\begin{bmatrix} e^{jk_a l} & e^{-jk_a l} \\ jk_a EA e^{jk_a l} & -jk_a EA e^{-jk_a l} \end{bmatrix} \begin{bmatrix} e^{jk_a(l-L)} & e^{-jk_a(l-L)} \\ jk_a EA e^{jk_a(l-L)} & -jk_a EA e^{-jk_a(l-L)} \end{bmatrix}^{-1}$$

$$\begin{bmatrix} h_\omega(l-L) \\ T_\omega(l-L) \end{bmatrix}$$

Thus, as a first step in obtaining the dynamic response of the drill tool assembly at a given frequency $\omega$, the present model computes the transfer matrix for each element:

$$T_{a,i} \equiv \begin{bmatrix} \cos(k_{a,i}L_i) & \dfrac{\sin(k_{a,i}L_i)}{k_{a,i}E_iA_i} \\ -k_{a,i}E_iA_i\sin(k_{a,i}L_i) & \cos(k_{a,i}L_i) \end{bmatrix}, \quad (69)$$

where $k_{a,i}$ is obtained using previous equations. For an axial vibration at that frequency, the state vector between any two points along the drill tool assembly can be related to each other through products of these transfer matrices:

$$S_{a,n}(\omega) \equiv \begin{bmatrix} h_\omega(s_n) \\ T_\omega(s_n) \end{bmatrix} = T_{a,nm}S_{a,m}(\omega); \; T_{a,nm} \equiv \left( \prod_{i=m+1}^{n} T_{a,i} \right); \; m < n \quad (70)$$

The transfer matrix Eq. (70) can be used to relate the axial vibration state anywhere along the drill tool assembly to, for example, the state at the surface end of the drill tool assembly. However, in order to solve for the response of the drill tool assembly to a particular excitation, it is necessary to specify the relationship between the displacement and tension amplitudes at the surface. The simplest boundary condition is to assume that the rig is axially rigid and has perfect RPM control, such that $$h_{rig} \equiv h_{dyn}(MD) = 0, \; \alpha_{rig} \equiv \alpha_{dyn}(MD) = 0, \quad (71)$$

where MD denotes the position of the rig along the drill tool assembly. In general, a rig should have finite compliance against the axial and torsional modes. The response of a drilling rig is dependent on the rig type and configuration and can change rapidly as the frequency of the vibration mode sweeps through a resonant mode of the rig. The response of the drilling rig can be modeled and incorporated into the present systems and methods in a variety of manners, including the approach described below.

For the case of axial motion, the drill tool assembly can be assumed to be rigidly attached to the top drive block, which can be approximated as a large point mass $M_{rig}$. This block is free to move up and down along the elevators, and is held in place by a number of cables that carry the hook load. There are also some damping forces present, which are assumed to be proportional to the velocity of the block. Thus, for small amplitude vibrations, a simple representation of the dynamics of this system is a mass-spring-dashpot attached to a rigid end, with a spring associated with the hoisting cables and a dashpot representing the damping. Here, $T_{hook}$ reflects the upwards force exerted on the block by the rig, including the spring and the damping force. Imposing force balance for the baseline solution yields:

$$T_{hook,0} = T_0(MD) + M_{rig}g. \quad (72)$$

The hoisting cable length is adjusted to achieve the desired hook load; therefore the position of the baseline axial displacement is immaterial and is not needed to compute the baseline solution. However, this length sets the equilibrium position of the spring. When the block mass moves away from the baseline position, a net force is exerted on it by the drill tool assembly and the rig. The dynamic hook load is given by:

$$T_{end} = -k_{rig}h_{rig} - \gamma_{rig}\dot{h}_{rig}. \quad (73)$$

Newton's equation of motion for the block mass yields the following relation between vibration amplitudes at each frequency:

$$-M_{rig}\omega^2 h_{rig,\omega} = -T_{rig,\omega} + T_{end,\omega} = -T_{rig,\omega} - (k_{rig} - j\omega\gamma_{rig})h_{rig,\omega}. \quad (74)$$

Thus, the axial rig compliance, based on a reference frame fixed at the rig, is given by:

$$C_{rig,a}(\omega) \equiv \frac{h_{rig,\omega}}{T_{rig,\omega}} = \frac{1}{M_{rig}\omega^2 + j\omega\gamma_{rig} - k_{rig}}. \quad (75)$$

This quantity measures the amount of axial movement the block mass will exhibit for a unit axial force at a particular frequency $\omega$. It is a complex-valued function whose magnitude gives the ratio of the displacement magnitude to force magnitude, and whose phase gives the phase lag between the forcing function and the resulting displacement.

The dynamic response of the mass-spring-dashpot system is well known and will only be described briefly. Three parameters are needed to fully describe this simple dynamic rig model. The block mass is typically estimated from the hook load reading with no drill tool assembly attached. The spring constant can be estimated from the length, number and cross-sectional area of the hoisting cables. These two parameters define a characteristic rig frequency, $\omega_{rig,a} \equiv \sqrt{k_{rig}/M_{rig}}$, for which the displacement of the block is 90° out of phase with the dynamic force. The severity of the rig response at this frequency is controlled by the rig damping coefficient; critical damping occurs for $\gamma_{rig} = \gamma_{crit} \equiv 2M_{rig}\omega_{rig}$. Since the rig frequency and the amount of damping relative to the critical damping is more intuitive and easier to observe, the current model uses $M_{rig}$, $\omega_{rig}$ and $\gamma_{rig}/\gamma_{crit}$ as inputs in order to compute the dynamic response. The "stiff-rig" limit can be recovered by considering the limit $\omega_{rig} \to \infty$, where the compliance vanishes. At this limit, the rig end does not move regardless of the tension in the drill tool assembly.

In general, the dynamic response of the rig is much more complicated. However, all the information that is necessary to analyze vibration response is embedded in the compliance function, and the model framework provides an easy way to incorporate such effects. If desired, it is possible to provide the model with any compliance function, possibly obtained from acceleration and strain data from a measurement sub.

As a practical matter, the effective compliance of the rig will vary with the traveling block height and the length and number of the cables between the crown block and traveling block. In the drilling of a well, the traveling block height varies continuously as a joint or stand is drilled down and the next section is attached to continue the drilling process. Also, the number of such cable passes may vary as the drilling load changes. The derrick and rig floor is a complex structure that is likely to have multiple resonances which may have interactions with the variable natural frequency of the traveling equipment. For these reasons, in addition to a well-defined resonance with specified mass, stiffness, and damping, and in addition to the "stiff rig" limit or alternatively a fully compliant rig, it is within the scope of this invention to consider that the surface system may be near resonance for any rotary speed under consideration. Then desired configurations and operating conditions may be identified as having preferable index values despite possible resonance conditions in the rig surface equipment.

Eqs. (46) and (51) can be combined to obtain the vibration response everywhere along the drill tool assembly, associated with unit force amplitude at the surface:

$$\tilde{S}_{a,n}(\omega) \equiv \begin{bmatrix} \tilde{h}_\omega(s_n) \\ \tilde{T}_\omega(s_n) \end{bmatrix} = T_{a,rig-n}^{-1} \begin{bmatrix} C_{rig,a}(\omega) \\ 1 \end{bmatrix}. \quad (76)$$

Due to the linearity of the equations, the actual dynamic motion of the drill tool assembly at a given point is given by a linear superposition of these state vectors with different amplitudes at different frequencies. The main interest will be the dynamic linear response of the system to excitations at a given point along the drill tool assembly. The response of the system to multiple excitations can likewise be analyzed using the superposition principle.

In defining the vibration performance of the drill tool assembly, the primary quantity of interest is described by the way it responds to excitations at different frequencies caused by the drill bit. The effective drill tool assembly compliance at the bit can be defined as:

$$C_{bit}(\omega) \equiv \frac{\tilde{h}_\omega(0)}{\tilde{T}_\omega(0)}, \quad (77)$$

which is given by the ratio of the elements of $\tilde{S}_a$ at the bit. General linear response functions that relate amplitudes at different positions along the drill tool assembly can also be defined.

Turning now to the torsional equations, the methodology used for obtaining the expressions for torsional waves is similar to that described above for axial waves. As suggested above and throughout, while particular equations are provided as exemplary equations and expressions, the methodology used for obtaining these equations and expressions is included within the scope of the present disclosure regardless of the selected starting equations, boundary conditions, or other factors that may vary from the implementations described herein. Similar to the methodology used for axial waves, the dynamic torque associated with the borehole forces is computed using the lateral motion constraint and the Coulomb criterion. Expanding the lateral force balance to linear order in dynamic variables and eliminating the baseline terms to obtain:

$$f_{n0}f_{n,dyn} = [\kappa_b^2 T_0 + (\rho - \rho_{mud})g(\kappa_b \cdot z)]T_{dyn}. \quad (78)$$

To linear order, the change in the instantaneous friction coefficient can be obtained as $$\sin^2 \psi_C = \sin^2 \psi_{C0}\left(1 + 2C_{\mu 0}\frac{\alpha_{dyn}}{\Omega_{RPM}}\right). \quad (79)$$

Thus, expanding to linear order and eliminating baseline terms yields:

$$f_{\tau 0}f_{\tau,dyn} = f_{n0}f_{n,dyn}\sin^2\psi_{C0} + f_{n0}^2\sin^2\psi_{C0}C_{\mu 0}\frac{\alpha_{dyn}}{\Omega_{RPM}}. \quad (80)$$

The borehole torque associated with each torsional frequency component is:

$$\theta_{bh,\omega} = r_c f_{\tau,\omega} = r_c f_{n,\omega}\sin\psi_{C0} - j\omega r_c f_{n0}\sin\psi_{C0}C_{\mu 0}\frac{\alpha_\omega}{\Omega_{RPM}}. \quad (81)$$

The dynamic variation in the tension, associated with axial waves, couples linearly to the dynamic torque in the curved section of the borehole. The present model currently decouples these effects and explores axial and torsional modes independently. The decoupling is accomplished by setting the tension, $T_{dyn}$, to zero while analyzing torsional modes.

For each frequency component, substituting these into the torsional equation of motion and eliminating baseline terms yields:

$$\rho J \omega^2 \alpha_\omega = -\frac{d\tau_\omega}{dl} + \left[ -(1+j)\pi\frac{ID^3 + OD^3}{8}\delta_\omega\rho_{mud}\omega^2 - j\omega r_c f_{n0}\sin\psi_{C0}\frac{C_{\mu 0}}{\Omega_{RPM}}\right]\alpha_\omega. \quad (82)$$

This equation can be rearranged to yield:

$$-\rho J\omega^2[1 + (1+j)\Delta_{mud,\tau} + j\Delta_{bh,\tau}]\alpha_\omega = \frac{d\tau_\omega}{dl} = GJ\frac{d^2\alpha_\omega}{dl^2}, \quad (83)$$

where $$\Delta_{mud,\tau} = \pi\frac{\rho_{mud}}{\rho}\frac{(ID^3 + OD^3)\delta_\omega}{8J}$$

and $$\Delta_{bh,\tau} = \frac{r_c f_{n0}\sin\psi_{C0}}{\rho J}\frac{C_{\mu 0}}{\omega\Omega_{RPM}}.$$

This equation has exactly the same form as the axial equation, with the solution:

$$\alpha_\omega(l) = \alpha_{\omega,u}e^{jk_\tau l} + \alpha_{\omega,d}e^{-jk_\tau l}, \quad (84)$$

where the associated wave vector, $k_\tau$, at frequency, $\omega$, is given by:

$$k_\tau \equiv \frac{\omega}{\sqrt{\frac{G}{\rho}}}\sqrt{1 + (1+j)\Delta_{mud,\tau} + j\Delta_{bh,\tau}}. \quad (85)$$

In the absence of mud and borehole effects, this dispersion relation reduces to the well-known non-dispersive torsional wave along a uniform rod. Once again, borehole and mud damping is typically relatively small, resulting in a weakly damped, nearly non-dispersive wave along the drill tool assembly. These waves typically travel along the entire drill tool assembly rather than just in the bottom hole assembly. One significant difference is that the effective damping associated with the borehole can be negative when the friction law has velocity-weakening characteristics, that is, $C_\mu<0$. This has important implications for stick-slip behavior of the drill tool assembly.

As discussed above, the velocity-dependent damping relationships incorporated into the models of the present systems and methods provide models that are more reliable and more accurate than prior models. More specifically, it has been observed that the mud damping effect increases with increasing velocity whereas the borehole damping effect actually decreases with increasing velocity. Accordingly, in some implementations, models that incorporate both mud effects and borehole effects may be more accurate than models that neglect these effects. While the mud effects and borehole effects may be relatively small, the appropriate modeling of these effects will increase the model accuracy to enable drilling at optimized conditions. Because the costs of drilling operations and the risks and costs associated with problems are so high, misunderstandings of the drilling operations, whether for over-prediction or under-prediction, can result in significant economic impacts on the operations, such as in additional days of drilling or in additional operations to recover from complications.

The torque amplitude is given by:

$$\tau_\omega(l) = GJ\frac{d\alpha_\omega}{dl} = jk_\tau GJ(\alpha_{\omega u}e^{jk_\tau l} - \alpha_{wd}e^{-jk_\tau l}). \quad (86)$$

As in the axial case, the transfer matrix formalism can be used to relate twist and torque amplitudes at the two ends of an element:

$$S_{a,i}(\omega) \equiv \begin{bmatrix} \alpha_\omega(s_i) \\ \tau_\omega(s_i) \end{bmatrix} = \begin{bmatrix} \cos(k_\tau L) & \frac{\sin(k_\tau L)}{k_\tau GJ} \\ -k_\tau GJ\sin(k_\tau L) & \cos(k_\tau L) \end{bmatrix} \begin{bmatrix} \alpha_\omega(s_{i-1}) \\ \tau_\omega(s_{i-1}) \end{bmatrix}. \quad (87)$$

The rest of the torsional formulation precisely follows the axial case, with the appropriate substitution of variables and parameters. The torsional compliance at the surface is defined similarly, using appropriate torsional spring, damping and inertial parameters.

In addition to the elements of the drill tool assembly, the model can accommodate special elements, in its general framework. In general, these can be accommodated as long as expressions relating the baseline solution across the two ends, as well as its associated dynamic transfer matrix, can be described.

Many tubular components of the drill tool assembly, especially the drill pipes, do not have a uniform cross-sectional profile along their length. They tend to be bulkier near the ends (tool joints) where connections are made, and slimmer in the middle. Heavy weight drill pipe and other non-standard drill pipe can also have reinforced sections where the cross-sectional profile is different from the rest of the pipe. Many drill pipes also have tapered cross sections that connect the body of the pipe to the tool joints at the ends, rather than a piecewise constant cross-sectional profile. To construct a drill tool assembly, many nearly identical copies of such tubular components are connected end-to-end to create a structure with many variations in cross-section along its length. Representing each part with a different cross-section as a separate element is tedious and computationally costly. It is desirable to use a simpler effective drill tool assembly description to speed up the computation and reduce the complexity of the model. This can be achieved by taking advantage of the fact that for a section of the drill tool assembly consisting of a series of tubulars of nominally the same design and length, typically around 10 m (30 ft), the variations in cross-section are nearly periodic, with a period (~10 m) that is much smaller than the wavelengths associated with axial and torsional vibrations of interest. Thus, a method of averaging can be employed to simplify the equations to be solved. This method, as it applies for the problem at hand here, is disclosed below.

Consider a section of the drill tool assembly consisting of a number of nominally identical components of length, L, attached end-to-end, for which the cross-sectional area, A, moment of inertia, I, and polar moment of inertia, J, are periodic functions of arc length, l, with a period L that is considered short compared to the characteristic wavelengths of interest. Then, the axial baseline solution can be approximated by:

$$\frac{dT_0}{dl} = (\rho - \rho_{mud})g\langle A\rangle\cos\theta, \quad (88)$$

$$\frac{dh_0}{dl} \approx \frac{1}{E}\left\langle\frac{1}{A}\right\rangle T_0, \quad (89)$$

where the angular brackets denote averaging over one period of the variation:

$$\langle f\rangle \equiv \frac{1}{L}\int_0^L dl f(l). \quad (90)$$

Similarly, the torsional baseline solution can be obtained by replacing the torque outer diameter, $r_c$, and the inverse of the polar moment of inertia 1/J, by their averaged versions. By replacing the geometrical parameters with their averaged values, it is no longer necessary to break up the drill tool assembly into elements of constant cross-section.

Note that inversion and averaging operations are not interchangeable; for example, <1/A> is not equal to 1/<A> unless A is a constant. For a given drill tool assembly component of specified cross-sectional profile, we can define the following shape factors:

$$s_A \equiv \sqrt{\langle A\rangle\left\langle\frac{1}{A}\right\rangle}, \; s_J \equiv \sqrt{\langle J\rangle\left\langle\frac{1}{J}\right\rangle}. \quad (91)$$

For a component with a general cross-sectional profile, these shape factors are always greater than or equal to one, the equality holding only when the cross-section remains constant along the component.

Now turning to the harmonic wave equations, when the geometry parameters are no longer a constant along the arc length, $$\frac{d}{dl}\begin{bmatrix} h_\omega \\ T_\omega \end{bmatrix} = \begin{bmatrix} 0 & 1/EA \\ -\rho A\omega^2[1 + (1+j)\Delta_{mud,a} + j\Delta_{bh,a}] & 0 \end{bmatrix}\begin{bmatrix} h_\omega \\ T_\omega \end{bmatrix}. \quad (92)$$

After applying the method of averaging to the individual elements of the matrix, and further manipulation of equations familiar to someone skilled in the art, the generalized version of the axial transfer matrix is obtained as:

$$T_a \equiv \begin{bmatrix} \cos(k_a s_A L) & \frac{s_A \sin(k_a s_A L)}{k_a E\langle A\rangle} \\ -\frac{k_a E\langle A\rangle}{s_A}\sin(k_a s_A L) & \cos(k_a s_A L) \end{bmatrix}, \quad (93)$$

where the subscript i has been dropped for simplicity. The averaging process also affects the mud and borehole damping parameters as follows:

$$\Delta_{mud,a} \equiv \frac{\rho_{mud}}{\rho}\frac{\pi(ID + OD)\delta_\omega}{2\langle A\rangle}, \quad (94)$$

-continued $$\Delta_{bh,a} \equiv \frac{f_{n0}\sin\psi_{C0}}{\rho\langle A\rangle\omega\Omega_{RPM}}\left(\frac{1}{r_c}\right). \quad (95)$$

The averaged torsional equations can be obtained similarly, with the resulting transfer matrix having the same form as above with the appropriate substitutions of torsional quantities:

$$T_\tau \equiv \begin{bmatrix} \cos(k_\tau s_J L) & \frac{s_J \sin(k_\tau s_J L)}{k_\tau G\langle J\rangle} \\ -\frac{k_\tau G\langle J\rangle}{s_J}\sin(k_\tau s_J L) & \cos(k_\tau s_J L) \end{bmatrix}, \quad (96)$$

where, the torsional damping parameters are also appropriately averaged.

The most significant effect of using drill tool assembly components with a non-uniform cross-section is to change the wave vectors associated with axial and torsional waves at a given frequency by a constant shape factor. In other words, the velocities of axial and torsional waves along this section of the drill tool assembly are reduced by $s_A$ and $s_J$, respectively. This causes an associated shift of resonant frequencies of the drill tool assembly to lower values, which can be important if the model is used to identify RPM "sweet spots". As mentioned at various places herein, the costs of drilling operations makes even minor improvements in predictions and corresponding operations efficiencies valuable.

To illustrate the magnitude of this effect, let us consider a typical 5" OD, 19.50 pound per foot (ppf) high strength drill pipe with an NC50(XH) connection. A section of the drill tool assembly consisting of a number of these drill pipes will have a repeating cross-sectional pattern, consisting of approximately 30 ft of pipe body with an OD=5" and ID=4.276", and a tool joint section with a total (pin+box) length of 21", OD=6.625" and ID=2.75". The corresponding shape factors for this pipe are $s_A$=1.09 and $s_J$=1.11, respectively. Thus, if most of the drill tool assembly length consists of this pipe, the tool joints may cause a downward shift of resonant frequencies of up to about 10%, compared to a drill pipe of uniform cross-section. This can be significant depending on the application, and may be included in an exemplary embodiment of the invention.

Drill Tool Assembly Performance Assessment

The baseline solution, frequency eigenstates, and linear response functions provided by the base model may be used to evaluate downhole vibration attributes that include but are not limited to bit bounce and stick-slip tendencies of drill tool assembly designs, which may be by means of compliances derived from these results. More specifically, downhole vibration attributes for the drill tool assembly may include but are not limited to bit disengagement index, ROP limit state index, bit bounce compliance index, bit chatter index, relative bit chatter index, stick-slip tendency index, bit torsional aggressiveness index, forced torsional vibration index, relative forced torsional vibration index, axial strain energy index, torsional strain energy index, and combinations thereof. Without restricting the scope of the claimed invention, a few examples are presented below.

In one exemplary embodiment of the claimed subject matter, a downhole vibration attributed may be determined by the effective compliance (axial and torsional) of the drill tool assembly:

$$C_{a,bit}(\omega) = \frac{h_\omega(0)}{T_\omega(0)} \quad (97)$$

and $$C_{\tau,bit}(\omega) = \frac{\alpha_\omega(0)}{\tau_\omega(0)} \quad (98)$$

The axial compliance provides the relationship between the axial displacement and tension amplitude at a particular frequency. Similarly, the torsional compliance relates the angular displacement amplitude to the torque amplitude. The compliance is a complex function of ω and has information on both the relative magnitude and phase of the oscillations.

Compliance functions defined at the bit can be referenced to surface parameter measurements using the bit-to-surface transfer functions described in (93) and (96). In the following discussion, certain relationships are discussed which can thereby be referenced to surface measurements. The indices below are exemplary Vibration Amplitude Ratios which may be translated to the surface using the methods taught above, with corresponding reference values translated to reference values of surface parameters for comparison with surface measurements to obtain the desired real-time vibration severity estimates to improve drilling performance.

Axial Compliance—Bit Bounce

In evaluating the drill tool assembly performance considering forced displacement at the bit, the drill bit is assumed to act as a displacement source at certain harmonics of the RPM. For roller cone (RC) bits with three cones, the 3×RPM mode is generally implicated in bit bounce, thus it is appropriate to treat n=3 as the most important harmonic mode. For PDC bits, the number of blades is likely to be an important harmonic node. Also, in a laminated formation, any mismatch between the borehole trajectory and the toolface, such as during directional drilling, will give rise to an excitation at the fundamental frequency, thus n=1 should always be considered. Considering the harmonics, n=3 for RC bits and n=1 and blade count for PDC bits, should be used; however, considering other frequencies are within the scope of this invention.

It is assumed that the origin of the displacement excitation is the heterogeneity in the rock, such as hard nodules or streaks, or transitions between different formations. While passing over these hard streaks, the drill bit is pushed up by the harder formation. If the additional axial force that is generated by the drill tool assembly response to this motion exceeds the WOB, the resulting oscillations in WOB can cause the bit to lose contact with the bottom hole. The situation is similar to the case when a car with a stiff suspension gets airborne after driving over a speed bump. The effective spring constant of the drill tool assembly that generates the restoring force is given by:

$$k_{DS}(n) = \text{Re}\left[-\frac{1}{C_{a,bit}(n\Omega_{RPM})}\right]. \quad (99)$$

The worst-case scenario occurs when the strength of the hard portions significantly exceed the average strength of the rock, such that the bit nearly disengages from its bottom hole pattern, resulting in an excitation amplitude equal to the penetration per cycle (PPC), or the amount the drill tool assembly advances axially in one oscillation period; thus, it is assumed that:

$$h_{n\Omega_{RPM}}(0) = a \cdot PPC; \ PPC \equiv \frac{2\pi \cdot ROP}{n\Omega_{RPM}}. \quad (100)$$

The proportionality constant, a, between the PPC and the imposed displacement amplitude can be adjusted from 0 to 1 to indicate rock heterogeneity, with 0 corresponding to a completely homogeneous rock and 1 corresponding to the presence of very hard stringers in a soft rock. A bit bounce index can then be defined by the ratio of the dynamic axial force to the average WOB. Setting the proportionality constant, a, to one corresponds to a worst-case scenario:

"Bit Disengagement Index"

$$BB_1(n) = k_{DS}(n)\frac{PPC}{WOB} \quad (101)$$
$$= \frac{ROP}{WOB} \cdot \frac{2\pi\mathrm{Re}[-C_{a,bit}(n\Omega_{RPM})]}{n\Omega_{RPM}\|C_{a,bit}(n\Omega_{RPM})\|^2}$$

The bit would completely disengage from the rock for part of the cycle if this ratio exceeds one, so the design goal would be to minimize this index; keeping it small compared to one. The index is only relevant when the real part of the compliance is negative, that is, when the drill tool assembly actually pushes back.

The first ratio in this expression depends on the bit and formation characteristics, and this can be obtained from drill-off tests at the relevant rotational speeds. Alternatively, the vibrational performance of an already-run drill tool assembly design can be hindcast using ROP and WOB data in the drilling log.

In a pre-drill situation where ROPs are not known, it may be more advantageous to provide a pre-drill ROP "limit state" estimate associated with a bit bounce index of one:

"ROP Limit State Index"

$$MAXROP(n) = WOB \cdot \frac{n\Omega_{RPM}\|C_{a,bit}(n\Omega_{RPM})\|^2}{2\pi\mathrm{Re}[-C_{a,bit}(n\Omega_{RPM})]}. \quad (102)$$

A contour plot of this quantity will indicate, for a given set of drilling conditions, the ROP beyond which bit bounce may become prevalent and the design goal would be to maximize the ROP within an operating window without inducing excessive or undesirable bit bounce.

For the purposes of drill tool assembly design, a comparative bit bounce index that takes into account only drill tool assembly properties can be useful:

"Bit Bounce Compliance Index"

$$BB_2(n) = \frac{\mathrm{Re}[-C_{a,bit}(n\Omega_{RPM})]}{nD_b\|C_{a,bit}(n\Omega_{RPM})\|^2}, \quad (103)$$

where $D_b$ is the bit diameter. The design goal would be to minimize this quantity in the operating window. It is a relative indicator, in that the actual magnitude does not provide any quantitative information; however, it has units of stress and should be small when compared to the formation strength. Only positive values of this parameter pose a potential axial vibration problem.

For cases where the uncertainty in the input parameters does not allow accurate determination of the phase of the compliance, a more conservative index can be used by replacing the real part with the magnitude and disregarding the phase. The discussion above illustrates several available indices that can be developed from the relationships within the borehole. Other suitable indices may be developed applying the systems and methods of the present disclosure and are within the scope of the present disclosure.

Another important potential source of axial vibration is regenerative chatter of the drill bit, which has a more solid foundational understanding. As a source of axial vibration, relationships defining regenerative chatter behavior can be used to provide still additional performance indices. Regenerative chatter is a self-excited vibration, where the interaction between the dynamic response of the drill tool assembly and the bit-rock interaction can cause a bottom hole pattern whose amplitude grows with time. This is a well-known and studied phenomenon in machining, metal cutting and milling, and is referred to as "chatter theory". In comparison to the earlier discussion, this type of instability can occur in completely homogeneous rock and is more directly tied to the drill tool assembly design.

Linear theories of regenerative chatter were developed in the 1950's and 1960's by various researchers, including Tobias, Tlusty and Merritt. In the years since the introductory theories of regenerative chatter, significant improvements have been made to the theories including theories that feature predictive capabilities. Chatter can occur at frequencies where the real part of the compliance is positive, thus it covers frequencies complementary to the ones considered previously. The sign convention used in the present systems and methods is different from most conventional descriptions of chatter. For these frequencies, chatter can occur if:

$$\frac{\partial(PPC)}{\partial(WOB)} < 2\mathrm{Re}[C_{a,bit}(\omega)]. \quad (104)$$

For unconditional stability, this inequality needs to be satisfied for any candidate chatter frequency. The penetration per cycle (PPC) can be related to ROP:

$$\frac{\partial(PPC)}{\partial(WOB)} = \frac{2\pi}{\omega}\frac{\partial(ROP)}{\partial(WOB)}. \quad (105)$$

Thus, the criterion for unconditional stability can be made into a chatter index:

"Bit Chatter Index"

$$BB_3 \equiv \left[\frac{\partial(ROP)}{\partial(WOB)}\right]^{-1}\max_\omega\left\{\frac{\omega\mathrm{Re}[C_{a,bit}(\omega)]}{\pi}\right\}. \quad (106)$$

This quantity needs to be less than one for unconditional stability. If calibration (drill-off) information is not available, it is still possible to construct a relative chatter index:

"Relative Bit Chatter Index"

$$BB_4 \equiv \frac{D_b}{\Omega_{RPM}}\max_\omega\{\omega\mathrm{Re}[C_{a,bit}(\omega)]\} \quad (107)$$

In reality, requiring unconditional stability is conservative, since the chatter frequency and RPM are related. It is possible to compute a conditional stability diagram and locate RPM "sweet spots" by fully employing Tlusty's theory. This computation is complicated by the fact that the effective bit compliance itself is a function of RPM, although the dependence is fairly weak. This results in a more computationally intensive analysis, which is not described in detail herein, but which is within the broader scope of the present disclosure.

Torsional Compliance—Stick-Slip

While torsional vibration, also referred to as stick-slip, can be caused or influenced by a number of factors within the borehole, the interaction between the bit and the formation is an important factor. The prevailing explanation of bit-induced stick-slip is that it arises as an instability due to the dependence of bit aggressiveness (Torque/WOB ratio) on RPM. Most bits exhibit reduced aggressiveness at higher RPMs. At constant WOB, the torque generated by the bit actually decreases as the bit speeds up, resulting in RPM fluctuations that grow in time. What prevents this from happening at all times is the dynamic damping of torsional motion along the drill tool assembly. Stick-slip behavior can potentially occur at resonant frequencies of the drill tool assembly, where "inertial" and "elastic" forces exactly cancel each other out. When this occurs, the real part of the compliance vanishes:

$$Re[C_{\tau,bit}(\omega_{res,i})]=0; i=1,2, \quad (108)$$

The magnitude of the effective damping at this frequency is given by:

$$\gamma_{\tau,i} = Im\left[\frac{1}{\omega_{res,i}C_{\tau,bit}(\omega_{res,i})}\right]. \quad (109)$$

If one assumes that the dynamical response of the bit can be inferred from its steady-state behavior at varying RPMs, then the damping parameter associated with the bit is given by:

$$\gamma_{bit} = \frac{\partial \tau_{bit}}{\partial \Omega_{RPM}}. \quad (110)$$

Stick-slip instability occurs when the negative bit damping is large enough to make the overall damping of the system become negative:

$$\gamma_{bit}+\gamma_{\tau,i}<0. \quad (111)$$

A drill tool assembly has multiple resonant frequencies, but in most cases, the effective drill tool assembly damping is smallest for the lowest-frequency resonance (i=1), unless vibration at this frequency is suppressed by active control such as Soft Torque™. Thus, the presently-described model locates the first resonance and uses it to assess stick-slip performance. Other suitable models used to develop indices may consider other resonances. A suitable stick-slip tendency index can be constructed as:

"Stick-Slip Tendency Index"

$$SS_1 = \frac{\tau_{rig}}{\Omega_{RPM}(\gamma_{\tau,1}+\gamma_{bit})}. \quad (112)$$

The factor multiplying the overall damping coefficient is chosen to non-dimensionalize the index by means of a characteristic torque (rig torque) and angular displacement (encountered at full stick-slip conditions). Another reasonable choice for a characteristic torque would be torque at the bit; there are also other characteristic frequencies such as the stick-slip frequency. Accordingly, the index presented here is merely exemplary of the methodology within the scope of the present disclosure. Other index formulations may be utilized based on the teachings herein and are within the scope of the present invention. The design goal of a drill tool assembly configuration design and/or a drilling operation design would be to primarily avoid regions where this index is negative, and then to minimize any positive values within the operating window.

This index requires information about how the bit torque depends on RPM. The exemplary embodiment uses a functional form for the bit aggressiveness as follows:

$$\mu_b \equiv \frac{3\tau_{bit}}{D_b \cdot WOB} = \mu_d + \frac{\mu_s - \mu_d}{1+(\Omega_{RPM}/\Omega_{XO})}, \quad (113)$$

where $D_b$ is the bit diameter. Other implementations may utilize other relationships to describe how the bit torque depends on RPM. According to the present implementation, as the RPM is increased, the bit aggressiveness goes down from its "static" value $\mu_s$ at low RPMs towards its "dynamic" value $\mu_d$ at high RPMs, with a characteristic crossover RPM associated with angular velocity $\Omega_{XO}$. Then, $$\gamma_{bit} \equiv \frac{D_b \cdot WOB}{3}\left(-\frac{1}{\Omega_{XO}}\right)\left(\frac{\mu_s-\mu_d}{1+(\Omega_{RPM}/\Omega_{XO})^2}\right). \quad (114)$$

Other suitable functional forms can also be used. It should be noted that if a mud motor is present, the rotation speed at the bit should be used to compute the damping of the bit. Mud motor systems operate at higher RPMs and tend to have significant torsional damping due to their architecture. Use of mud motors can significantly reduce stick-slip risk; this effect can be accounted for if the dynamic transfer matrix of the mud motor is provided to the model. Other suitable adaptations of the present models to account for various other drill tool assembly elements and configurations are within the scope of the present disclosure.

If no bit characteristic information is available, a relative index can be used for the purposes of side-by-side comparison of drill tool assembly designs by assuming suitable default values, such as 0.3 for bit aggressiveness and no velocity weakening. This index will not allow determination of when stick-slip will occur, but will provide a relative comparison between different drill tool assembly designs meant for the same bit, with the better designs having a lower index:

"Bit Torsional Aggressiveness Index"

$$SS_2 = \frac{\tau_{rig}(\mu_b=0.3)}{\Omega_{RPM}\gamma_{\tau,1}}. \quad (115)$$

In order to evaluate drill tool assembly performance under torsional forcing, the linear response to various types of excitations can be considered, all of which are within the scope of the disclosed invention. In one exemplary embodiment, the drill bit is assumed to act as a source of torque oscillations with a frequency that matches the rotary speed and its harmonics. When one of these harmonics is close to one of the torsional resonant frequencies of the drill tool assembly, severe torsional oscillations can be induced due to the large effective compliance of the drill tool assembly, i.e., a small torque oscillation can result in a large variation in the rotary speed of the bit. The effective torsional compliance at the bit, taking into consideration drill string and bit damping is given by, $$C_{\mathit{eff}}(\omega) = \left[\frac{1}{C^*_{bit}(\omega)} + \frac{1}{C_{\tau,bit}(\omega)}\right]^{-1} \quad (116)$$

where, $C^*_{bit}(\omega)=1/j\omega\gamma_{bit}$. The * is used to indicate that the term is not a true compliance and only includes the velocity weakening term associated with the bit aggressiveness. A non-dimensionalized forced torsional vibration index for the nth harmonic excitation can then be defined as:
"Forced Torsional Vibration Index"

$$TT_1(n)=n\tau_{rig}\|C_{\mathit{eff}}(n\Omega_{RPM})\|. \quad (117)$$

For the desired range of drilling parameters, better drill tool assembly and bit designs result in lower indices. The index is normalized such that it reflects the ratio of a characteristic torque (chosen here as the torque at the surface) to the excitation torque amplitude needed to achieve full stick-slip at the bit. Another reasonable choice for a characteristic torque would be torque at the bit. There are also other characteristic frequencies that can be considered, another example is disclosed below. Accordingly, the index presented here is merely exemplary of the methodology within the scope of the present disclosure. Other index formulations may be utilized based on the teachings herein and are within the scope of the present invention. The design goal would be to minimize the index within the operating window.

If no bit characteristic information is available, suitable default values such as 0.3 for bit aggressiveness and no velocity weakening can be assumed and a relative index similar to the stick slip index can then be defined as:
"Relative Forced Torsional Vibration Index"

$$TT_2(n)=n\tau_{rig}(\mu_b=0.3)\|C_{\tau,bit}(n\Omega_{RPM})\|. \quad (118)$$

This index can provide a relative comparison between different drill tool assembly designs utilizing the same bit, with the better design having a lower vibration index.
Elastic Energy in the Drill Tool Assembly The amount of stored elastic energy in the drill tool assembly resulting from dynamic conditions can be an indicator of excessive motion that can lead to drill tool assembly damage, wear of pipe and casing, and perhaps even borehole breakouts and other poor hole conditions. The amount of stored elastic energy in the drill tool assembly may be written in integral form as:

$$F = \frac{1}{2}\int_0^L \left\{EA\left(\frac{\partial h}{\partial s}\right)^2 + GJ\left(\frac{\partial \alpha}{\partial s}\right)^2 + EI\|\kappa\|^2\right\}ds. \quad (119)$$

Since the hole curvature can be considered to be pre-determined and not part of the dynamics problem, the first two terms in the integrand, the dynamic axial strain energy and torsional strain energy respectively, may be used as, or considered in, additional vibration indices. Better performance would generally be associated with lower index values calculated as follows:

"Axial Strain Energy Index"

$$EE_1 = \int_0^L EA\left(\frac{\partial h}{\partial s}\right)^2 ds. \quad (120)$$

"Torsional Strain Energy Index"

$$EE_2 = \frac{1}{2}\int_0^L GJ\left(\frac{\partial \alpha}{\partial s}\right)^2 ds. \quad (121)$$

The particular solutions used in computing the indices above can be the baseline solution, the dynamic part of the linear response functions at a relevant frequency (a harmonic of the RPM, or a resonant frequency in the case of chatter or stick-slip), or a superposition of the two.

EXAMPLES

Figure 14:
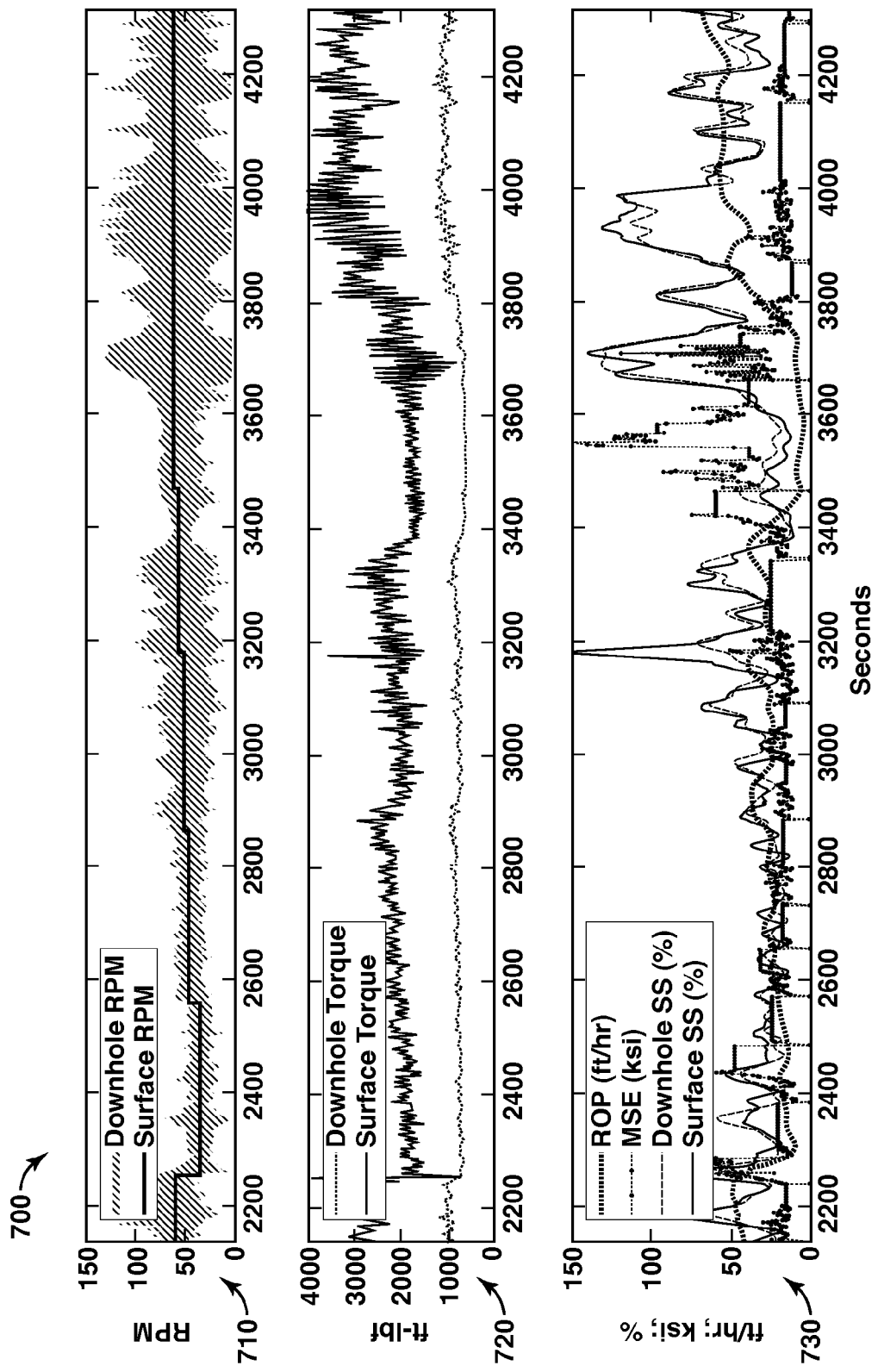
FIG. 14 provides an illustration of an exemplary downhole and surface torsional severity demonstration.

During the drilling of a well, a downhole vibration sensor sub was used to collect rotary speed at the bit at a rate of 50 samples per second, allowing direct determination of torsional severity. Data from the rig acquisition system was also collected at a rate of one sample per second. FIG. 14 illustrates a collected presentation of time related data 700, wherein the top panel 710 reflects a portion of the rotary speed data, whereby the smooth line is surface data and the cross-hatched region represents the downhole data. Although the rotary speed at the rig appears steady, varying levels of stick-slip are evident in the downhole data. A zoom-in to the data (not shown) reveals that the prevalent behavior is "unstable torsional oscillation," and the RPM variations occur at a period close to the computed primary period P1. The middle panel 720 illustrates the torque signal observed at the rig (jagged line) and downhole (smoother line). Large torque fluctuations with the same period are evident whenever stick-slip severity is large, even though the torque at the bit is relatively steady, consistent with the postulated boundary conditions.

The bottom panel 730 reflects a comparison of torsional severity (here reported as the ratio of RPM fluctuation amplitude and average RPM, in percent) obtained directly from the downhole data and estimated from the rig torque signal using the method disclosed herein. The two curves track each other very well, except when the top drive RPM is changed to a new value, which is expected. Also illustrated are the ROP and MSE data displayed on the rig during this interval. The ROP and MSE signals do not correlate well with the torsional severity. One exception is the interval around 3700 seconds where high values of both MSE and torsional severity are seen. Further analysis of the downhole data suggests coexisting stick-slip and whirl in this interval. Thus, the ability to monitor both MSE and TSE1 (or TSEu) can provide more insight on downhole behavior, compared to either signal on its own.

Figure 15:
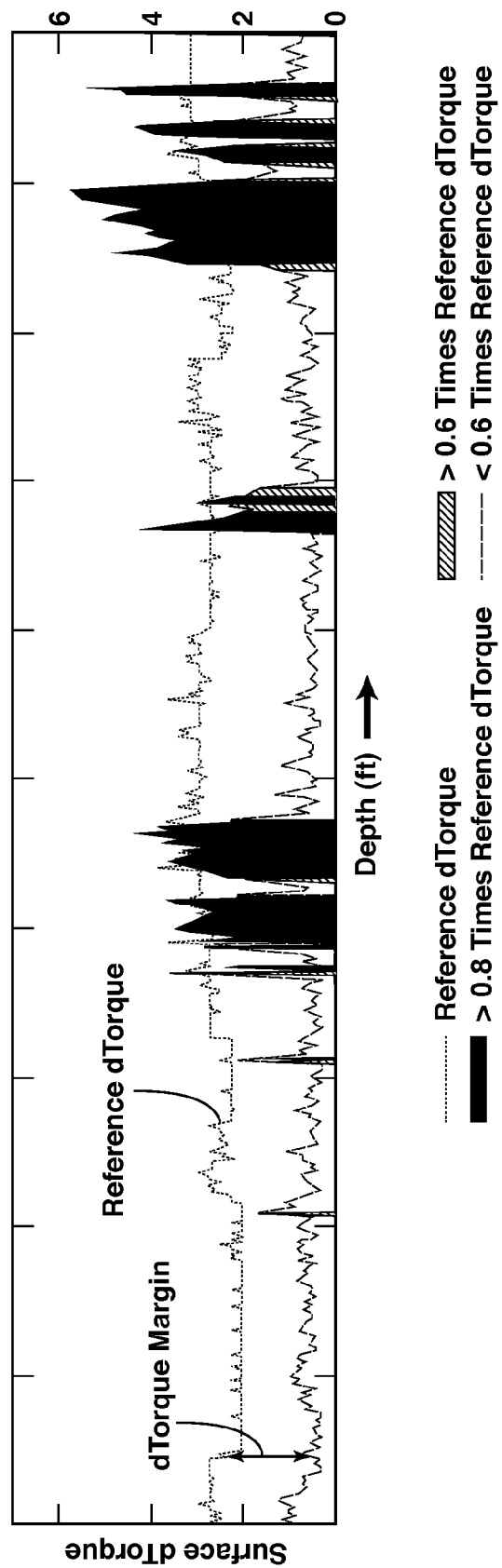
FIG. 15 provides an exemplary illustration of measured dTorque and reference dTorque.

In another example, FIG. 15 illustrates one method of how the inventive method may be practiced. The reference surface dTorque is estimated by using the surface RPM and pre-calculating the cross-compliance using the drill tool assembly description. Additionally, the surface dTorque is calculated from the surface Torque data. In this particular instance, data was available at one second intervals. This ensured that the minimum Nyquist criterion associated with the fundamental period was met. The two sets of curves (reference surface dTorque and measured surface dTorque) are illustrated in FIG. 15. An alarm sequence is then developed based on consideration of safe operating zones and the reference operating zones. Here, the measured surface dTorque is divided into three distinct segments: (a) less than 60% of reference dTorque, (b) between 60% and 80% of reference dTorque, and (c) greater than 80% of reference dTorque. In this example, it is assumed that operating at less than 60% of the reference dTorque corresponds to a safe operating zone while above 80% of the reference dTorque corresponds to a reference operating zone where mitigation practices are necessary. This is merely one exemplary implementation and other criteria may be selected without departing from the spirit of the invention.

FIG. 15 also illustrates a segment indicating "dTorque margin," which corresponds to the difference between the reference surface dTorque and the measured surface dTorque. This excess dTorque suggests that the bit can be drilled more aggressively at higher WOB's with greater depth of cut. Alternatively, the rotary speeds could be lowered while continuing to operate at some level of torsional oscillations if deemed appropriate to mitigate other vibration modes. Thus, the ability to monitor dTorque in conjunction with the reference dTorque can provide more insight on what is happening downhole with suitable mitigation options to drill more efficiently. This monitoring and adjustment of the drilling parameters may be performed in real time while the well is being drilled.

The dTorque and reference dTorque values may be combined to obtain the TSE. The results may be displayed such as in the set of graphs 800 illustrated in FIG. 16, wherein TSE is compared with measured downhole torsional severity. The downhole measurements are obtained by computing a ratio of the maximum fluctuations in rotary speed to the average value of the rotary speed. It is observed that quantitative and qualitative values match well throughout the depth range of interest, which is comprised of about 1700 data points. The quality factor (QF) described in Eq. (23) is then used to compute the accuracy of the estimate. This detail is displayed as the quality factor curve in the third chart in FIG. 16.

Figure 16:
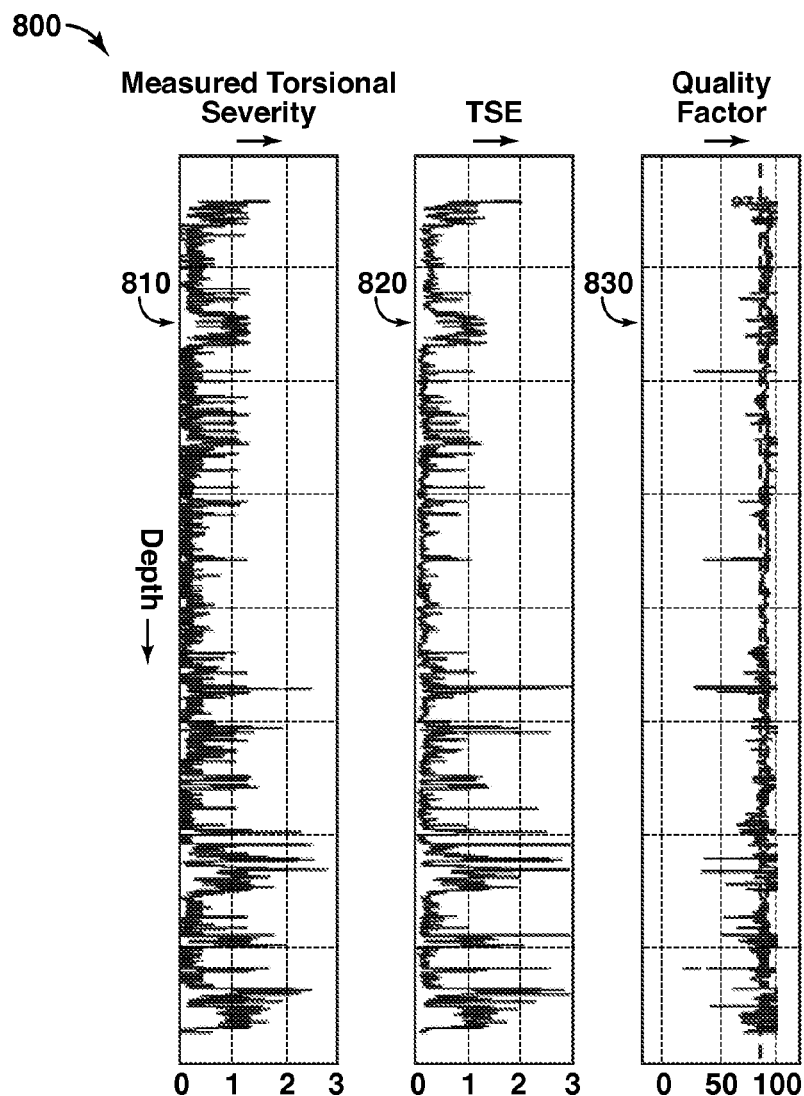
FIG. 16 is an exemplary illustration of measured and estimated torsional severity and quality factor.
Figure 17:
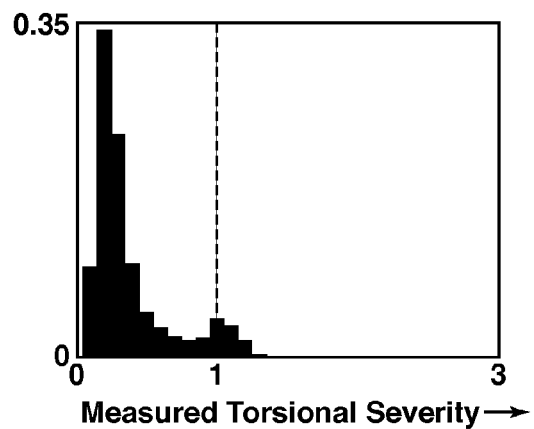
FIG. 17 demonstrates an exemplary histogram of measured torsional severity from downhole data.

For the dataset of FIG. 16, a histogram may be used to visually demonstrate the distribution of the measured torsional severity 810 of the downhole vibrations at the bit, as seen in FIG. 17. This chart demonstrates that although most of the time the bit was in less than 25% stick-slip, there were occasions when the bit was stuck for a more significant period of time. In some methods, at a TSE value of one, the bit may momentarily be in full stick-slip. When the momentarily stuck bit becomes free it can accelerate to a value of more than two times the average surface rotary speed. When this occurs, the TSE curve 820 may reflect a TSE value that is relatively close to, meets, or even exceeds a value of one.

Figure 18:
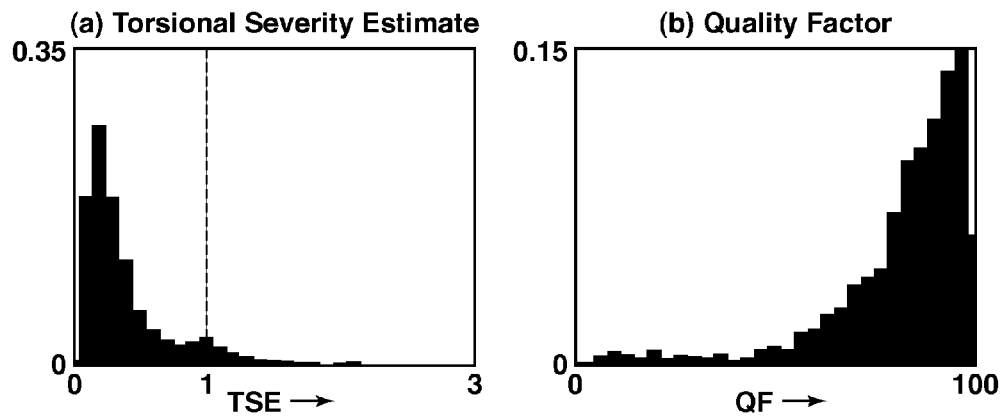
FIG. 18 illustrates an exemplary torsional severity estimate calculated from surface data using a nonlinear drill string model and the corresponding quality factor histogram.

For this same dataset used in FIG. 16, the distribution of the torsional severity estimate TSE 820 (that was calculated or otherwise determined from the surface data using the drill string model described herein) is illustrated as a histogram chart in FIG. 18(a). One may observe a general similarity between this chart and FIG. 17. The Quality Factor (QF) 830 in FIG. 16 was calculated and presented to compare the measured 810 and calculated 820 severity data. This QF distribution is provided as a histogram in FIG. 18B. Though not an ideal drilling operation, the chart in FIG. 18(b) is peaked towards a quality factor of 100%, as desired.

Figure 19:
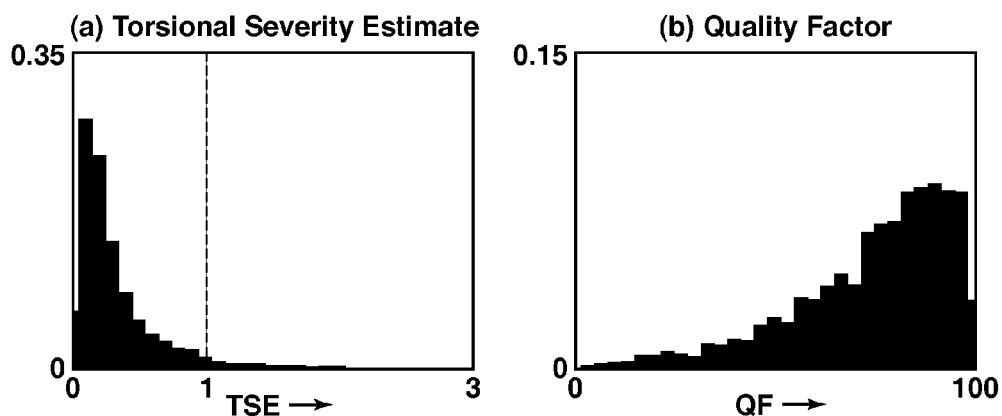
FIG. 19 illustrates an exemplary torsional severity estimate calculated from surface data using a simple linear compliance model and the corresponding quality factor histogram.

The torsional vibration severity was also estimated using a simple model that considers only the length and static torsional stiffness of the drill sting component in the drill tool assembly. This model does not consider certain drill string physics that are present and as such provides a less reliable determination of TSE than the methods such as disclosed herein. The results of this analysis are illustrated in FIG. 19. Although FIG. 19(a) somewhat resembles the measured TSE of FIGS. 17 and 18(a), some divergence is notable. The QF was calculated for this estimate, and the distribution is presented in FIG. 19(b). Comparison of chart FIG. 19(b) with FIG. 18(b) demonstrates a significant reduction in the quality of the downhole torsional vibration severity estimate TSE from the same surface data. This clearly demonstrates that a more reliable estimate of downhole vibrational severity may be obtained simply by using an improved underlying drill string model, such as provided by the claimed inventive subject matter of the present disclosure. The accurate model of this invention provided significantly better estimates of torsional vibration severity. The deviations between these models may be expected to increase—and the more accurate methods of the present invention will become more desirable and useful—with increasing depth, where stick-slip tends to becomes more pronounced.

Figure 20:
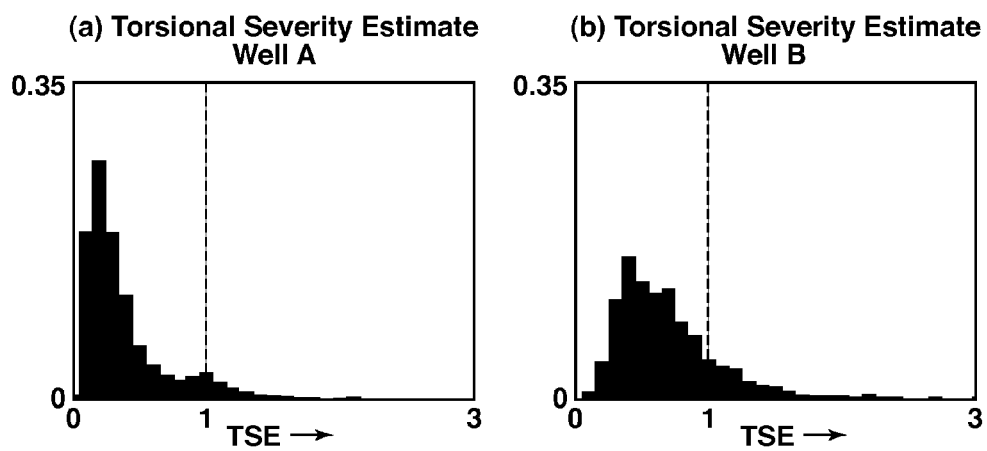
FIG. 20 illustrates exemplary torsional severity estimates from surface data from two wells, using a selected drill string model.

An additional utility of these methods may be observed with reference to FIG. 20. This application will be described in one non-limiting case, wherein it is understood that additional applications with different features are also seen in commercial operations.

Consider a drilling program in which many wells may be drilled, and optimization of the drilling process is a primary factor in the development engineering. With a specified bit design and one set of operating parameters, Well A is drilled and the drilling data is recorded. From this data, the torsional severity estimate is calculated with an accurate physical drill string model. These results are displayed in FIG. 20(a). From this data, it is determined that it is appropriate to conduct a trial with a more aggressive bit and/or more aggressive drilling operating parameters. With these conditions, Well B is subsequently drilled and the corresponding data is obtained. Using the same exemplary model, the torsional severity estimate is calculated, and its distribution is provided in FIG. 20(b).

The calculations of TSE may provide some indication of the relative amounts of stick-slip that were present in the drilling operations of each of Well A and Well B. This valuable information can be used in a continuous optimization process, or "relentless re-engineering" effort to combine this information with other data such as: average ROP, bit dull characteristics, Mechanical Specific Energy (MSE), number of bit runs required to drill the section, and other vibration and drilling performance indicators known to those skilled in the art.

The estimated downhole vibration amplitude (e.g., torsional, axial, etc.), when divided by the reference downhole vibration amplitude, provides a numerical estimate of how close the drilling operation is to the reference state. However, as discussed above, it may be more convenient to provide instead an alarm level associated with the estimate. For instance, low levels of estimated vibration amplitude may yield a green light, high levels a red light, and intermediate levels a yellow light.

Such a discrete classification scheme may be validated using downhole data with a table similar to that in FIG. 21. In this case, a green light is associated with measured surface dTorques of less than 70% of the reference dTorque; a red light is associated with measured surface dTorques of more than 100% of the reference dTorque; and a yellow light is associated with all intermediate measured surface dTorques. Then the estimated value e of the downhole vibration amplitude severity may be compared to the measured value m at any point in time. Each cell in the table gives the fraction of the time periods during the drilling operation in which e lies in the range indicated in the leftmost column and m lies in the range indicated in the topmost row. The row sums in the rightmost column give the total fraction of the time periods that the different light colors were displayed, and the column sums in the bottommost row give the total fraction of the time periods that amplitudes corresponding to the different light colors were measured downhole.

Various combinations of the values in this table may be made in order to measure the quality of the estimated classification. Several of these are shown in FIG. 21. The "rate of false negatives" is the fraction of the time in which e indicated a green light but the downhole measurement warranted a red light. Similarly, the "rate of false positives" is the fraction of the time in which e indicated a red light but the downhole measurement warranted a green light. The "total badness" is then just the sum of these two rates, and is a measure of how often the estimate was most consequentially wrong. The "full stick-slip prediction accuracy" is the fraction of the time spent in red light conditions downhole during which e correctly indicated a red light. Similarly, the "stick-slip warning accuracy" is the fraction of the time spent in yellow or red light conditions downhole during which e indicated either a yellow or a red light.

The method disclosed herein teaches and enables drilling operations performance engineering methods that were previously not available using previously available methods that relied only upon surface data measurements to estimate or project downhole responses. The presently claimed methodology provides enabling tools and technology to optimize the wellbore drilling process.

In other embodiments, the present inventive subject matter may include:

1. A method to estimate severity of downhole vibration for a wellbore drill tool assembly, comprising the steps:
   a. Identifying a dataset comprising selected drill tool assembly parameters;
   b. Selecting a reference level of downhole vibration amplitude for the drill tool assembly;
   c. Identifying a surface drilling parameter and calculating a reference surface vibration attribute for the selected reference level of downhole vibration amplitude;
   d. Determining a surface parameter vibration attribute derived from at least one surface measurement or observation obtained in a drilling operation, the determined surface parameter vibration attribute corresponding to the identified surface drilling parameter (step c); and
   e. Estimating a downhole vibration severity indicator by evaluating the determined surface parameter vibration attribute (step d) with respect to the identified reference surface vibration attribute (step c).

2. The method of paragraph 1, including an additional step (f) in which the quality of the vibration severity estimate from surface measurements is obtained by comparing the estimate based on surface data with data obtained from downhole measurements of the reference downhole vibration amplitude.

3. The method of paragraph 2, including an additional step (g) in which the quality of the vibration severity estimate from surface measurements is used to calibrate the model parameters to obtain the best match between measured and predicted downhole data.

4. The method of paragraph 1, including an additional step (f) in which the vibration severity estimates from surface measurements for one or more drilling intervals are used to evaluate drilling performance and recommend selection of a drill bit design characteristic or other drilling parameter for the next interval.

5. The method of paragraph 1, including an additional step (f) in which at least one drilling parameter is adjusted to maintain at least one vibration severity estimate from surface measurements at a desired value.

6. The method of paragraph 1, wherein the identified dataset comprises one or more of selected drill tool assembly design parameters, wellbore dimensions, measured depth (MD), projected drilling operation parameters, wellbore survey data, and wellbore fluid properties.

7. The method of paragraph 1, wherein the reference level of downhole vibration amplitude (step b) is selected as a function of one or more of downhole drill tool assembly rotational velocity, downhole axial velocity or acceleration, downhole axial load, downhole torsional moment, and combinations thereof.

8. The method of paragraph 1, wherein vibration relates to vibration of one or more components of the drill tool assembly and comprises one or more of torsional vibration, axial vibration, lateral vibration, and combinations thereof.

9. The method of paragraph 1, wherein selecting a reference level of downhole vibration amplitude (step b) comprises selecting a downhole condition for the drill tool assembly for which the rotary velocity is momentarily zero.

10. The method of paragraph 1, wherein selecting a reference level of downhole vibration amplitude (step b) comprises selecting a downhole condition where a weight on bit (WOB) parameter is momentarily zero.

11. The method of paragraph 1, wherein selecting the reference level of downhole vibration amplitude (step b) comprises selecting an undesirable downhole condition.

12. The method of paragraph 1, wherein identifying the surface drilling parameter and calculating a reference surface vibration attribute (step c) includes calculating a reference value for one or more of a surface indicated torque, a surface indicated hook load, a surface indicated rotational velocity of the drill string, a surface indicated bit penetration rate, a surface indicated axial acceleration, and combinations thereof.

13. The method of paragraph 1, wherein calculating the reference surface vibration attribute (step c) includes determining one or more of vibration amplitude, period, primary period, standard deviation, statistical measure, time derivative, slew rate, zero crossings, Fourier amplitude, state observer estimate, other mode observer estimate, resonance, cross compliance, and combinations thereof.

14. The method of paragraph 1, wherein determining the surface parameter vibration attribute (step d) includes determining one or more of a surface torque, a surface hook load, surface rotational velocity of the drill string, a surface measured bit penetration rate, a surface measured weight on bit, a surface axial acceleration, and combinations thereof.

15. The method of paragraph 1, wherein determining a surface parameter vibration attribute (step d) includes calculating a reference value for one or more of a surface indicated torque, a surface indicated hook load, a surface indicated rotational velocity of the drill string, a surface indicated bit penetration rate, a surface indicated axial acceleration, and combinations thereof.

16. The method of paragraph 1, wherein determining a surface parameter vibration attribute (step d) comprises using one or more of vibration amplitude, period, primary period, standard deviation, statistical measure, time derivative, slew rate, zero crossings, Fourier amplitude, state observer estimate, other mode observer estimate, resonance, cross compliance, and combinations thereof.

17. The method of paragraph 1, wherein steps a, b, and c are performed prior to performing steps (d) and (e).

18. The method of paragraph 1, further comprising the step of adjusting one or more drilling parameters in response to the estimated downhole vibration severity indicator.

19. The method of paragraph 1, wherein estimating the downhole vibration severity indicator (step e) further comprises:

Determining one or more ratios of: the selected reference level of downhole vibration amplitude for the drill tool assembly (step b) to the calculated reference surface vibration attribute (from this step c); and Estimating the downhole vibration severity indicator by evaluating the determined surface parameter vibration attribute (step d) with respect to one or more of the determined ratios.

20. The method of paragraph 1, wherein estimating the downhole vibration severity indicator (step e) further comprises:

Calculating a reference surface vibration attribute (step c) comprises calculating a rate of change with respect to time of a surface parameter for a reference level of a downhole vibration attribute;

Determining the rate of change with respect to time of the surface parameter (step d) from at least one measurement or observation obtained in a drilling operation; and Estimating a downhole vibration severity indicator (step e) by evaluating the determined surface parameter rate of change (step d) with respect to the calculated reference level of the rate of change of the surface parameter (step c).

21. The method of paragraph 1, wherein estimating the downhole vibration severity indicator (step e) further comprises:

Calculating a reference surface vibration attribute (step c) including determining one or more characteristic periods of vibration of the drill tool assembly;

Determining the surface parameter vibration attribute (step d) derived from at least one surface measurement or observation obtained in a drilling operation, including determining a dominant period from one or more surface parameters; and Estimating a downhole vibration severity indicator by evaluating the determined one or more characteristic periods and the calculated reference dominant period.

22. The method of paragraph 1, further comprising using the estimated downhole vibration severity indicator to estimate at least one of severity of RPM fluctuations at the bit, severity of weight on bit fluctuations, severity of bit bounce, severity of whirl, severity of lateral vibrations, mechanical specific energy, and combinations thereof.

23. A method to estimate severity of downhole vibration for a wellbore drill tool assembly, comprising the steps:

Identifying a dataset comprising (i) parameters for a selected drill tool assembly comprising a drill bit, (ii) selected wellbore dimensions, and (iii) selected measured depth (MD);

Selecting a reference value of downhole vibration amplitude for at least one of downhole torque, downhole weight on bit, and downhole bit RPM, downhole axial acceleration;

Identifying a corresponding selected surface drilling parameter including at least one of surface torque, a surface hook-load, and surface drill string rotation rate, and surface axial acceleration, and calculating a corresponding reference surface attribute value for the selected reference value of downhole vibration amplitude;

Determining a surface parameter vibration attribute value obtained in a drilling operation, the determined surface parameter vibration attribute value corresponding to the identified selected surface drilling parameter (step c); and Estimating a downhole vibration severity by evaluating the determined surface parameter vibration attribute value (step d) with respect to the identified reference surface vibration attribute value (step c).

24. The method according to paragraph 23, wherein the step of estimating a downhole vibration severity further comprises an approximation model based upon a first order perturbation model that considers the wellbore profile, drill string dimensions, drill string inertial properties, fluid damping, borehole friction, tool joint effects, and appropriate boundary conditions that represent vibrational states of interest.

25. The method of paragraph 23, wherein estimating downhole vibration severity comprises determining an estimate for at least one of downhole RPM fluctuation, a stick slip index, weight on bit fluctuation, bit bounce, drill string whirl, and combinations thereof.

26. The method of paragraph 23, further comprising changing a drilling operations parameter in response to the estimated downhole vibration severity.

27. The method of paragraph 23, wherein the selected reference value of downhole vibration amplitude (step b) further comprises:

Selecting a reference value of downhole vibration amplitude that reflects a condition including at least one of downhole torque is momentarily substantially zero, downhole bit RPM is momentarily substantially zero, and weight on bit is momentarily substantially zero.

28. The method of paragraph 23, further comprising:

Providing a relative or discrete indication of the estimated downhole vibration severity of step e that reflects a drilling operation parameter that is outside of an acceptable range for such drilling operation parameter.

29. The method of paragraph 28, wherein the relative or discrete indication corresponds to a condition whereby at least one of downhole torque is momentarily substantially zero, downhole bit RPM is momentarily substantially zero, and weight on bit is momentarily substantially zero.

30. The method of paragraph 28, further comprising changing a drilling operations parameter in response to the estimated downhole vibration severity.

31. The method of paragraph 23, wherein estimating downhole vibration severity further comprises determining an estimate for mechanical specific energy.

32. The method of paragraph 24, wherein the model comprises determining a primary period (P1) as a function of MD.

33. The method of paragraph 32, wherein the model comprises determining a cross compliance (X) at P1 as a function of MD.

34. The method of paragraph 33, comprising using torsional peak-to-peak (TPP), X, and surface RPM to calculate unstable stick slip (USS).

35. The method of paragraph 34, comprising using cross compliance X at P1 and

X as a function of RPM and MD to determine a forced stick slip normalization factor (FSSNF).

36. The method of paragraph 35, comprising using USS and FSSNF to determine a forced stick-slip (FSS) condition.

37. The method of paragraph 35, wherein primary period (P1), cross compliance (X), and forced stick-slip normalization factor (FSSNF) are determined prior to drilling an associated section of the wellbore.

38. The method of paragraph 23, wherein step d is performed substantially during drilling operations and is used to monitor or reduce downhole vibration severity.

39. The method of paragraph 23, wherein the determined surface parameter vibration attribute includes surface torque that comprises a peak-to-peak torque (TPP) variation for a selected unit of time.

40. The method of paragraph 23, wherein the estimated downhole vibration severity indicator includes at least one of unstable stick slip (USS) and bit bounce is determined from a surface parameter vibration attribute derived during drilling operations.

41. The method of paragraph 23, wherein the estimated downhole vibration severity indicator includes at least one of unstable stick slip (USS) and bit bounce and is determined from a projected surface parameter vibration attribute derived prior to drilling operations.

42. The method of paragraph 23, further comprising:
Providing a mechanical specific energy (MSE) and at least one estimate of USS, FSS, and bit bounce data; and
Adjusting a variable parameter related to a wellbore drilling operation.

43. A method to estimate severity of downhole vibration for a drill tool assembly, comprising the steps:
  a. Identifying a dataset comprising selected drill tool assembly parameters;
  b. Selecting a reference level of downhole vibration amplitude for the drill tool assembly;
  c. Identifying one or more ratios of: the selected reference level of downhole vibration amplitude for the drill tool assembly (step b) to a calculated reference surface vibration attribute;
  d. Determining a surface parameter vibration attribute derived from at least one surface measurement or observation obtained in a drilling operation, the determined surface parameter vibration attribute corresponding to the identified surface drilling parameter (step c); and
  e. Estimating the downhole vibration severity indicator by evaluating the determined surface parameter vibration attribute (step d) with respect to one or more of the identified ratios (step c).

44. A method to estimate severity of downhole vibration for a wellbore drill tool assembly, comprising the steps:
  a. Identifying a dataset comprising selected drill tool assembly parameters;
  b. Selecting a reference level of a downhole vibration amplitude for the drill tool assembly;
  c. Identifying one or more ratios of: the selected reference level of downhole vibration amplitude for the drill tool assembly (step b) to a rate of change associated with a selected reference surface vibration attribute;
  d. Determining a surface parameter vibration attribute derived from at least one surface measurement or observation obtained in a drilling operation, the determined surface parameter vibration attribute corresponding to the selected reference surface vibration attribute; and
  e. Estimating the downhole vibration severity indicator by evaluating the determined surface parameter vibration attribute (step d) with respect to one or more of the identified ratios (step c).

45. A method to estimate severity of downhole vibration for a wellbore drill tool assembly, comprising:
  a. Identifying a dataset comprising selected drill tool assembly parameters;
  b. Selecting a reference level of downhole vibration amplitude for the drill tool assembly;
  c. Calculating a reference surface vibration attribute for the selected reference level of downhole vibration amplitude, including calculating one or more reference characteristic periods of vibration of the drill tool assembly;
  d. Determining a surface parameter vibration attribute including a dominant period, derived from at least one surface measurement or observation obtained in a drilling operation; and
  e. Estimating the downhole vibration severity indicator by evaluating the relationship between the determined dominant period surface attribute with respect to the calculated reference surface vibration attribute characteristic period.

46. The method of paragraph 1, wherein the surface parameter is torque and the downhole parameter is rotary speed.

47. The method of paragraph 1, wherein the surface parameter is hookload and the downhole parameter is weight-on-bit.

48. The method of paragraph 1, wherein the ratios are computed at one or more of the resonant periods.

49. The method of paragraph 1, wherein the ratios are computed at the largest resonant period.

50. The method of paragraph 1, wherein the ratios are computed at the period corresponding to one to more multiples of the rotary speed.

51. The method of paragraph 1, wherein the ratios are computed at the period corresponding to the rotary speed.

52. The method of paragraph 1, wherein steps a-c are performed prior to the drilling operation.

53. The method of paragraph 1, wherein steps d-e are performed during drilling.

54. The method of paragraph 1, wherein the drilling operational parameters are observed at least once per second.

55. The method of paragraph 1, wherein the frequency response is obtained by a physical model of the drilling tool assembly utilizing mechanics principles.

56. The method of paragraph 1, where the model solves the first order linearized equations around a steady-state solution of the drill tool assembly.

57. The method of paragraph 1, further comprising displaying an estimated downhole vibration severity to the driller during drilling.

58. The method of paragraph 1, further comprising displaying a torsional severity parameter.

59. The method of paragraph 1, further comprising displaying an axial severity parameter.

60. The method of paragraph 11, wherein the undesirable downhole condition includes one or more of: full stick-slip of the bit, bit axial disengagement from the formation, or momentarily exceeding one or more design or operating limits anywhere along the drill tool assembly, such as the make-up or twist-off torque of a connection, a bucking limit, or a tensile or torsional strength of a component of the drill tool assembly.

While the present techniques of the invention may be susceptible to various modifications and alternative forms, the exemplary embodiments discussed above have been illustrated by way of example. However, it should again be understood that the invention is not intended to be limited to the particular embodiments disclosed herein. Illustrative, non-exclusive, examples of descriptions of some systems and methods within the scope of the present disclosure are presented in the following numbered paragraphs. The preceding paragraphs are not intended to be an exhaustive set of descriptions, and are not intended to define minimum or maximum scopes or required elements of the present disclosure. Instead, they are provided as illustrative examples, with other descriptions of broader or narrower scopes still being within the scope of the present disclosure. Indeed, the present techniques of the invention are to cover all modifications, equivalents, and alternatives falling within the spirit and scope of the description provided herein.

What is claimed is:

1. A method to estimate severity of downhole vibration for a wellbore drill tool assembly, comprising the steps:
   a. Identifying a dataset comprising selected drill tool assembly parameters;
   b. Selecting a reference level of downhole vibration amplitude for the drill tool assembly;
   c. Identifying a surface drilling parameter and using a computer processor to calculate a reference surface vibration attribute for the selected reference level of downhole vibration amplitude;
   d. Determining a surface parameter vibration attribute derived from at least one surface measurement or observation obtained in a drilling operation, the determined surface parameter vibration attribute corresponding to the identified surface drilling parameter (step c); and
   e. Estimating a downhole vibration severity indicator by evaluating a ratio between the determined surface parameter vibration attribute (step d) and the identified calculated reference surface vibration attribute (step c).

2. The method of claim 1, including an additional step (f) in which the quality of the vibration severity estimate from surface measurements is obtained by comparing the estimate based on surface data with data obtained from downhole measurements of the downhole vibration amplitude.

3. The method of claim 2, including an additional step (g) in which the quality of the vibration severity estimate from surface measurements is used to calibrate model parameters to obtain the best match between measured and predicted downhole data.

4. The method of claim 1, including an additional step (f) in which the vibration severity estimates from surface measurements for at least two drilling intervals are used to evaluate drilling performance and recommend selection of a drill bit design characteristic or other drilling parameter for the next interval.

5. The method of claim 1, including an additional step (f) in which at least one drilling parameter is adjusted to maintain at least one vibration severity estimate from surface measurements at a desired value.

6. The method of claim 1, wherein the identified dataset comprises one or more of selected drill tool assembly design parameters, wellbore dimensions, measured depth (MD), projected drilling operation parameters, wellbore survey data, and wellbore fluid properties.

7. The method of claim 1, wherein the reference level of downhole vibration amplitude (step b) is selected as a function of one or more of downhole drill tool assembly rotational velocity, downhole axial velocity, downhole axial acceleration, downhole axial load, downhole torsional moment, and combinations thereof.

8. The method of claim 1, wherein vibration relates to vibration of one or more components of the drill tool assembly and comprises one or more of torsional vibration, axial vibration, lateral vibration, and combinations thereof.

9. The method of claim 1, wherein selecting a reference level of downhole vibration amplitude (step b) comprises selecting a downhole condition for the drill tool assembly for which the rotary velocity is momentarily zero.

10. The method of claim 1, wherein selecting a reference level of downhole vibration amplitude (step b) comprises selecting a downhole condition where a weight on bit (WOB) parameter is momentarily zero.

11. The method of claim 1, wherein selecting the reference level of downhole vibration amplitude (step b) comprises selecting a threshold value for an undesirable downhole vibration amplitude condition.

12. The method of claim 1, wherein identifying the surface drilling parameter and calculating a reference surface vibration attribute (step c) includes calculating a reference value for one or more of a surface indicated torque, a surface indicated hook load, a surface indicated rotational velocity of the drill string, a surface indicated bit penetration rate, a surface indicated axial acceleration, and combinations thereof.

13. The method of claim 1, wherein calculating the reference surface vibration attribute (step c) includes determining one or more of vibration amplitude, period, primary period, standard deviation, statistical measure, time derivative, slew rate, zero crossings, Fourier amplitude, state observer estimate, other mode observer estimate, resonance, cross compliance, and combinations thereof.

14. The method of claim 1, wherein determining the surface parameter vibration attribute (step d) includes determining one or more of a surface torque, a surface hook load, surface rotational velocity of the drill string, a surface measured bit penetration rate, a surface measured weight on bit, a surface axial acceleration, and combinations thereof.

15. The method of claim 1, wherein determining a surface parameter vibration attribute (step d) includes calculating a reference value for one or more of a surface indicated torque, a surface indicated hook load, a surface indicated rotational velocity of the drill string, a surface indicated bit penetration rate, a surface indicated axial acceleration, and combinations thereof.

16. The method of claim 1, wherein determining a surface parameter vibration attribute (step d) comprises using one or more of vibration amplitude, period, primary period, standard deviation, statistical measure, time derivative, slew rate, zero crossings, Fourier amplitude, state observer estimate, other mode observer estimate, resonance, cross compliance, and combinations thereof.

17. The method of claim 1, wherein steps a, b, and c are performed prior to performing steps (d) and (e).

18. The method of claim 1, further comprising the step of adjusting one or more drilling parameters in response to the estimated downhole vibration severity indicator.

19. The method of claim 1, further comprising using the estimated downhole vibration severity indicator to estimate at least one of severity of RPM fluctuations at the bit, severity of weight on bit fluctuations, severity of bit bounce, severity of whirl, severity of lateral vibrations, mechanical specific energy, and combinations thereof.

20. A method to estimate severity of downhole vibration for a wellbore drill tool assembly, comprising the steps:
   a. Identifying a dataset comprising (i) parameters for a selected drill tool assembly comprising a drill bit, (ii) selected wellbore dimensions, and (iii) selected measured depth (MD);
   b. Selecting a reference value of downhole vibration amplitude for at least one of downhole torque, downhole weight on bit, downhole bit RPM, downhole axial acceleration;
   c. Identifying a corresponding selected surface drilling parameter including at least one of surface torque, a surface hook-load, surface drill string rotation rate, and surface axial acceleration, and using a base model and a computer processor to calculate a primary period (P1) and a corresponding reference value of downhole vibration amplitude as a function of MD;
   d. Determining a surface parameter vibration attribute value obtained in a drilling operation, the determined surface parameter vibration attribute value corresponding to the identified selected surface drilling parameter (step c); and e. Estimating a downhole vibration severity by evaluating a ratio between the determined surface parameter vibration attribute value (step d) and the identified reference surface vibration attribute value (step c).

21. The method of claim 20, wherein the base model comprises an approximation model based upon a first order perturbation model that considers the wellbore profile, drill string dimensions, drill string inertial properties, fluid damping, borehole friction, tool joint effects, and appropriate boundary conditions that represent vibrational states of interest.

22. The method of claim 20, wherein estimating downhole vibration severity comprises determining an estimate for at least one of downhole RPM fluctuation, a stick slip index, weight on bit fluctuation, bit bounce, drill string whirl, and combinations thereof.

23. The method of claim 20, further comprising changing a drilling operations parameter in response to the estimated downhole vibration severity.

24. The method of claim 20, wherein the selected reference value of downhole vibration amplitude (step b) further comprises:

Selecting a reference value of downhole vibration amplitude that reflects a condition including at least one of downhole torque is momentarily zero, downhole bit RPM is momentarily substantially zero, and weight on bit is momentarily substantially zero.

25. The method of claim 20, further comprising:

Providing a relative or discrete indication of the estimated downhole vibration severity of step e that reflects a drilling operation parameter that is outside of an acceptable range for such drilling operation parameter.

26. The method of claim 25, wherein the relative or discrete indication corresponds to a condition whereby at least one of downhole torque is momentarily substantially zero, downhole bit RPM is momentarily zero, and weight on bit is momentarily substantially zero.

27. The method of claim 25, further comprising changing a drilling operations parameter in response to the estimated downhole vibration severity.

28. The method of claim 20, wherein estimating downhole vibration severity further comprises determining an estimate for mechanical specific energy.

29. The method of claim 20, wherein the base model comprises determining a cross compliance (X) at P1 as a function of MD.

30. The method of claim 29, comprising using peak-to-peak torque (TPP), X, and surface RPM to calculate unstable stick slip (USS).

31. The method of claim 30, comprising using X at P1 and X as a function of RPM and MD to determine a forced stick slip normalization factor (FSSNF).

32. The method of claim 31, comprising using USS and FSSNF to determine a forced stick-slip (FSS) condition.

33. The method of claim 31, wherein P1, X, and FSSNF are determined prior to drilling an associated section of the wellbore.

34. The method of claim 20, wherein step d is performed during drilling operations and is used to monitor or reduce downhole vibration severity.

35. The method of claim 20, wherein the determined surface parameter vibration attribute includes surface torque that comprises a peak-to-peak torque variation for a selected unit of time (TPP).

36. The method of claim 20, wherein the estimated downhole vibration severity indicator includes at least one of unstable stick slip (USS) and bit bounce is and is determined from a surface parameter vibration attribute derived during drilling operations.

37. The method of claim 20, wherein the estimated downhole vibration severity indicator includes at least one of unstable stick slip (USS) and bit bounce and is determined from a projected surface parameter vibration attribute derived prior to drilling operations.

38. The method of claim 20, further comprising:

Providing a mechanical specific energy (MSE) and an estimate of at least one of USS, FSS, and bit bounce data; and Adjusting a variable parameter related to a wellbore drilling operation.

39. A method to estimate severity of downhole vibration for a drill tool assembly, comprising the steps:

a. Identifying a dataset comprising selected drill tool assembly parameters;

b. Selecting a reference level of downhole vibration amplitude for the drill tool assembly; and c. Identifying one or more ratios of: the selected reference level of downhole vibration amplitude for the drill tool assembly (step b) to a calculated reference surface vibration amplitude;

d. Determining a surface parameter vibration attribute derived from at least one surface measurement or observation obtained in a drilling operation; and e. Estimating the downhole vibration severity indicator using a computer processor by evaluating the determined surface parameter vibration attribute (step d) with respect to one or more of the identified ratios (step c).

40. A method to estimate severity of downhole vibration for a wellbore drill tool assembly, comprising the steps:

a. Identifying a dataset comprising selected drill tool assembly parameters;

b. Selecting a reference level of downhole vibration amplitude for the drill tool assembly;

c. Identifying one or more ratios of: the selected reference level of downhole vibration amplitude for the drill tool assembly (step b) to a rate of change associated with a selected reference surface vibration amplitude;

d. Determining a surface parameter vibration attribute derived from at least one surface measurement or observation obtained in a drilling operation; and e. Estimating the downhole vibration severity indicator using a computer processor by evaluating the determined surface parameter vibration attribute (step d) with respect to one or more of the identified ratios (step c).

41. A method to estimate severity of downhole vibration for a wellbore drill tool assembly, comprising:

a. Identifying a dataset comprising selected drill tool assembly parameters;

b. Selecting a reference level of downhole vibration amplitude for the drill tool assembly;

c. Calculating a reference surface vibration attribute for the selected reference level of downhole vibration amplitude, including calculating one or more reference characteristic periods of vibration of the drill tool assembly using a computer processor and a model that comprises determining a primary'period (P1) as a function of MD;

d. Determining a surface parameter vibration attribute including a measured period, derived from at least one surface measurement or observation obtained in a drilling operation; and e. Estimating the downhole vibration severity indicator by evaluating a ratio relationship between the determined dominant period surface attribute and the calculated reference surface vibration attribute characteristic period.

42. The method of claim 1, wherein the surface parameter is torque and the downhole parameter is rotary speed.

43. The method of claim 1, wherein the surface parameter is hookload and the downhole parameter is weight-on-bit.

44. The method of claim 1, wherein the ratio is computed at one or more of the resonant periods.

45. The method of claim 1, wherein the ratio is computed at the largest resonant period.

46. The method of claim 1, wherein the ratio is computed at the period corresponding to one to more multiples of the rotary speed.

47. The method of claim 1, wherein the ratios are computed at the period corresponding to the rotary speed.

48. The method of claim 1, wherein steps a-c are performed prior to the drilling operation.

49. The method of claim 1, wherein steps d-e are performed during drilling.

50. The method of claim 1, wherein the drilling operational parameters are observed at least once per second.

51. The method of claim 1, further comprising using a model to calculate the reference surface vibration attribute for the selected reference level of downhole vibration amplitude (step c) as a function of MD, wherein the model is a physical model of the drilling tool assembly that utilizes mechanics principles to calculate the reference surface vibration attribute.

52. The method of claim 1, further comprising using a model that solves linearized equations around a steady-state solution of the drill tool assembly to calculate a primary period (P1) and the reference surface vibration attribute for the selected reference level of downhold vibration amplitude (step c) as a function of MD.

53. The method of claim 1, further comprising displaying an estimated downhole vibration severity to the driller during drilling.

54. The method of claim 1, further comprising displaying a torsional severity parameter.

55. The method of claim 1, further comprising displaying an axial severity parameter.

56. The method of claim 11, wherein the undesirable downhole condition includes one or more of: full stick-slip of the bit, bit axial disengagement from the formation, or momentarily exceeding one or more design or operating limits anywhere along the drill tool assembly, such as the make-up or twist-off torque of a connection, a bucking limit, or a tensile or torsional strength of a component of the drill tool assembly.

57. The method of claim 1, further comprising using a base model to calculate the reference surface vibration attribute (step c).

58. The method of claim 1, wherein the reference surface vibration attribute (step c) comprises a surface vibration amplitude, and wherein the determined surface parameter vibration attribute (step d) comprises a surface parameter vibration amplitude.

59. A method to estimate severity of downhole vibration for a wellbore drill tool assembly, comprising the steps:
   a. Identifying a dataset comprising selected drill tool assembly parameters;
   b. Selecting a reference level of downhole vibration amplitude for the drill tool assembly;
   c. Using a base model to calculate a reference surface indicated torque rate of change for the selected reference level of downhole vibration amplitude;
   d. Determining a surface indicated torque rate of change derived from at least one surface measurement or observation obtained in a drilling operation; and
   e. Estimating a downhole vibration severity indicator using a computer processor by evaluating a ratio between of the determined surface indicated torque rate of change (step d) and the identified reference surface indicated torque rate of change (step c).

* * * * *